(12) United States Patent
Shimohara et al.

(10) Patent No.: US 8,076,392 B2
(45) Date of Patent: Dec. 13, 2011

(54) INK COMPOSITION AND IMAGE RECORDING METHOD AND IMAGE RECORDED MATTER USING SAME

(75) Inventors: Norihide Shimohara, Kanagawa (JP); Hisato Nagase, Kanagawa (JP); Hidenori Takahashi, Shizuoka (JP)

(73) Assignee: Fujifilm Corporation, Tokyo (JP)

( * ) Notice: Subject to any disclaimer, the term of this patent is extended or adjusted under 35 U.S.C. 154(b) by 667 days.

(21) Appl. No.: 12/055,397

(22) Filed: Mar. 26, 2008

(65) Prior Publication Data

US 2008/0241485 A1 Oct. 2, 2008

(30) Foreign Application Priority Data

Mar. 30, 2007 (JP) ................................. 2007-095382
Nov. 16, 2007 (JP) ................................. 2007-298576

(51) Int. Cl.
| | |
|---|---|
| B29C 71/04 | (2006.01) |
| B32B 9/04 | (2006.01) |
| B32B 27/00 | (2006.01) |
| B41J 2/01 | (2006.01) |
| B41J 2/14 | (2006.01) |
| B41J 2/16 | (2006.01) |
| B41J 2/17 | (2006.01) |
| C03C 25/10 | (2006.01) |
| C08F 2/46 | (2006.01) |
| C08G 65/18 | (2006.01) |
| C08J 3/28 | (2006.01) |
| C09D 5/00 | (2006.01) |
| C09D 11/00 | (2006.01) |
| G01D 11/00 | (2006.01) |

(52) U.S. Cl. ................ 523/160; 347/1; 347/51; 347/84; 347/95; 347/96; 347/100; 347/102; 428/411.1; 428/500; 522/1; 522/71; 522/168; 522/172; 523/161

(58) Field of Classification Search .................. 523/160, 523/161; 522/1, 71, 168, 172; 347/1, 84, 347/95, 100, 51, 96, 102; 428/411.1, 500
See application file for complete search history.

(56) References Cited

FOREIGN PATENT DOCUMENTS

| | | |
|---|---|---|
| JP | 2003-119414 A | 4/2003 |
| JP | 2003-321628 A | 11/2003 |
| JP | 2004-018656 A | 1/2004 |
| JP | 2004-131589 A | 4/2004 |
| WO | 2007/006636 A2 | 1/2007 |
| WO | 2007/006638 A2 | 1/2007 |
| WO | 2007/006639 A2 | 1/2007 |
| WO | 2007/006682 A1 | 1/2007 |

OTHER PUBLICATIONS

An extended European Search Report dated Jun. 27, 2008.

*Primary Examiner* — Patrick Niland
(74) *Attorney, Agent, or Firm* — Sughrue Mion, PLLC

(57) ABSTRACT

An ink composition containing at least a polymerizable composition, a pigment, and a polymer represented by General Formula (1):

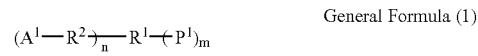

General Formula (1)

where $R^1$ represents an (m+n)-valent organic linking group, $R^2$ represents a single bond or divalent organic linking group; $A^1$ represents a monovalent organic group having a pigment adsorption structure that contains at least one selected from organic pigment structure, heterocyclic structure, acidic group, group having a basic nitrogen atom, urea group, urethane group, group having a coordinating oxygen atom, hydrocarbon group having 4 or more carbon atoms, alkoxysilyl group, epoxy group, isocyanate group, and hydroxyl group; the n groups $A^1$ and bonds or groups $R^2$ may independently be the same or different; "m" is 1 to 8, "n" is 2 to 9, and m+n is 3 to 10; $P^1$ represents a polymer skeleton; and the m skeletons $P^1$ may be the same or different.

12 Claims, No Drawings

INK COMPOSITION AND IMAGE RECORDING METHOD AND IMAGE RECORDED MATTER USING SAME

BACKGROUND OF THE INVENTION

1. Field of the Invention

The present invention relates to an ink composition that has excellent dispersivity of a colorant, excels in color developing ability, can be cured by irradiation with active radiation, and can form high-quality images, this ink composition being especially suitable for ink-jet recording applications. The invention also relates to an image recording method and image recording matter using the ink composition.

2. Description of the Related Art

An electrophotographic method, a thermal transfer method of sublimation and melting type, and an ink-jet method are known as image recording methods for forming images on a recording medium such as paper based on image data signals. Among them, the ink-jet method excels as an image recording method because it can be realized with an inexpensive apparatus and forms images directly on the recording medium by discharging the ink only on the required image portion, thereby making it possible to use the ink efficiently, has a low running cost, and has a low noise level. With the ink-jet method, printing can be performed not only on regular paper, but also on recording media that do not absorb water, such as plastic sheets and metal sheets. However, how to increase speed of printing and quality of printed images is the problem associated with the ink-jet method. In addition, a specific feature of this method is that the time required for drying and curing the droplets after printing greatly affects the sharpness of images.

An example of the ink-jet systems is a recording system using curable ink compositions for ink-jet recording that can be cured by irradiation with active radiation. With such a system, sharp images can be formed by irradiating the ink droplets with radiation and curing them immediately after printing.

In order to form highly accurate images with excellent color developing ability, the curable ink compositions are required to have high pigment dispersivity and stability. Generally, the size of pigment particles has to be decreased to impart the ink composition with a bright color tone and high tinting strength. In particular, in ink compositions for ink-jet recording, because the discharged ink droplets greatly affect the sharpness of images, the discharge ink droplets also have to be small and very fine pigment particles that are less in size than the thickness of the cured ink film formed by the ink composition have to be used. Where the size of pigment particles is thus further reduced to obtain a high tinting strength, the pigment becomes difficult to disperse, pigment aggregates are formed, and the viscosity of ink composition increases if a pigment dispersant is added. The appearance of pigment aggregates and the increase in the ink composition viscosity produce an adverse effect on the ink discharge ability and greatly degrade the performance of ink composition. Yet another problem is that because the ink composition used for the ink-jet method is accommodated in a cartridge, heated during discharge, and maintained at a reduced temperature when it is not discharged or during storage, the ink is subjected to cyclic temperature variations of heating and cooling, such temperature variations also adversely affect the pigment dispersivity, and the dispersivity of pigment decreases with the passage of time, easily causing thickening or aggregation in the ink.

For this reason, there is a need for an ink composition that has sufficient flowability, can disperse a finely powdered pigment with excellent stability, and excels in stability of pigment dispersion with time, and a variety of dispersants for obtaining a stable pigment dispersion have heretofore been suggested.

For example, an ink composition using a pigment derivative as a dispersant to increase the affinity for the pigment (see Japanese Patent Application Laid-Open (JP-A) Nos. 2003-119414 and 2004-18656), an ink composition using a polymer having a basic group as a dispersant for a special pigment such as phthalocyanine- and quinacridone-based pigments (see JP-A No. 2003-321628), and an ink composition using no organic solvent and containing a dispersant such as poly(ethyleneimine)-poly(12-hydroxystearic acid) graft polymer and an organic solvent containing a special monomer that dissolved the dispersant (see JP-A No. 2004-131589) have been suggested.

However, in the case of these ink compositions, although the pigment dispersion stability has been increased due to the functions of the dispersants with respect to those of the conventional ink compositions, the decrease in the size of the pigments used is insufficient and there is still room for improvement in terms of increasing the dispersivity of fine pigment particles. One more problem, it that dispersion stability after long-term storage or cyclic temperature variations is insufficient.

BRIEF SUMMARY OF THE INVENTION

The present invention resolves the above-described problems inherent to prior art and attains the following object. Thus, it is an object of the present invention to provide an ink composition that excels in dispersivity and stability of a fine pigment, can form high-quality images with a bright color tone and a high tinting strength, can be cured by irradiation with active radiation, and is suitable for ink-jet recording applications, and also to provide an image recording method and image recording matter using the ink composition.

The inventors have conducted a comprehensive study to attain the above-described object. The results obtained demonstrated that an ink composition that excels in pigment dispersivity and in which the decrease in dispersion stability is effectively suppressed even after long-term storage and cyclic temperature variations can be obtained by using a special graft polymer as a pigment dispersant. The present invention is based on this finding and employs the following means for resolving the above-described problems.

<1> An ink composition containing at least a polymerizable composition, a pigment, and a polymer represented by the following General Formula (1),

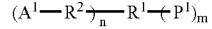

General Formula (1)

in the General Formula (1), $R^1$ represents an (m+n)-valent organic linking group, $R^2$ represents a single bond or a divalent organic linking group; $A^1$ represents a monovalent organic group having a pigment adsorption structure containing at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group; the n groups of $A^1$ and bonds or groups of $R^2$ may independently be the same or different; "m" is an integer of 1 to 8, "n" is an integer of 2 to 9, and m+n is 3 to 10; $P^1$ represents a polymer skeleton; and the m skeletons of $P^1$ may be the same or different.

<2> The ink composition according to the item <1>, wherein $A^1$ is a monovalent organic group that contains at least one selected from an organic pigment structure, a heterocyclic structure, an acidic group, a group having a basic nitrogen atom, an urea group, and a hydrocarbon group having 4 or more carbon atoms.

<3> The ink composition according to any one of the items <1> to <2>, wherein the polymer skeleton represented by $P^1$ is derived from at least one selected from polyvinyls, polyesters, polyethers, polyurethanes, polyamides, polyoxides, polysiloxanes, and modified products or copolymers thereof.

<4> The ink composition according to the item <1>, wherein the polymer represented by the General Formula (1) is a polymer represented by the following General Formula (2),

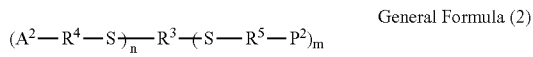

General Formula (2)

in the General Formula (2), $R^3$ represents an (m+n)-valent organic linking group, $R^4$ and $R^5$ independently represent a simple bond or a divalent organic linking group; $A^2$ represents a monovalent organic group having a pigment adsorption structure containing at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group; the n groups of $A^2$ and bonds or groups of $R^4$ may independently be the same or different; "m" is an integer of 1 to 8, "n" is an integer of 2 to 9, and m+n is 3 to 10; $P^2$ represents a polymer skeleton; the m skeletons of $P^2$ and the m bonds or groups of $R^5$ may independently be the same or different.

<5> The ink composition according to the item <4>, wherein $A^2$ is a monovalent organic group that contains at least one selected from an organic pigment structure, a heterocyclic structure, an acidic group, a group having a basic nitrogen atom, an urea group, and a hydrocarbon group having 4 or more carbon atoms.

<6> The ink composition according to any one of the items <4> to <6>, wherein the polymer skeleton represented by $P^2$ is derived from at least one selected from polyvinyls, polyesters, polyethers, polyurethanes, polyamides, polyoxides, polysiloxanes, and modified products or copolymers thereof.

<7> The ink composition according to any one of the items <1> to <6>, further containing a polymerization initiator.

<8> The ink composition according to the item <7>, wherein the polymerizable compound is a radical polymerizable compound, and the polymerization initiator is a photoradical generating agent.

<9> The ink composition according to the item <7>, wherein the polymerizable compound is a cationic polymerizable compound, and the polymerization initiator is a photoacid generating agent.

<10> The ink composition according to any one of the items <1> to <9>, being an ink-jet ink composition.

<11> The ink composition according to any one of the items <1> to <10>, capable of being cured by irradiation with an active energy beam.

<12> An image recording method including printing an image with an ink composition according to the item <1> to <12> on a recording medium; and curing the ink composition by irradiating the ink composition used in the print image with active radiation.

<13> An image recorded matter obtained by curing an ink composition according to any one of the items <1> to <11>.

<14> The image recorded matter according to the item <13>, obtained by printing the ink composition on a recording medium with an ink-jet printer and then curing the ink composition by irradiation with active radiation.

The present invention can resolve the above-described problems inherent to prior art, attain the aforementioned object, and provide an ink composition that excels in dispersivity and stability of a fine pigment, can form high-quality images with a bright color tone and a high tinting strength, can be cured by irradiation with active radiation, and is suitable for ink-jet recording applications, and also provide an image recording method and image recording matter using the ink composition.

DETAILED DESCRIPTION OF THE INVENTION (Ink Composition, and Image Recording Method and Image Recorded Matter)

The ink composition contains at least (A) a polymerizable compound, (B) a pigment, and (C) a polymer represented by the General Formula (1) (referred to hereinbelow as "the polymer of General Formula (1)") and, if necessary, other components that are appropriately selected. This in composition can be cured by irradiation with active energy rays.

The active energy rays are not particularly limited, provided that the irradiation therewith can generate initial species of a curing reaction in the ink composition, and the energy ray can be appropriately selected according to the object. Examples of suitable rays include α rays, γ rays, X rays, ultraviolet rays, visible light rays, and electron beams. In accordance with the present invention, from the standpoint of curing sensitivity and availability of equipment, ultraviolet radiation and electron beams are preferred, and ultraviolet radiation is especially preferred.

The image recording method in accordance with the present invention includes a printing step of printing the ink composition in accordance with the present invention on a recording medium, a curing step of curing the ink composition by irradiating the ink composition used in the print image with active radiation, and if necessary, other steps that are appropriately selected. The image recorded matter in accordance with the present invention is obtained by curing the ink composition in accordance with the present invention.

The contents of the ink composition in accordance with the present invention will be described below, and the contents of the image recording method and image recorded matter in accordance with the present invention will be also explained.

<(C) Polymer of General Formula (1)>

The polymer of General Formula (1) (sometimes referred to hereinbelow simply as "C component") is a polymer represented by the General Formula (1). In accordance with the present invention, the C component acts and functions as a pigment dispersant and has a structure having a triazine ring of high flatness with a large π plane. Therefore, it is a macromolecular compound that has high affinity for the (B) pigment due to van-der-Waals interaction, demonstrates excellent adsorptivity with respect to the (B) pigment, and has a specific structural repeating unit. As a result, the ink composition in accordance with the present invention that contains the C component excels in dispersion stability due to a steric repulsion effect of polymer chains.

The polymer represented by the General Formula (1) below has at the polymer ends a plurality of monovalent organic groups having a pigment adsorption structure that contains at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group. Therefore, the polymer excels in adsorptivity on solid surfaces, micelle formation ability, and surface activity, demonstrates a variety of actions and functions, and is advantageous as a pigment dispersant.

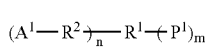

General Formula (1)

<Monovalent Organic Group: $A^1$>

In the General Formula (1), $A^1$ represents a monovalent organic group that contains a pigment adsorption structure that contains at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group. The n groups of $A^1$ may be the same or different.

At least one pigment adsorption structure or two or more such structures may be contained in one $A^1$.

In the monovalent organic group the pigment adsorption structure is bonded to an organic linking group composed of 1 to 200 carbon atoms, 20 or less nitrogen atoms, 100 or less oxygen atoms, 1 to 400 hydrogen atoms, and 40 or less sulfur atoms.

The pigment adsorption structure itself may constitute the monovalent organic group.

—Pigment Adsorption Structure—

The pigment adsorption structure constituting the $A^1$ will be described below.

The preferred examples of the organic pigment structure that is an example of the pigment adsorption structure include colorant structures of a phthalocyanine system, an insoluble azo system, an azo lake system, an anthraquinone system, a quinacridone system, a dioxazine system, a diketopyrrolopyrrole system, an anthrapydirine system, an anthrathrone system, an indanthrone system, a flavanthrone system, a perinone system, a perilene system, and a thioindigo system. Among them, the colorant structures of a phthalocyanine system, an azo lake system, an anthraquinone system, a dioxazine system, and a diketopyrrolopyrrole system are preferred, and the colorant structures of a phthalocyanine system, an anthraquinone system, and a diketopyrrolopyrrole system are especially preferred.

The preferred examples of the heterocyclic structure that is an example of the pigment adsorption structure include thiophene, furan, xanthene, pyrrole, pyrroline, pyrrolidine, dioxolan, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, piperazine, triazine, trithian, isoindoline, isoindolinone, benzimidazolone, benzothiazole, succinimide, phthalimide, naphthalimide, hydantoin, indole, quinoline, carbazole, acridine, acridone and anthraquinone. Among them, pyrroline, pyrrolidine, pyrazole, pyrazoline, pyrazolidine, imidazole, triazole, pyridine, piperidine, morpholine, pyridazine, pyrimidine, piperazine, triazine, isoindoline, isoindolinone, benzimidazolone, benzothiazole, succinimide, phthalimide, naphthalimide, hydantoin, carbazole, acridine, acridone and anthraquinone are especially preferred.

The organic pigment structure or heterocyclic structure may further have a substituent. Examples of suitable substituents include an alkyl group having 1 to 20 carbon atoms (a methyl group, an ethyl group), an aryl group having 6 to 16 carbon atoms (a phenyl group, a naphthyl group), a hydroxyl group, an amino group, a carboxyl group, a sulfonamide group, an N-sulfonylamide group, an acyloxy group having 1 to 6 carbon atoms (an acetoxy group and the like), an alkoxy group having 1 to 20 carbon atoms (a methoxy group, an ethoxy group), a halogen atom (chlorine, bromine, and the like), an alkoxycarbonyl group having 2 to 7 carbon atoms (a methoxycarbonyl group, an ethoxycarbonyl group, a cyclohexyloxycarbonyl group, and the like), a cyano group, and a carbonic acid ester group (t-butyl carbonate and the like). These substituents may be bonded to the organic pigment structure or heterocyclic structure via a linking group composed of the below-described structural unit or a combination of such structural units.

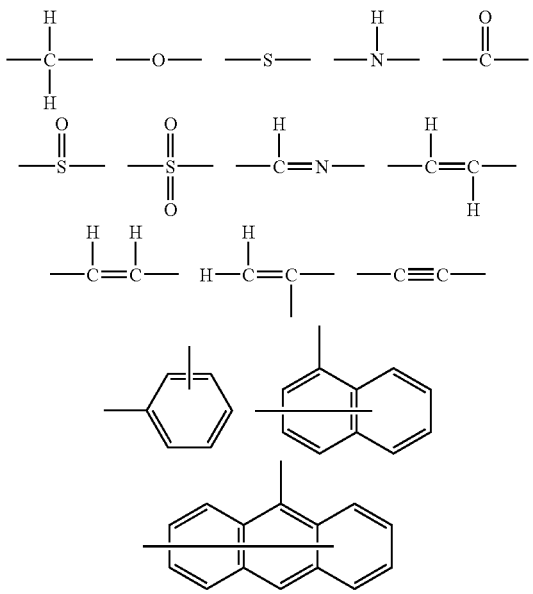

The preferred examples of the acidic group that is an example of the pigment adsorption structure include a carboxylic acid group, a sulfonic acid group, a monosulfuric acid ester group, a phosphoric acid group, a monophosphoric acid ester group, and a boric acid group. Among them, a carboxylic acid group, a sulfonic acid group, a monosulfuric acid ester group, a phosphoric acid group, and a monophosphoric acid ester group are preferred, and a carboxylic acid group, a sulfonic acid group, and a phosphoric acid group are especially preferred.

The preferred examples of the group having a basic nitrogen atom that is an example of the pigment adsorption structure include an amino group ($-NH_2$), a substituted amino group ($-NHR^8$, $-NR^9R^{10}$, where $R^8$, $R^9$, $R^{10}$ independently represent an alkyl group having 1 to 20 carbon atoms, an aryl group having 6 or more carbon atoms, and an aralkyl group having 7 or more carbon atoms), a guanidyl group represented by the following Formula (a1), and an amidinyl group represented by the following Formula (a2).

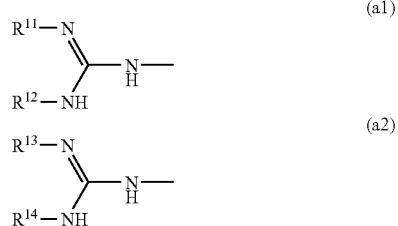

In the Formula (a1), $R^{11}$ and $R^{12}$ independently represent an alkyl group having 1 to 20 carbon atoms, an aryl group having 6 or more carbon atoms, and an aralkyl group having 7 or more carbon atoms.

In the Formula (a2), $R^{13}$ and $R^{14}$ independently represent an alkyl group having 1 to 20 carbon atoms, an aryl group having 6 or more carbon atoms, and an aralkyl group having 7 or more carbon atoms.

Among them, an amino group (—$NH_2$), a substituted amino group (—$NHR^8$, —$NR^9R^{10}$, where $R^8$, $R^9$, and $R^{10}$ independently represent an alkyl group having 1 to 10 carbon atoms, a phenyl group, a benzyl group), a guanidyl group represented by the Formula (a1) (in the Formula (a1), $R^{11}$ and $R^{12}$ independently represent an alkyl group having 1 to 10 carbon atoms, a phenyl group, a benzyl group), and an amidinyl group represented by the Formula (a2) (in the Formula (a2), $R^{13}$ and $R^{14}$ independently represent an alkyl group having 1 to 10 carbon atoms, a phenyl group, a benzyl group) are preferred, and an amino group (—$NH_2$), a substituted amino group (—$NHR^8$, —$NR^9R^{10}$, where $R^8$, $R^9$, and $R^{10}$ independently represent an alkyl group having 1 to 5 carbon atoms, a phenyl group, a benzyl group), a guanidyl group represented by the Formula (a1) (in the Formula (a1), $R^{11}$ and $R^{12}$ independently represent an alkyl group having 1 to 5 carbon atoms, a phenyl group, a benzyl group), and an amidinyl group represented by the Formula (a2) (in the Formula (a2), $R^{13}$ and $R^{14}$ independently represent an alkyl group having 1 to 5 carbon atoms, a phenyl group, a benzyl group) are especially preferred.

The preferred examples of the urea group that is an example of the pigment adsorption structure include —$NR^{15}CONR^{16}R^{17}$ (here, $R^{15}$, $R^{16}$, and $R^{17}$ are independently a hydrogen atom, or an alkyl group having 1 to 20 carbon atoms, an aryl group having 6 or more carbon atoms, and an aralkyl group having 7 or more carbon atoms). Among them, —$NR^{15}CONHR^{17}$ (here, $R^{15}$ and $R^{17}$ independently represent a hydrogen atom, or an alkyl group having 1 to 10 carbon atoms, an aryl group having 6 or more carbon atoms, and an aralkyl group having 7 or more carbon atoms) are preferred, and —$NHCONHR^{17}$ (here, $R^{17}$ is a hydrogen atom, or an alkyl group having 1 to 10 carbon atoms, an aryl group having 6 or more carbon atoms, and an aralkyl group having 7 or more carbon atoms) are especially preferred.

The preferred examples of the urethane group that is an example of the pigment adsorption structure include —NHCOO$R^{18}$, —$NR^{19}$COO$R^{20}$, —OCONH$R^{21}$, —OCON$R^{22}R^{23}$ (here, $R^{18}$, $R^{19}$, $R^{20}$, $R^{21}$, $R^{22}$, and $R^{23}$ independently represent an alkyl group having 1 to 20 carbon atoms, an aryl group having 6 or more carbon atoms, and an aralkyl group having 7 or more carbon atoms). Among them, —NHCOO$R^{18}$, —OCONH$R^{21}$ (here, $R^{18}$, $R^{21}$ independently represent an alkyl group having 1 to 20 carbon atoms, an aryl group having 6 or more carbon atoms, and an aralkyl group having 7 or more carbon atoms) are preferred, and —NHCOO$R^{18}$, —OCONH$R^{21}$ (here, $R^{18}$, $R^{21}$ independently represent an alkyl group having 1 to 10 carbon atoms, an aryl group having 6 or more carbon atoms, and an aralkyl group having 7 or more carbon atoms) are especially preferred.

The preferred examples of the group having a coordinating oxygen atom that is an example of the pigment adsorption structure include an acetylacetonate group and crown ethers.

The preferred examples of the hydrocarbon group having 4 or more carbon atoms that is an example of the pigment adsorption structure include an alkyl group having 4 or more carbon atoms, an aryl group having 6 or more carbon atoms, and an aralkyl group having 7 or more carbon atoms. Among them, an alkyl group having 4 to 20 carbon atoms, an aryl group having 6 to 20 carbon atoms, and an aralkyl group having 7 to 20 carbon atoms are preferred, and an alkyl group having 4 to 15 carbon atoms (for example, an octyl group and a dodecyl group), an aryl group having 6 to 15 carbon atoms (for example, a phenyl group and a naphthyl group), and an aralkyl group having 7 to 15 carbon atoms (for example, a benzyl group) are especially preferred.

The preferred examples of the alkoxysilyl group that is an example of the pigment adsorption structure include a trimethoxysilyl group and a triethoxysilyl group.

—Organic Linking Group—

The preferred examples of the organic linking group include organic linking groups composed of 1 to 100 carbon atoms, 10 or less nitrogen atoms, 50 or less oxygen atoms, 1 to 200 hydrogen atoms, and 20 or less sulfur atoms. The organic linking group may be substituted with a substituent.

The preferred specific examples of the organic linking group include groups composed for the following structural units or combinations thereof.

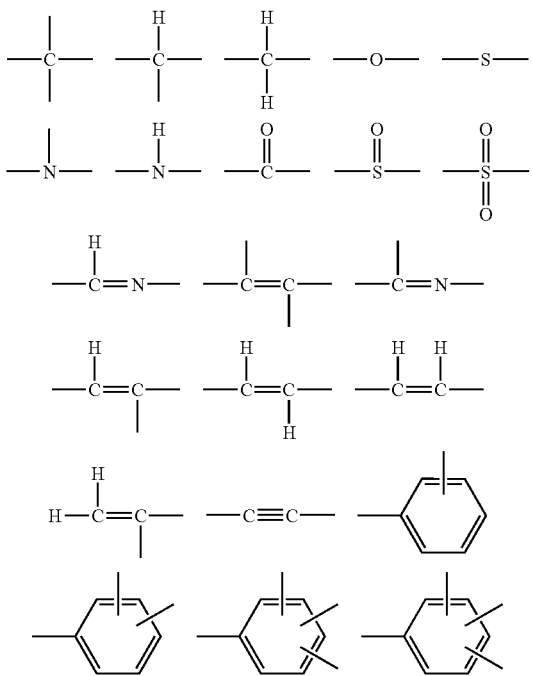

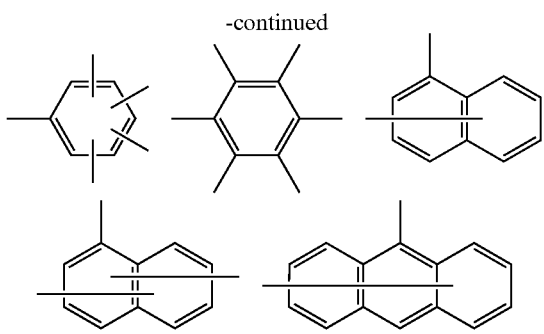

When the organic linking group has a substituent, examples of preferred substituents include alkyl groups having 1 to 20 carbon atoms (a methyl group, an ethyl group, and the like), an aryl group having 6 to 16 carbon atoms (a phenyl group, a naphthyl group, and the like), a hydroxyl group, an amino group, a carboxyl group, a sulfonamide group, an N-sulfonylamide group, an acyloxy group having 1 to 6 carbon atoms (an acetoxy group and the like), an alkoxy group having 1 to 6 carbon atoms (a methoxy group, an ethoxy group, and the like), a halogen atom such as chlorine and bromine, an alkoxycarbonyl group having 2 to 7 carbon atoms (for example, a methoxycarbonyl group, an ethoxycarbonyl group, and a cyclohexyloxycarbonyl group), and a carbonic acid ester group (a cyano group, a t-butyl carbonate, and the like).

In accordance with the present invention, the $A^1$ is preferably a monovalent organic group that contains a pigment adsorption structure that contains at least one selected from the organic pigment structure, heterocyclic structure, acidic group, group having a basic nitrogen atom, urea group, and hydrocarbon group having 4 or more carbon atoms, and more preferably a monovalent organic group represented by the following General Formula (4).

General Formula (4)

In the General Formula (4), $B^1$ represents the pigment adsorption structure (that is, the structure that contains at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group), $R^{24}$ is a single bond or an (a+1)-valent organic linking group. (a) is an integer of 1 to 10, preferably 1 to 7, more preferably 1 to 5, and especially preferably 1 to 3. The (a) pigment adsorption structures $B^1$ may be the same or different. Examples of the (a+1)-valent organic linking groups include groups composed of 1 to 100 carbon atoms, 10 or less nitrogen atoms, 50 or less oxygen atoms, 1 to 200 hydrogen atoms, and 20 or less sulfur atoms. Among the (a+1)-valent organic linking groups, the especially preferred organic linking groups are composed of 1 to 10 carbon atoms, 5 or less nitrogen atoms, 10 or less oxygen atoms, 1 to 30 hydrogen atoms, and 5 or less sulfur atoms.

Examples of the pigment adsorption structure represented by the $B^1$ are identical to those of the organic adsorption structure constituting $A^1$ in General Formula (1) above, and the preferred examples are also the same. Among them, the preferred pigment adsorption structure includes at least one selected from an organic pigment structure, a heterocyclic structure, an acidic group, a group having a basic nitrogen atom, an urea group, and a hydrocarbon group having 4 or more carbon atoms.

The preferred specific examples of the (a+1)-valent organic linking group include groups composed for the following structural units or combinations thereof (ring structures may be also formed).

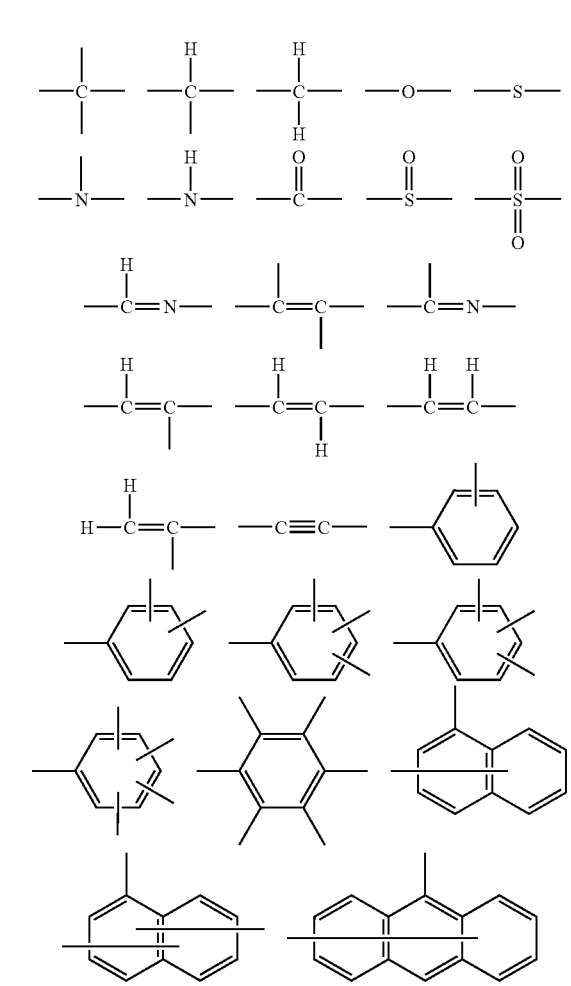

The (a+1)-valent organic linking group may have a substituent, examples of preferred substituents including alkyl groups having 1 to 20 carbon atoms (a methyl group, an ethyl group, and the like), an aryl group having 6 to 16 carbon atoms (a phenyl group, a naphthyl group, and the like), a hydroxyl group, an amino group, a carboxyl group (an acetoxy group and the like), a sulfonamide group, an N-sulfonylamide group, an acyloxy group having 1 to 6 carbon atoms, an alkoxy group having 1 to 6 carbon atoms (a methoxy group, an ethoxy group, and the like), a halogen atom (chlorine, bromine and the like), an alkoxycarbonyl group having 2 to 7 carbon atoms (for example, a methoxycarbonyl group, an ethoxycarbonyl group, and a cyclohexyloxycarbonyl group), a cyano group, and a carbonic acid ester group (t-butyl carbonate, and the like).

<$R^2$>

$R^2$ in General Formula (1) represents a single bond or a divalent organic linking group. The n groups $R^2$ may be the same or different.

The preferred examples of the divalent organic linking group include organic linking groups composed of 1 to 100 carbon atoms, 10 or less nitrogen atoms, 50 or less oxygen atoms, 1 to 200 hydrogen atoms, and 20 or less sulfur atoms. The divalent organic linking group may be substituted with a substituent.

The preferred specific examples of the divalent organic linking group include groups composed for the following structural units or combinations thereof.

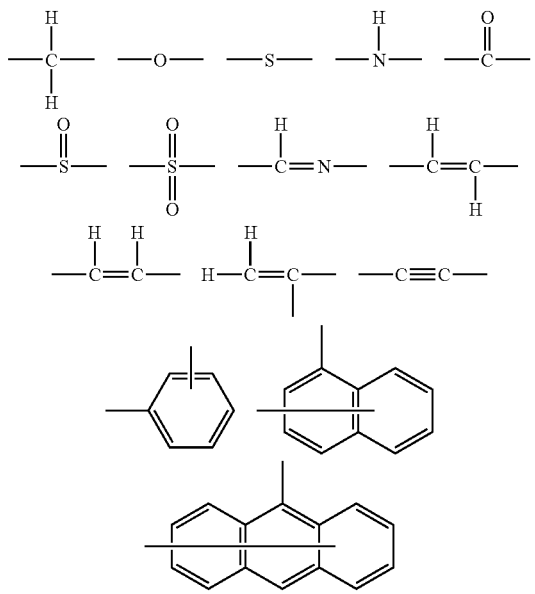

A single bond or a divalent organic linking group composed of 1 to 50 carbon atoms, 8 or less nitrogen atoms, 25 or less oxygen atoms, 1 to 100 hydrogen atoms, and 10 or less sulfur atoms is preferred, a single bond or a divalent organic linking group composed of 1 to 30 carbon atoms, 6 or less nitrogen atoms, 15 or less oxygen atoms, 1 to 50 hydrogen atoms, and 7 or less sulfur atoms is more preferred, and a single bond or a divalent organic linking group composed of 1 to 10 carbon atoms, 5 or less nitrogen atoms, 10 or less oxygen atoms, 1 to 30 hydrogen atoms, and 5 or less sulfur atoms is especially preferred as the $R^2$.

When the divalent organic linking group has a substituent, examples of preferred substituents include alkyl groups having 1 to 20 carbon atoms (a methyl group, an ethyl group, and the like), an aryl group having 6 to 16 carbon atoms (a phenyl group, a naphthyl group, and the like), a hydroxyl group, an amino group, a carboxyl group (an acetoxy group and the like), a sulfonamide group, an N-sulfonylamide group, an acyloxy group having 1 to 6 carbon atoms, an alkoxy group having 1 to 6 carbon atoms (a methoxy group, an ethoxy group, and the like), a halogen atom (chlorine, bromine, and the like), an alkoxycarbonyl group having 2 to 7 carbon atoms (for example, a methoxycarbonyl group, an ethoxycarbonyl group, and a cyclohexyloxycarbonyl group), a cyano group, and a carbonic acid ester group (t-butyl carbonate and the like).

<$R^1$>

$R^1$ in General Formula (1) represents a single bond or a (m+n)-valent organic linking group. m+n is 3 to 10.

The examples of the (m+n)-valent organic linking group represented by the $R^1$ include groups composed of 1 to 100 carbon atoms, 10 or less nitrogen atoms, 50 or less oxygen atoms, 1 to 200 hydrogen atoms, and 20 or less sulfur atoms, and these groups may be substituted with a substituent.

The preferred specific examples of the (m+n)-valent organic linking group include groups (may include heterocyclic groups) composed for the following structural units or combinations thereof.

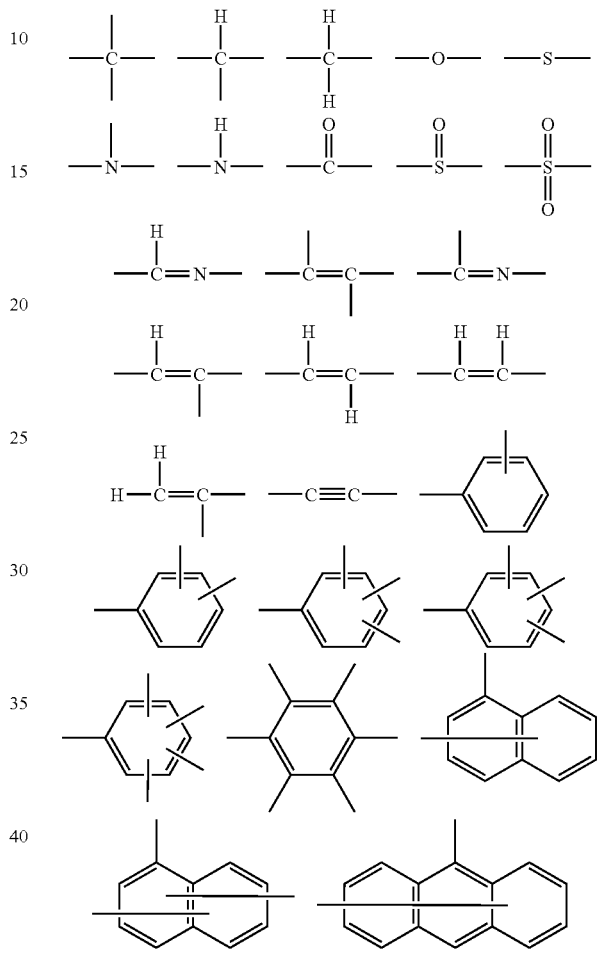

A group composed of 1 to 60 carbon atoms, 10 or less nitrogen atoms, 40 or less oxygen atoms, 1 to 120 hydrogen atoms, and 10 or less sulfur atoms is preferred, a group composed of 1 to 50 carbon atoms, 10 or less nitrogen atoms, 30 or less oxygen atoms, 1 to 100 hydrogen atoms, and 7 or less sulfur atoms is more preferred, and a group composed of 1 to 40 carbon atoms, 8 or less nitrogen atoms, 20 or less oxygen atoms, 1 to 80 hydrogen atoms, and 5 or less sulfur atoms is especially preferred as the (m+n)-valent organic linking group.

When (m+n)-valent organic linking group has a substituent, examples of preferred substituents include alkyl groups having 1 to 20 carbon atoms (a methyl group, an ethyl group, and the like), an aryl group having 6 to 16 carbon atoms (a phenyl group, a naphthyl group, and the like), a hydroxyl group, an amino group, a carboxyl group (an acetoxy group or the like), a sulfonamide group, an N-sulfonylamide group, an acyloxy group having 1 to 6 carbon atoms, an alkoxy group having 1 to 6 carbon atoms (a methoxy group, an ethoxy group, and the like), a halogen atom (chlorine, bromine, and the like), an alkoxycarbonyl group having 2 to 7 carbon atoms (for example, a methoxycarbonyl group, an ethoxycarbonyl group, and a cyclohexyloxycarbonyl group), a cyano group, and a carbonic acid ester group (t-butyl carbonate and the like).
Specific examples (1) to (17) of the (m+n)-valent organic linking group represented by $R^1$ are shown below. However, the invention is not limited to these examples.
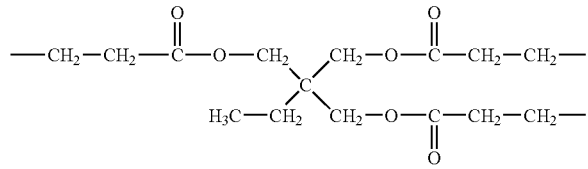
(1)
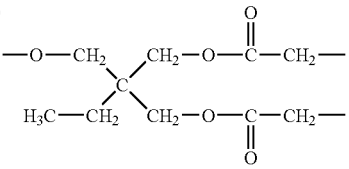
(2)
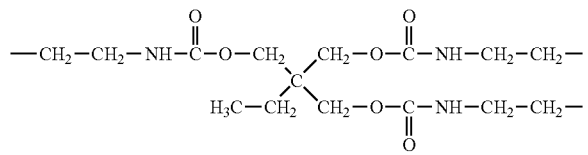
(3)
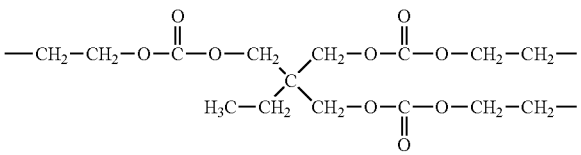
(4)
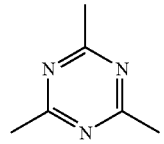
(5)
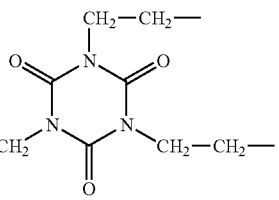
(6)
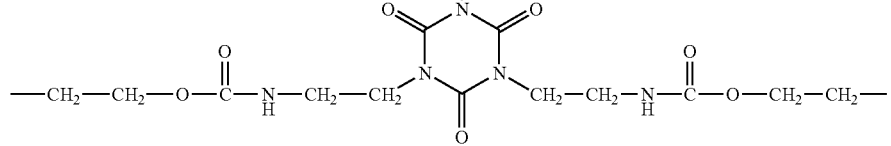
(7)
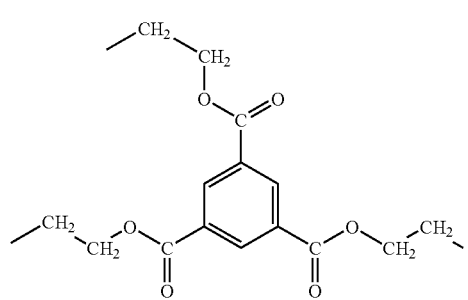
(8)
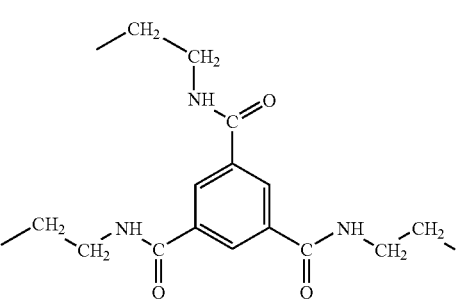
(9)
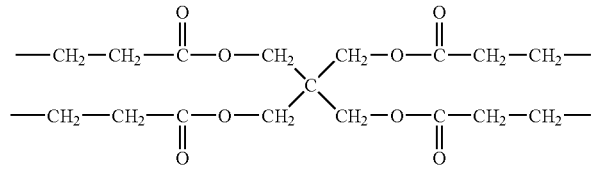
(10)
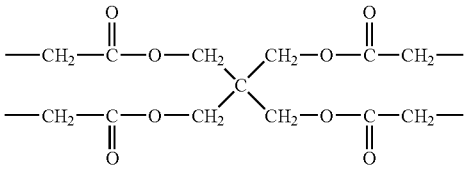
(11)
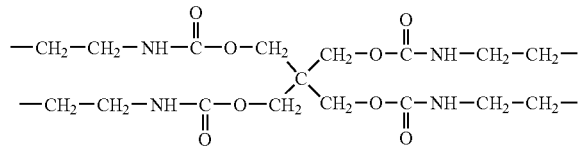
(12)
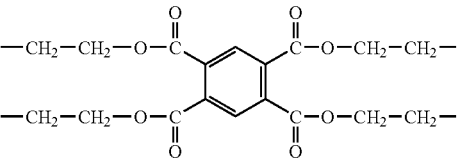
(13)

(14)
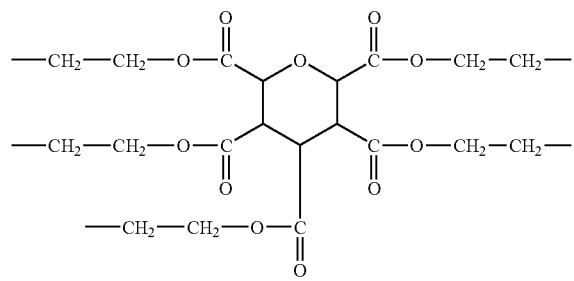
(15)
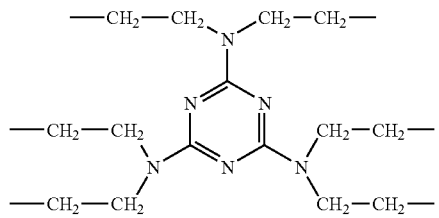
(16)
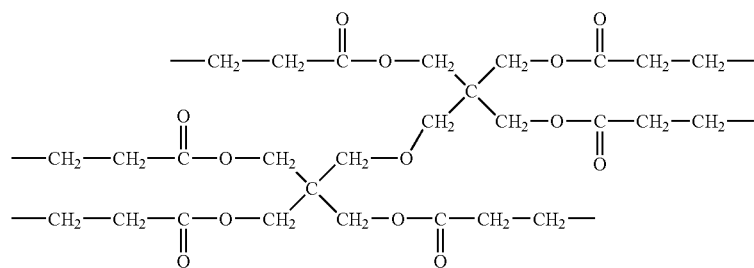
(17)
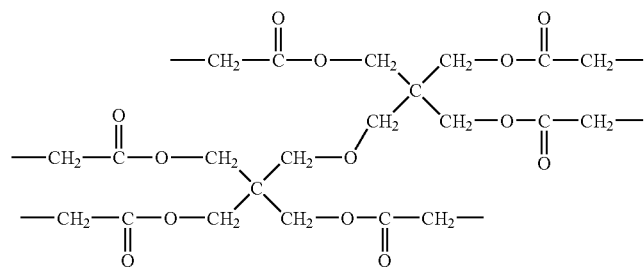
From among the specific examples (1) to (17), the following (m+n)-valent organic linking groups are especially preferred due to availability of starting materials, easiness of synthesis, and solubility in a variety of solvents.
(1)
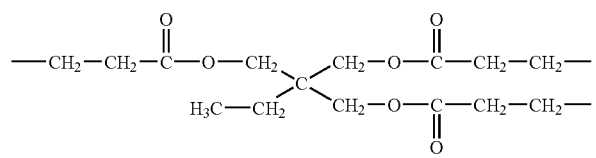
(2)
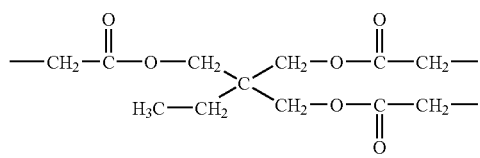
(10)
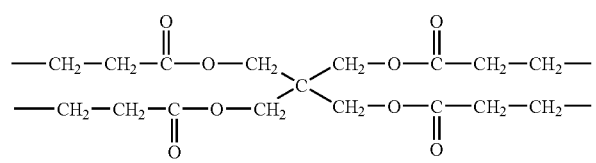
(11)
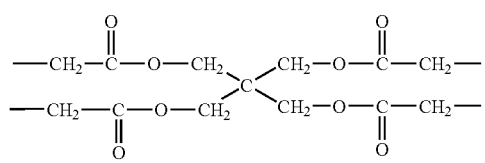
(16)
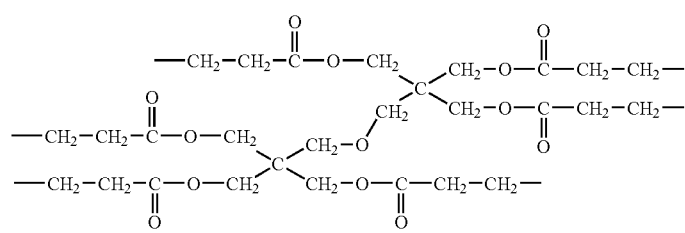

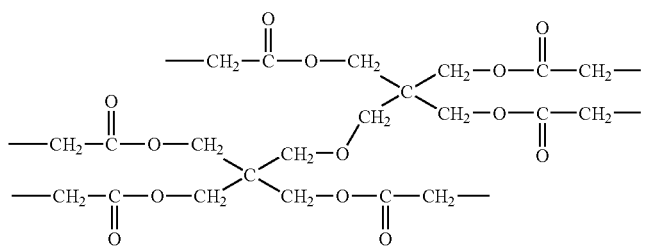

(17)

<m and n>

In the General Formula (1), "m" represents 1 to 8, preferably 1 to 5, more preferably 1 to 4, and especially preferably 1 to 3.

Further, "n" represents 2 to 9, preferably 2 to 8, more preferably 2 to 7, and especially preferably 3 to 6.

<$P^1$>

In the General Formula (1), $P^1$ represents a polymer skeleton that can be selected according to the object from among the well-known polymers. The m polymer skeletons $P^1$ may be the same or different.

In the polymer, the polymer skeleton is composed preferably of at least one selected from the group including polyvinyls, polyesters, polyethers, polyurethanes, polyamides, polyoxides, polysiloxanes and modified products thereof, or copolymers thereof [for example, polyether/polyurethane copolymers, copolymers of polyether/vinyl monomers, and the like (they may be random copolymers block copolymers, or graft copolymers), more preferably of at least one selected from the group including polyvinyls, polyesters, polyethers, polyurethanes and modified products thereof or copolymers thereof, and especially preferably polyvinyls.

The polymer is preferably soluble in an organic solvent. Where the polymer has low affinity for the organic solvent, for example, when a pigment dispersant is used, the affinity for the dispersion medium is weakened and an adsorption layer sufficient for dispersion stabilization cannot be ensured.

Examples of the vinyl monomers include (meth)acrylic acid esters, crotonic acid esters, vinyl esters, maleic acid diesters, fumaric acid diesters, itaconic acid diesters, (meth) acrylamides, styrenes, vinyl ethers, vinyl ketones, olefins, maleimides, (meth)acrylonitrile, and vinyl monomers having an acidic group.

Examples of (meth)acrylic acid esters include methyl (meth)acrylate, ethyl(meth)acrylate, n-propyl(meth)acrylate, isopropyl(meth)acrylate, n-butyl(meth)acrylate, isobutyl (meth)acrylate, t-butyl(meth)acrylate, amyl(meth)acrylate, n-hexyl(meth)acrylate, cyclohexyl(meth)acrylate, t-butylcyclohexyl(meth)acrylate, 2-ethylhexyl(meth)acrylate, t-octyl (meth)acrylate, dodecyl(meth)acrylate, octadecyl(meth) acrylate, acetoxyethyl(meth)acrylate, phenyl(meth)acrylate, 2-hydroxyethyl(meth)acrylate, 2-hydroxypropyl(meth)acrylate, 3-hydroxypropyl(meth)acrylate, 4-hydroxybutyl(meth) acrylate, 2-methoxyethyl(meth)acrylate, 2-ethoxyethyl (meth)acrylate, 2-(2-methoxyethoxy)ethyl(meth)acrylate, 3-phenoxy-2-hydroxypropyl(meth)acrylate, 2-chloroethyl (meth)acrylate, glycidyl(meth)acrylate, 3,4-epoxycyclohexylmethyl(meth)acrylate, vinyl(meth)acrylate, 2-phenyl vinyl(meth)acrylate, 1-propenyl(meth)acrylate, allyl(meth) acrylate, 2-aryloxyethyl(meth)acrylate, propalgyl(meth) acrylate, benzyl(meth)acrylate, diethylene glycol monomethyl ether(meth)acrylate, diethylene glycol monoethyl ether (meth)acrylate, triethylene glycol monomethyl ether(meth) acrylate, triethylene glycol monoethyl ether(meth)acrylate, polyethylene glycol monomethyl ether(meth)acrylate, polyethylene glycol monoethyl ether(meth)acrylate, β-phenoxyethoxyethyl(meth)acrylate, nonylphenoxypolyethylene glycol(meth)acrylate, dicyclopentenyl(meth)acrylate, dicyclopentenyloxyethyl(meth)acrylate, trifluoroethyl (meth)acrylate, octafluoropentyl(meth)acrylate, perfluorooctylethyl(meth)acrylate, dicyclopentanyl(meth)acrylate, tribromophenyl(meth)acrylate, tribromophenyloxyethyl (meth)acrylate, and γ-butyrolactone(meth)acrylate.

Examples of crotonic acid esters include butyl crotonate and hexyl crotonate.

Examples of vinyl esters include vinyl acetate, vinyl chloracetate, vinyl propionate, vinyl butyrate, vinyl methoxyacetate, and vinyl benzoate.

Examples of maleic acid diesters include dimethyl maleate, diethyl maleate, and dibutyl maleate.

Examples of fumaric acid diesters include dimethyl fumarate, diethyl fumarate, and dibutyl fumarate.

Examples of itaconic acid diesters include dimethyl itaconate, diethyl itaconate, and dibutyl itaconate.

Examples of (meth)acrylamides include (meth)acrylamide, N-methyl(meth)acrylamide, N-ethyl(meth)acrylamide, N-propyl(meth)acrylamide, N-isopropyl(meth)acrylamide, N-n-butylacryl(meth)acrylamide, N-t-butyl(meth) acrylamide, N-cyclohexyl(meth)acrylamide, N-(2-methoxyethyl)(meth)acrylamide, N,N-dimethyl(meth) acrylamide, N,N-diethyl(meth)acrylamide, N-phenyl(meth) acrylamide, N-nitrophenyl acrylamide, N-ethyl-N-phenyl acrylamide, N-benzyl(meth)acrylamide, (meth)acryloyl morpholine, diacetone acrylamide, N-methylol acrylamide, N-hydroxyethyl acrylamide, vinyl(meth)acrylamide, N,N-diallyl(meth)acrylamide, and N-allyl(meth)acrylamide.

Examples of styrenes include styrene, methylstyrene, dimethylstyrene, trimethylstyrene, ethylstyrene, isopropylstyrene, butylstyrene, hydroxystyrene, methoxystyrene, butoxystyrene, acetoxystyrene, chlorostyrene, dichlorostyrene, bromostyrene, chloromethylstyrene, hydroxystyrene protected with a group (for example, t-Boc) that can be deprotected with an acidic substance, methyl vinyl benzoate, and α-methylstyrene.

Examples of vinyl ethers include methyl vinyl ether, ethyl vinyl ether, 2-chloroethyl vinyl ether, hydroxyethyl vinyl ether, propyl vinyl ether, butyl vinyl ether, hexyl vinyl ether, octyl vinyl ether, methoxyethyl vinyl ether, and phenyl vinyl ether.

Examples of vinyl ketones include methyl vinyl ketone, ethyl vinyl ketone, propyl vinyl ketone, and phenyl vinyl ketone.

Examples of olefins include ethylene, propylene, isobutylene, butadiene, and isoprene.

Examples of maleimides include maleimide, butyl maleimide, cyclohexyl maleimide, and phenyl maleimide.

Examples of suitable vinyl monomers include the above-described (meth)acrylonitrile and also heterocyclic rings with a substituted vinyl group (for example, vinyl pyridine, N-vinyl pyrrolidone, and vinyl carbazole), N-vinyl formamide, N-vinyl acetamide, N-vinyl imidazole, vinyl caprolactone. Further, vinyl monomers having a functional group such as an urethane group, an urea group, a sulfonamide group, a phenol group, and an imide group can be also used. Examples of monomers having an urethane group or an urea group can be appropriately synthesized by using an addition reaction of an isocyanate group and a hydroxyl group or an amino group. More specifically, they can be appropriately synthesized by conducting an addition reaction of a monomer containing an isocyanate group with a compound containing one hydroxyl group or a compound containing one primary or secondary amine group, or by an addition reaction of a monomer containing a hydroxyl group or a monomer containing a primary or secondary amine group with monoisocyanate.

Examples of vinyl monomers having an acidic group include vinyl monomers having a carboxyl group, vinyl monomers having a sulfonic acid group, vinyl monomers having a phosphoric acid group, vinyl monomers containing a phenolic hydroxyl group, and vinyl monomers containing a sulfonamide group.

Examples of vinyl monomers having a carboxyl group include (meth)acrylic acid, vinylbenzoic acid, maleic acid, monoalkyl maleates, fumaric acid, itaconic acid, crotonic acid, cinnamic acid, and acrylic acid dimer. Further, addition reaction products of monomers having a hydroxyl group, such as 2-hydroxyethyl(meth)acrylate and a cyclic anhydride such as maleic anhydride, phthalic anhydride, and cyclohexanedicarboxylic acid anhydride, and ω-carboxypolycaprolactone mono(meth)acrylate can be also used. Further, anhydride-containing monomers such as maleic anhydride, itaconic anhydride, and citraconic anhydride may be used as precursors of the carboxyl group. Among them, from the standpoint of copolymerization ability, cost, and solubility, (meth)acrylic acid is especially preferred.

Examples of vinyl monomers having a sulfonic acid group include 2-acrylamide-2-methylpropanesulfonic acid.

Examples of vinyl monomers having a phosphoric acid group include mono(2-acryloyloxyethyl ester)phosphate and (1-methyl-2-acryloyloxyethyl ester)phosphate.

In accordance with the present invention, among the polymers represented by the General Formula (1), the polymers represented by the following General Formula (2) are preferred.

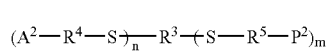

General Formula (2)

In the General Formula (2), $A^2$ is the same as $A^1$ in the General Formula (1), and the preferred forms thereof are also the same.

$R^4$ and $R^5$ independently represent a simple bond or a divalent organic linking group. The n bonds or groups of $R^4$ and the m bonds or groups of $R^5$ may independently be same or different. $R^4$ and $R^5$ are the same as the $R^2$ in the General Formula (1), and the preferred forms thereof are also the same.

$R^3$ in the General Formula (2) represents an (m+n)-valent organic linking group. m+n=3 to 10.

The preferred examples of the (m+n)-valent organic linking group represented by the $R^3$ include groups composed of 1 to 60 carbon atoms, 10 or less nitrogen atoms, 50 or less oxygen atoms, 1 to 100 hydrogen atoms, and 20 or less sulfur atoms. The organic linking group may be substituted with a substituent.

The (m+n)-valent organic linking group represented by the $R^3$ is the same as the (m+n)-valent organic linking group in the $R^1$, and the preferred forms thereof also the same.

In the General Formula (2), "m" represents 1 to 8, preferably 1 to 5, more preferably 1 to 4, and especially preferably 1 to 3; "n" represents 2 to 9, preferably 2 to 8, more preferably 2 to 7, and especially preferably 3 to 6.

In the General Formula (2), $P^2$ represents a polymer skeleton that can be selected according to the object from among the well-known polymers. The m polymer skeletons of $P^2$ may be the same or different. The preferred forms of the polymer are the same as those of $P^1$ in the General Formula (1), and the more preferred forms are also the same.

Among the polymers represented by the General Formula (2), the most preferred polymers have the below-described $R^3$, $R^4$, $R^5$, $P^2$, m and n.

$R^3$: the above-described specific examples (1), (2), (10), (11), (16) or (17).

$R^4$: a single bond or a divalent organic linking group (may be substituted) composed of the below-described structural units, or combinations thereof and containing 1 to 10 carbon atoms, 5 or less nitrogen atoms, 10 or less oxygen atoms, 1 to 30 hydrogen atoms, and 0 to 5 or less sulfur atoms, examples of the substituents including alkyl groups having 1 to 20 carbon atoms (a methyl group, an ethyl group, and the like), an aryl group having 6 to 16 carbon atoms (a phenyl group, a naphthyl group, and the like), a hydroxyl group, an amino group, a carboxyl group (an acetoxy group), a sulfonamide group, an N-sulfonylamide group, an acyloxy group having 1 to 6 carbon atoms, an alkoxy group having 1 to 6 carbon atoms (a methoxy group, an ethoxy group, and the like), a halogen atom (chlorine, bromine, and the like), an alkoxycarbonyl group having 2 to 7 carbon atoms (for example, a methoxycarbonyl group, an ethoxycarbonyl group, and a cyclohexyloxycarbonyl group), a cyano group, and a carbonic acid ester group (t-butyl carbonate and the like).

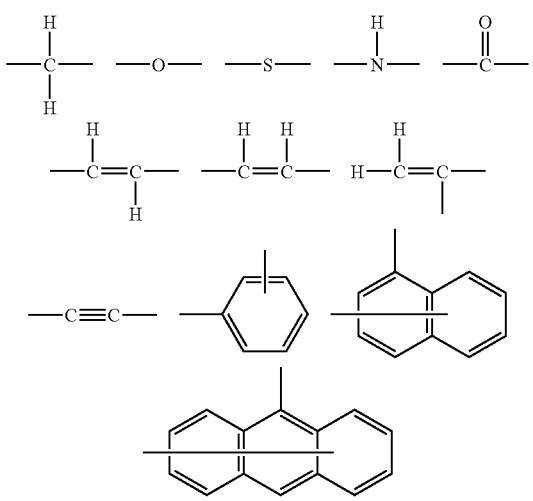

$R^5$: a single bond, an ethylene group, a propylene group, the following group (a) or the following group (b).

In the following groups, $R^{25}$ represents a hydrogen atom or a methyl group; l is 1 or 2.

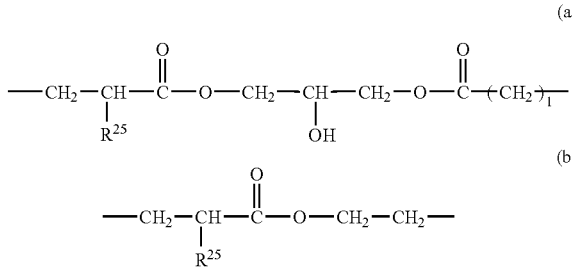

(a)

(b)

$P^2$: a vinyl polymer, a polyester, a polyether, a polyurethane, or modified products thereof.
m: 1 to 3.
n: 3 to 6.

The weight-average molecular weight of the polymer represented by the General Formula (1) is preferably 3,000 to 100,000, more preferably 5,000 to 80,000, and especially preferably 7,000 to 60,000.

Where the weight-average molecular weight is within these ranges, a sufficient effect is demonstrated by a plurality of adsorption sites introduced into the polymer ends, and excellent performance such as adsorption to a solid surface, formation of micellae, and surface activity is demonstrated. In particular when the polymer compound in accordance with the present invention is used as a pigment dispersant, excellent dispersivity and dispersion stability can be attained.

The polymers represented by the General Formula (1) (including those represented by the General Formula (2)) can be synthesized, for example, by the following methods, (1) a method of conducting a polymer reaction of a polymer having introduced as an end group a functional group selected from a carboxyl group, a hydroxyl group, and an amino group and an acid halide having a plurality of adsorption sites, an alkyl halide having a plurality of adsorption sites, or an isocyanate having a plurality of adsorption sites.

(2) a method of conducting a Michael addition reaction of a polymer having a carbon-carbon double bond introduced as an end bond and an mercaptan having a plurality of adsorption sites.

(3) a method of conducting a reaction of a polymer having a carbon-carbon double bond introduced as an end bond and the mercaptan having adsorption sites in the presence of a radical generating agent.

(4) a method of conducting a reaction of a polymer having a plurality of mercaptans introduced as end groups and a compound having a carbon-carbon double bond and the adsorption sites in the presence of a radical generating agent.

(5) a method of performing radical polymerization of vinyl monomers in the presence of a mercaptan compound having a plurality of adsorption sites.

Among the above-described methods, from the standpoint of easiness of synthesis, the methods (2), (3), (4), (5) are preferred, the methods (3), (4), (5) are more preferred, and the method (5) is especially preferred.

The preferred specific method (5) involves radical polymerization of vinyl monomers in the present of a compound represented by the following General Formula (3).

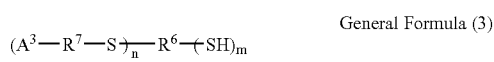

General Formula (3)

In the General Formula (3), $R^6$, $R^7$, $A^3$, "m", and "n" are the same as $R^3$, $R^4$, $A^2$, "m", and "n" in the General Formula (2), and the preferred forms thereof are also the same.

The compound represented by the General Formula (3) can be synthesized by the following methods, (6) a method of transforming a halide compound having a plurality of adsorption sites into a mercaptan compound (a method of conducting a reaction with thiourea and hydrolyzing, a method of conducting a direct reaction with NaSH, a method of conducting a reaction with $CH_3COSNa$ and hydrolyzing, and the like), and (7) a method of conducting an addition reaction of a compound having 3 to 10 mercaptan groups in a molecule and a compound having the adsorption sites and also having a functional group reactable with a mercaptan group. From the standpoint of easiness of synthesis, the method (7) is preferred.

The preferred examples of the functional group reactable with a mercaptan group in the method (7) include an acid halide, an alkyl halide, an isocyanate, and a carbon-carbon double bond.

It is especially preferred that the functional group reactable with a mercaptan group be a carbon-carbon double bond and that the addition reaction be a radical addition reaction. From the standpoint of reactivity with a mercaptan group, a monosubstituted or disubstituted vinyl group is more preferred as the carbon-carbon double bond.

Specific examples of compounds having 3 to 10 mercaptan groups in a molecule include the following compounds (18) to (34).

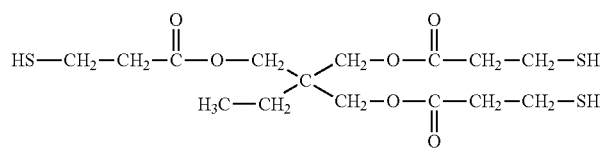

(18)

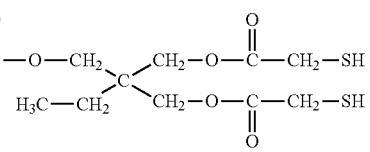

(19)

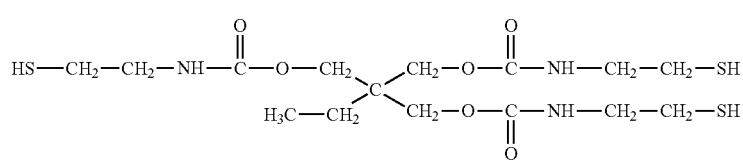

(20)

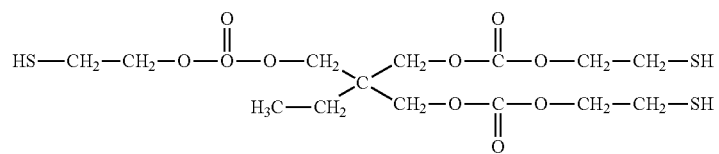
(21)
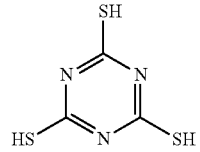
(22)
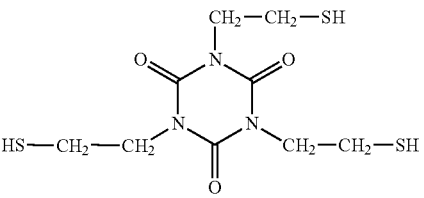
(23)
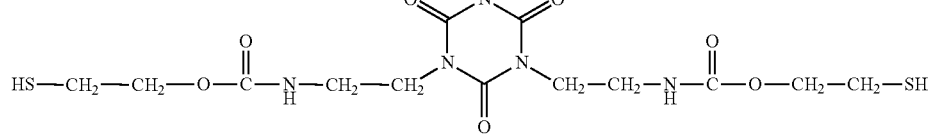
(24)
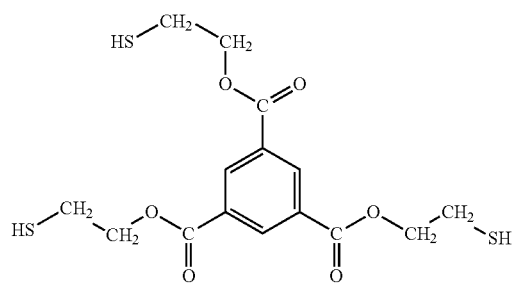
(25)
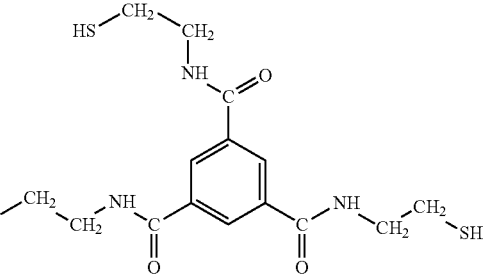
(26)
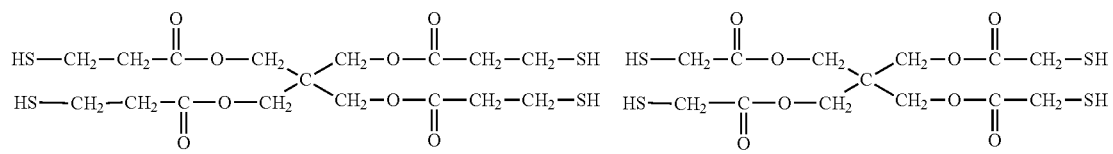
(27)
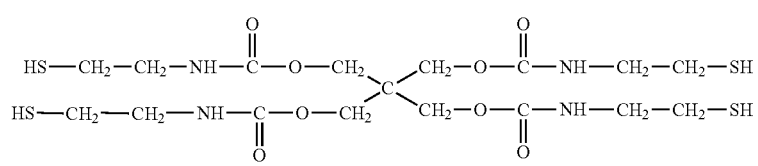
(28)
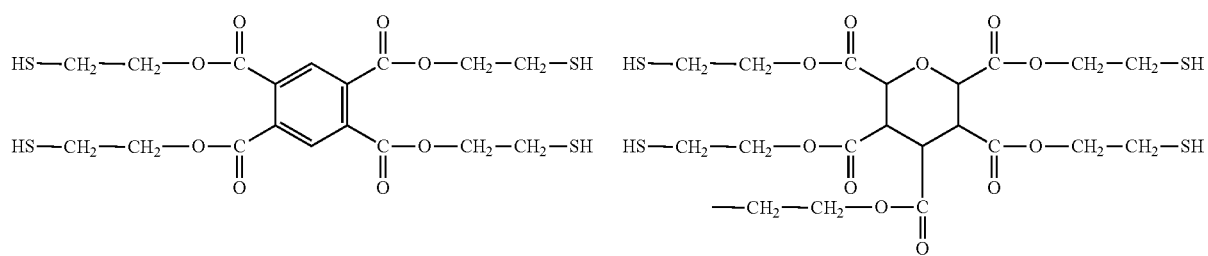
(29)
(30)
(31)

(32)
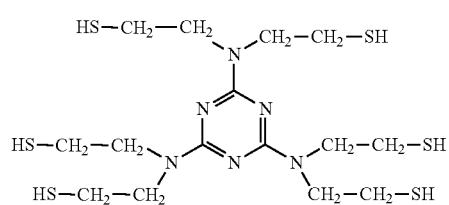
(33)
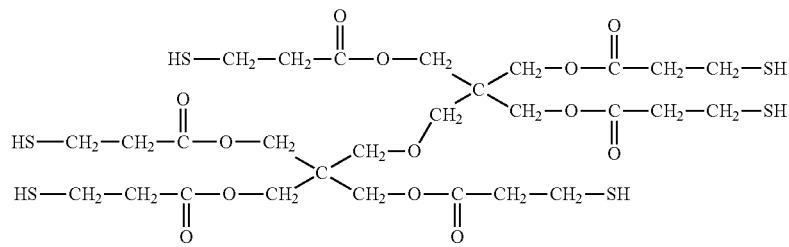
(34)
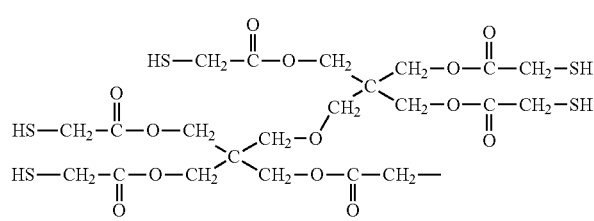
From among the specific examples (18) to (34) of the compounds, the following compounds are especially preferred due to availability of starting materials, easiness of synthesis, and solubility in a variety of solvents.
(18)
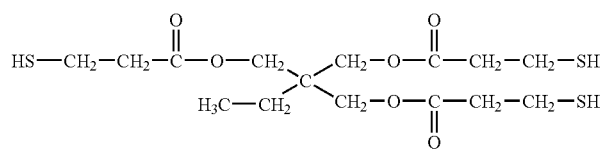
(19)
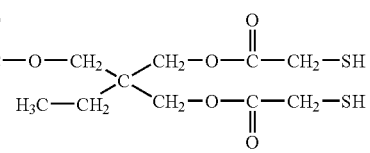
(27)
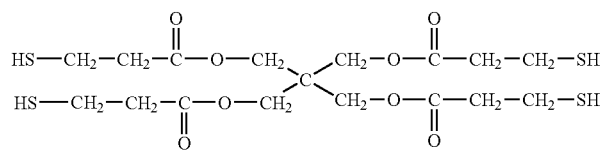
(28)
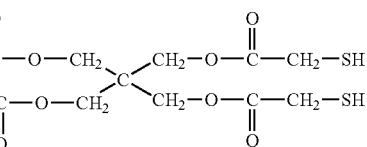
(33)
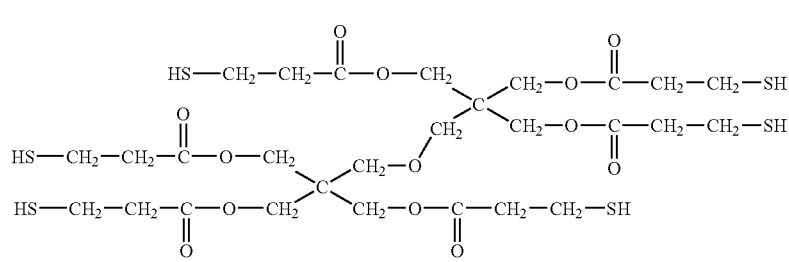
(34)
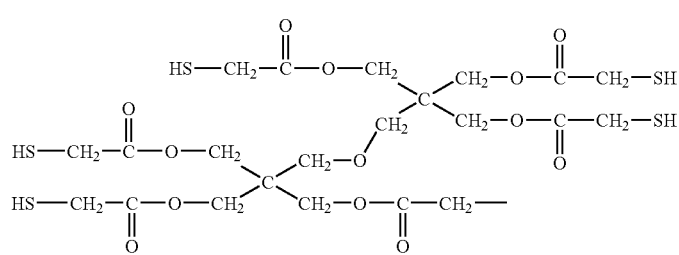

Compounds having the pigment adsorption structure and also having a carbon-carbon double bond (more specifically, compounds having at least one selected from an organic pigment structure, a heterocyclic structure, an acidic group, a group having a basic nitrogen atom, an urea group, an urethane group, a group having a coordinating oxygen atom, a hydrocarbon group having 4 or more carbon atoms, an alkoxysilyl group, an epoxy group, an isocyanate group, and a hydroxyl group and also having a carbon-carbon double bond) are not particularly limited, but the following compounds are preferred.

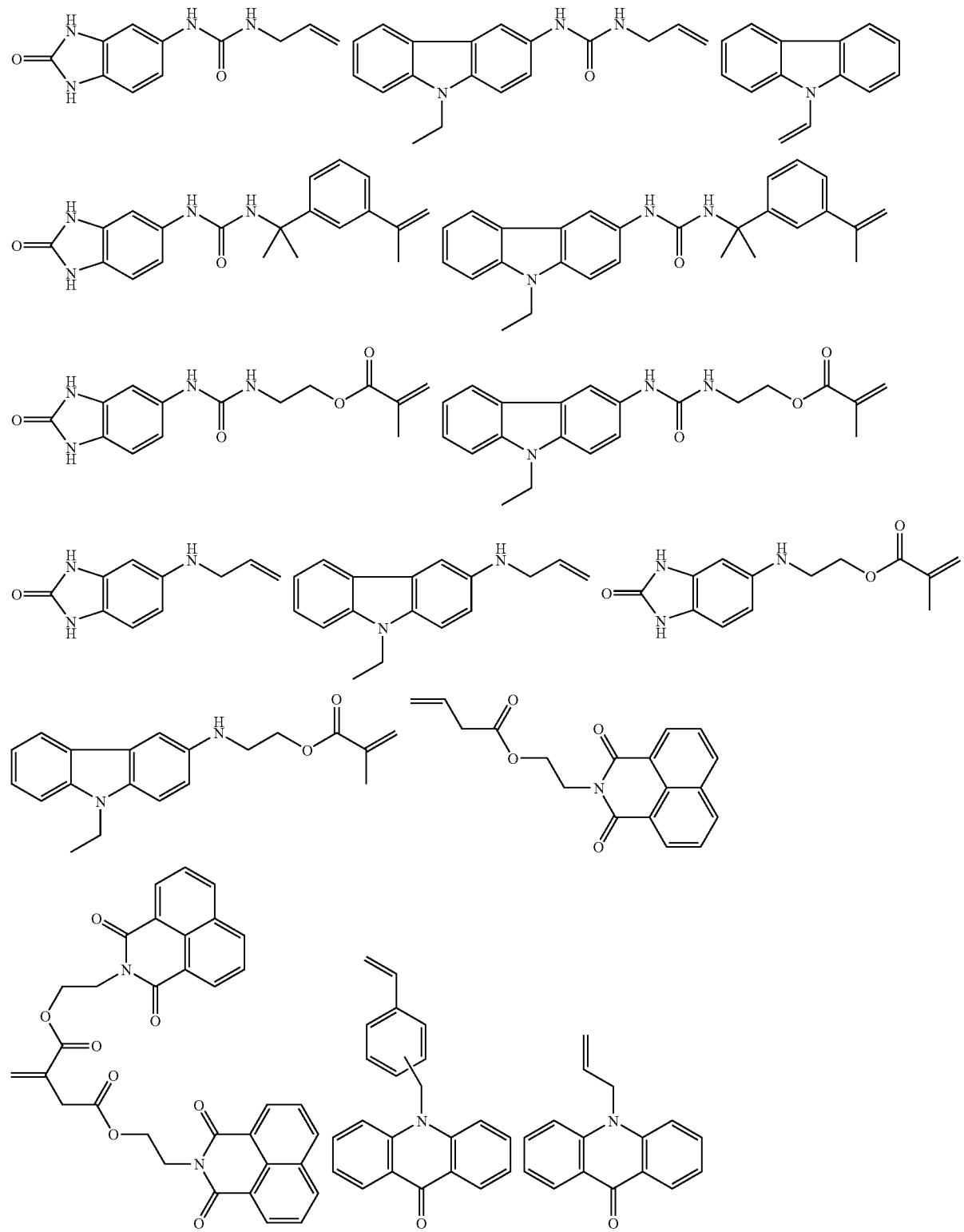

-continued
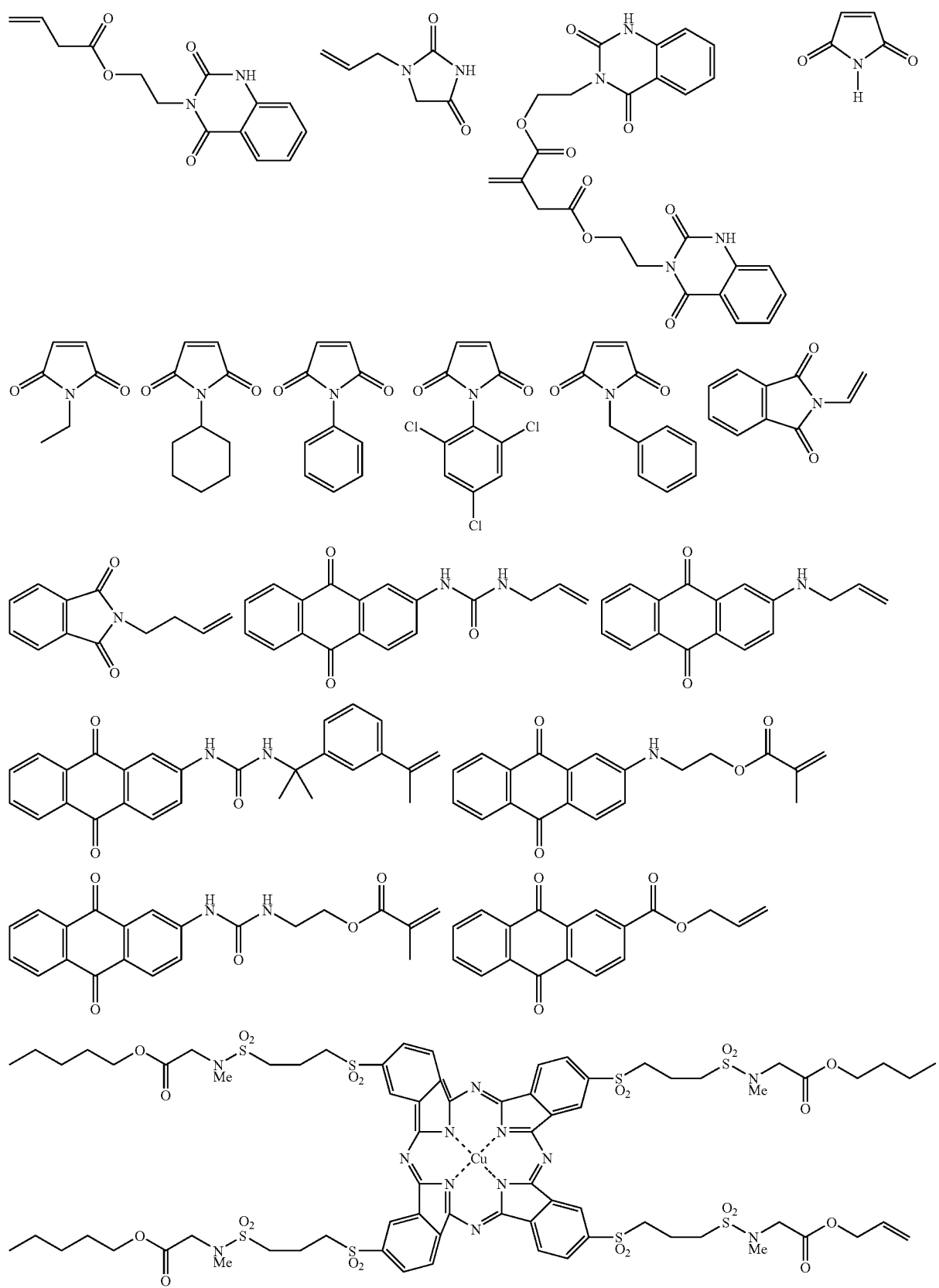

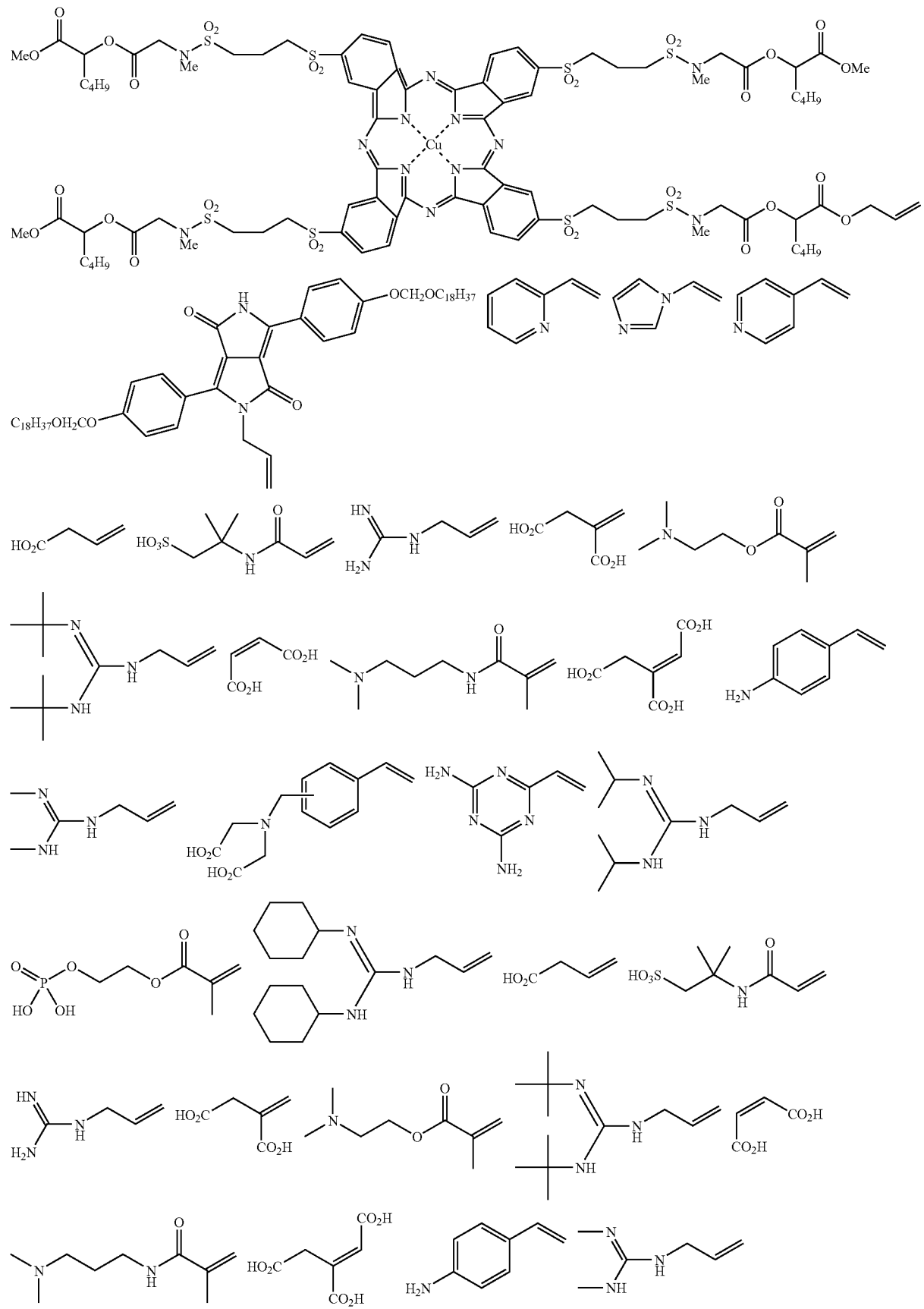

-continued

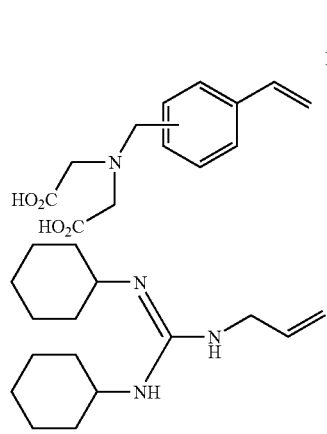 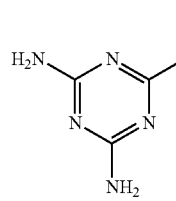 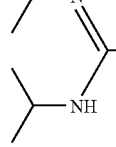 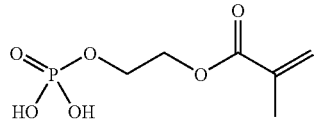

A radical reaction addition product of a compound having 3 to 10 mercaptan groups in a molecule and a compound having the pigment adsorption structure and also a carbon-carbon double bond can be obtained, for example, by a method (thiol-ene reaction method) according to which a compound having 3 to 10 mercaptan groups in a molecule and a compound having the pigment adsorption structure and also a carbon-carbon double bond are dissolved in an appropriate solvent and a radical generating agent is added thereto to induce an addition reaction at about 50° C. to 100° C.

An appropriate solvent for use in the thiol-ene method can be randomly selected according to the compound having 3 to 10 mercaptan groups in a molecule, the compound having the pigment adsorption structure and also a carbon-carbon double bond, and the radical addition reaction product that is produced.

Examples of suitable solvents include methanol, ethanol, propanol, isopropanol, 1-methoxy-2-propanol, 1-methoxy-2-propylacetal, acetone, methyl ethyl ketone, methyl isobutyl ketone, methoxypropyl acetate, ethyl lactate, ethyl acetate, acetonitrile, tetrahydrofuran, dimethylformamide, chloroform, and toluene. These solvents may be used individually or in combinations of two or more thereof.

Examples of suitable radical generating agents include azo compounds such as 2,2'-asobis(isobutyronitrile) (AIBN), 2,2'-asobis(2,4'-dimethylvaleronitrile), and 2,2'-asobisisobutyric acid dimethyl, peroxides such as benzoyl peroxide, and persulfates such as potassium persulfate and ammonium persulfate.

No particular limitation is placed on the vinyl monomer used in the method (5). For example, a vinyl monomer identical to that used in obtaining the polymer skeleton represented by $P^1$ in the General Formula (1) can be used.

A vinyl monomer of only one kind may be polymerized, or vinyl monomers of two or more kinds may be copolymerized.

Further, when applied to a photocurable composition, the polymer compound of the present invention is preferably obtained by copolymerizing vinyl monomers having one or more acidic groups and vinyl monomers not having one or more acidic groups.

The polymer that is the C component in accordance with the present invention can be polymerized by the well-known method using the above-described vinyl monomer and the compound represented by the General Formula (3) (may be referred to hereinbelow as "chain transfer agent"). For example, the polymer can be obtained by dissolving these vinyl monomer and chain transfer agent in an appropriate solvent, adding a radical polymerization initiator, and conducting polymerization in a solvent at a temperature of about 50° C. to 220° C. (solution polymerization method).

The suitable solvent that can be used in the aforementioned solution polymerization method can be randomly selected according to the type of the monomers used and the solubility of the produced copolymer. Examples of suitable solvents include methanol, ethanol, propanol, isopropanol, 1-methoxy-2-propanol, 1-methoxy-2-propyl acetate, acetone, methyl ethyl ketone, methyl isobutyl ketone, methoxypropyl acetate, ethyl lactate, ethyl acetate, acetonitrile, tetrahydrofuran, dimethylformamide, chloroform, and toluene. These solvents may be used individually or in a combination of two or more thereof.

Examples of radical polymerization initiators include azo compounds such as 2,2'-asobis(isobutyronitrile) (AIBN), 2,2'-asobis(2,4'-dimethylvaleronitrile), and 2,2'-asobisisobutyric acid dimethyl, peroxides such as benzoyl peroxide, and persulfates such as potassium persulfate and ammonium persulfate.

In accordance with the present invention, a compound of one kind or of two or more kinds may be used as the C component.

The content ratio of the C component in the ink composition in accordance with the present invention is preferably 1 wt. % to 100 wt. %, more preferably 5 wt. % to 50 wt. % based on the amount of the pigment added to the ink composition.

Where the content ratio of the C component is less than 1 wt. %, the dispersivity is insufficient and a dispersion with particles of a large size (aggregates) is sometimes obtained. Where the content ratio is more than 100 wt. %, the viscosity can increase because of extra polymer.

A well-known pigment dispersant can be used in addition to the C component in the ink composition in accordance with the present invention, as long as the effect of the invention is not degraded. The content ratio of such well-known pigment dispersant in the ink composition is preferably equal to or less than 50 wt. % with respect to the amount of the C component added to the ink composition.

Examples of such well-known dispersants (pigment dispersants) include polymer dispersants (for example, polyamidoamines and salts thereof, polycarboxylates and salts thereof, unsaturated acid esters with a high molecular weight, modified polyurethanes, modified polyesters, modified poly(meth)acrylates, (meth)acrylic copolymers, and naphthalenesulfonic acid formalin condensates), polyoxyethylene alkylphosphoric acid esters, polyoxyethylene alkylamine, alkanolamines, and pigment derivatives.

According to the structure thereof, the polymer dispersants can be classified into long-chain polymers, end-modified polymers, graft polymers, and block polymers.

The polymer dispersant acts to be adsorbed by the pigment surface, thereby preventing re-aggregation. Accordingly, the preferred structure is that of end-modified polymers, graft polymers, and block polymers having an anchor site for the pigment surface. In contrast, the pigment derivatives demonstrate an effect of enhancing the adsorption of the polymer dispersant by modifying the pigment surface.

Specific examples of the well-known dispersants (pigment dispersants) include Disperbyk-101 (polyamidoamine phosphate), 107 (carboxylic acid ester), 110 (polymer containing an acidic group), 130 (polyamide), 161, 162, 163, 164, 165, 166, and 170. (high-molecular copolymer), BYK-P104 and P105 (high-molecular unsaturated polycarboxylic acids) (all of the above are manufactured by BYK Chemie Co.); EFKA 4047, 4050, 4010, 4165 (polyurethanes), EFKA 4330, 4340 (block copolymers), 4400, 4402 (modified polyacrylates), 5010 (polyesteramide), 5765 (high-molecular polycarbonate), 6220 (fatty acid polyester), 6745 (phthalocyanine derivative), 6750 (azo pigment derivative (all of the above are manufactured by EFKA Chemicals Co.); AJISPER PB821, PB822 (manufactured by Ajinomoto Fine Chemical Co.); FLORENE TG-710 (urethane oligomer) and POLYFLOW No. 50E, No. 300 (acrylic copolymer) (all of the above are manufactured by Kyoeisha Chemical Co., Ltd.); DISPERON KS-860, 873SN, 874, #2150 (aliphatic polyhydric carboxylic acid), #7004 (polyether ester type), DA-703-50, DA-705, DA-725 (all of the above are manufactured by Kusumoto Chemicals Co., Ltd.); DEMOL RN, N (naphthalenesulfonic acid formalin heavy condensates), MS, C, SN-B (aromatic sulfonic acid formalin heavy condensate), HOMOGENOL L-18 (polycarboxylic acid type polymer), EMULGEN 920, 930, 935, 985 (polyoxyethylene nonylphenyl ether), ACETAMINE 86 (stearylamine acetate) (all of the above are manufactured by Kao Corporation); SOLSPERSE 5000 (phthalocyanine derivative), 22000 (azo pigment derivative), 13240 (polyester amine), 3000, 17000, 27000 (polymer having a functional part at the terminal thereof), 24000, 28000, 32000, 38500 (graft copolymer) (all of the above are manufactured by Lubrizol Corp.); and NIKOL T106 (polyoxyethylene sorbitan monooleate) and MYS-IEX (polyoxyethylene monostearate) (all of the above are manufactured by Nikko Chemicals Co., Ltd.).

<Polymerizable Compound (A)>

The polymerizable compound (A) (may be referred to hereinbelow as "A component" or "polymerizable compound") is not particularly limited, provided that it is a compound that can be polymerized and cured by providing an external stimulation, for example, some external energy, and this compound can be appropriately selected according to the object. Thus, monomers, oligomers, and polymers can be used. However, a variety of well-known polymerizable monomers that are well-known as photocationic polymerizable monomers and photoradical polymerizable monomers in which polymerization reaction is initiated by polymerization initiation species produced by the polymerization initiator (D) are preferred.

The polymerizable compound of one kind may be used, or the polymerizable compounds of two or more kinds may be used together with the object of regulating the reaction rate, physical properties of the ink and physical properties of the cured film.

The polymerizable compound may be a monofunctional compound or a polyfunctional compound.

—Photocation Polymerizable Monomers—

Examples of preferred photocation polymerizable monomers that can be used as the polymerizable compound include epoxy compounds, vinyl ether compound, and oxethane compounds described in JP-A Nos. 6-9714, 2001-31892, 2001-40068, 2001-55507, 2001-310938, 2001-310937, and 2001-220526.

The epoxy compounds may be monofunctional compounds and polyfunctional compounds.

Examples of the monofunctional epoxy compounds include phenyl glycidyl ether, p-tert-butylphenyl glycidyl ether, butyl glycidyl ether, 2-ethylhexyl glycidyl ether, allyl glycidyl ether, 1,2-butylene oxide, 1,3-butadiene monoxide, 1,2-epoxydodecane, epichlorohydrin, 1,2-epoxydecane, styrene oxide, cyclohexane oxide, 3-methacryloyloxymethyl cyclohexene oxide, 3-acryloyloxymethyl cyclohexene oxide, and 3-vinyl cyclohexene oxide.

Examples of the polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolak resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexane carboxylate, 2-(3,4-epoxycyclohexyl-5,5-spiro-3,4-epoxy)cyclohexane-metadioxane, bis(3,4-epoxycyclohexylmethyl)adipate, vinyl cyclohexane oxide, 4-vinyl epoxycyclohexane, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), dicyclopentadienediepoxide, di(3,4-epoxycyclohexylmethyl)ether of ethylene glycol, ethylenebis(3,4-epoxycyclohexyl carboxylate), dioctyl epoxyhexahydrophthalate, di-2-ethylhexyl epoxyhexahydrophthalate, 1,4-butanediol diglycidyl ether, 1,6-hexanediol diglycidyl ether, glycerin triglycidyl ether, trimethylolpropane triglycidyl ether, polyethylene glycol diglycidyl ether, polypropylene glycol diglycidyl ethers, 1,1,3-tetradecadiene dioxide, limonene dioxide, 1,2,7,8-diepoxyoctane, and 1,2,5,6-diepoxycyclooctane.

Among these epoxy compounds, from the standpoint of curing rate, the aromatic epoxy compounds and alicyclic epoxy compounds are preferred, and the alicyclic epoxy compounds are especially preferred.

The above-described vinyl ether compounds may be monofunctional vinyl ether compounds or polyfunctional vinyl ether compounds.

Specific examples of monofunctional vinyl ether compounds include methyl vinyl ether, ether vinyl ether, propyl vinyl ether, n-butyl vinyl ether, t-butyl vinyl ether, 2-ethylhexyl vinyl ether, n-nonyl vinyl ether, lauryl vinyl ether, cyclohexyl vinyl ether, cyclohexylmethyl vinyl ether, 4-methylcyclohexylmethyl vinyl ether, benzyl vinyl ether, dicyclopentenyl vinyl ether, 2-dicyclopentenoxyethyl vinyl ether, methoxyethyl vinyl ether, ethoxyethyl vinyl ether, butoxyethyl vinyl ether, methoxyethoxyethyl vinyl ether, ethoxyethoxyethyl vinyl ether, methoxypolyethylene glycol vinyl ether, tetrahydrofurfuryl vinyl ether, 2-hydroxyethyl vinyl ether, 2-hydroxypropyl vinyl ether, 4-hydroxybutyl vinyl ether, 4-hydroxymethyl cyclohexylmethyl vinyl ether, diethylene glycol monovinyl ether, polyethylene glycol vinyl ether, chloroethyl vinyl ether, chlorobutyl vinyl ether, chloroethoxyethyl vinyl ether, phenylethyl vinyl ether, and phenoxypolyethylene glycol vinyl ether.

Examples of polyfunctional vinyl ether compounds include divinyl ethers such as ethylene glycol divinyl ether, diethylene glycol divinyl ether, polyethylene glycol divinyl ether, propylene glycol divinyl ether, butylene glycol divinyl ether, hexanediol divinyl ether, bisphenol A alkylene oxide divinyl ether, and bisphenol F alkylene oxide divinyl ether, and polyfunctional divinyl ethers such as trimethylolethane trivinyl ether, trimethylolpropane trivinyl ether, ditrimethylolpropane tetravinyl ether, glycerin trivinyl ether, pentaerythritol tetravinyl ether, dipentaerythritol pentavinyl ether, dipentaerythritol hexavinyl ether, ethylene oxide adduct of trimethylolpropane trivinyl ether, propylene oxide adduct of trimethylolpropane trivinyl ether, ethylene oxide adduct of ditrimethylolpropane tetravinyl ether, propylene oxide adduct of ditrimethylolpropane tetravinyl ether, ethylene oxide adduct of pentaerythritol tetravinyl ether, propylene oxide adduct of pentaerythritol tetravinyl ether, ethylene oxide adduct of dipentaerythritol hexavinyl ether, and propylene oxide adduct of dipentaerythritol hexavinyl ether.

Among these vinyl ether compounds, from the standpoint of curability, adhesion to recording medium, and surface hardness of the formed image, di- or trivinyl ether compounds are preferred and divinyl ether compounds are especially preferred.

The oxetane compound means a compound having an oxetane ring and the preferred examples thereof are well-known oxetane compounds described in JP-A Nos. 2001-220526, 2001-310937, and 2003-341217.

In accordance with the present invention, compounds having 1 to 4 oxetane rings in the structure thereof are preferred as the oxetane compound. The advantage of using such compounds is in that the viscosity of the ink composition can be easily maintained with a range ensuring excellent handleability and a high adhesion of the cured ink to the recording medium can be obtained.

The oxetane compounds may be monofunctional oxetane compounds and polyfunctional oxetane compounds.

Examples of monofunctional oxetane compounds include 3-ethyl-3-hydroxymethyl oxetane, 3-(meth)acryloxymethyl-3-ethyl oxetane, (3-ethyl-3-oxycetanylmethoxy)methyl benzene, 4-fluoro-[1-(3-ethyl-3-oxetanylmethoxy)methyl]benzene, 4-methoxy-[1-(3-ethyl-3-oxetanylmethoxy)methyl] benzene, [1-(3-ethyl-3-oxetanylmethoxy)ethyl]phenyl ether, isobutoxymethyl(3-ethyl-3-oxetanylmethyl)ether, isobornyl oxyethyl(3-ethyl-3-oxetanylmethyl)ether, isobornyl(3-ethyl-3-oxetanylmethyl)ether, 2-ethylhexyl(3-ethyl-3-oxetanylmethyl)ether, ethyl diethylene glycol(3-ethyl-3-oxetanylmethyl)ether, dicyclopentadiene(3-ethyl-3-oxetanylmethyl)ether, dicyclopentenyl oxyethyl(3-ethyl-3-oxetanylmethyl)ether, dicyclopentenyl(3-ethyl-3-oxetanylmethyl)ether, tetrahydrofurfuryl(3-ethyl-3-oxetanylmethyl) ether, tetrabromophenyl(3-ethyl-3-oxetanylmethyl)ether, 2-tetrabromophenoxyethyl(3-ethyl-3-oxetanylmethyl)ether, tribromophenyl(3-ethyl-3-oxetanylmethyl) ether, 2-tribromophenoxyethyl(3-ethyl-3-oxetanylmethyl)ether, 2-hydroxyethyl(3-ethyl-3-oxetanylmethyl)ether, 2-hydroxypropyl(3-ethyl-3-oxetanylmethyl)ether, butoxyethyl(3-ethyl-3-oxetanylmethyl)ether, pentachlorophenyl(3-ethyl-3-oxetanylmethyl)ether, pentabromophenyl(3-ethyl-3-oxetanylmethyl)ether, and bornyl(3-ethyl-3-oxetanylmethyl)ether.

Examples of polyfunctional oxetane compounds include 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl]benzene, 1,2-bis[(3-ethyl-3-oxetanylmethoxy)methyl]ethane, 1, 3-bis [(3-ethyl-3-oxetanlymethoxy)methyl]propane, ethylene glycol bis(3-ethyl-3-oxetanylmethyl)ether, dicyclopentenyl bis(3-ethyl-3-oxetanylmethyl) ether, triethylene glycol bis(3-ethyl-3-oxetanylmethyl)ether, tetraethylene glycol bis(3-ethyl-3-oxetanylmethyl)ether, tricyclodecane diyldimethylene(3-ethyl-3-oxetanylmethyl)ether, trimethylol propane tris(3-ethyl-3-oxetanylmethyl)ether, 1,4-bis(3-ethyl-3-oxetanylmethoxy)butane, 1,6-bis(3-ethyl-3-oxetanylmethoxy)hexane, pentaerythritol tris(3-ethyl-3-oxetanylmethyl)ether, pentaerythritol tetrakis(3-ethyl-3-oxetanylmethyl)ether, polyethylene glycol bis(3-ethyl-3-oxetanylmethyl)ether, dipentaerythritol hexakis(3-ethyl-3-oxetanylmethyl)ether, dipentaerythritol pentakis(3-ethyl-3-oxetanylmethyl)ether, dipentaerythritol tetrakis(3-ethyl-3-oxetanylmethyl)ether, caprolactone-modified dipentaerythritol hexakis(3-ethyl-3-oxetanylmethyl)ether, caprolactone-modified dipentaerythritol pentakis(3-ethyl-3-oxetanylmethyl)ether, ditrimethylolpropane tetrakis(3-ethyl-3-oxetanylmethyl)ether, EO-modified bisphenol A bis(3-ethyl-3-oxetanylmethyl)ether, PO-modified bisphenol A bis(3-ethyl-3-oxetanylmethyl)ether, EO-modified hydrogenated bisphenol A bis(3-ethyl-3-oxetanylmethyl) ether, PO-modified hydrogenated bisphenol A bis(3-ethyl-3-oxetanylmethyl)ether, and EO-modified bisphenol F (3-ethyl-3-oxetanylmethyl)ether.

In addition to the above-described oxetane compounds, the compounds described in JP-A No. 2003-341217 (paragraphs [0021] to [0084]) can be also advantageously used in accordance with the present invention.

Among the above-described oxetane compounds, in accordance with the present invention, from the standpoint of viscosity and adhesivity, the preferred oxetane compound has 1 to 2 oxetane rings.

The ink composition in accordance with the present invention may use the above-described polymerizable compound of one kind or of two or more kinds. From the standpoint of effectively suppressing the shrinkage during ink curing, it is preferred that at least one oxetane compound and at least one compound selected from epoxy compounds and vinyl ether compounds can be used together.

—Photoradical Polymerizable Monomer—

Examples of photoradical polymerizable monomers that can be used as the polymerizable compound include (meth)acrylates, (meth)acrylamides, and aromatic vinyls. In accordance with the present invention, when both the "acrylate" and the "methacrylate", or any one of them are indicated, the term "(meth)acrylate" is used, and when both the "acryl" and the "methacryl" are indicated, the term "(meth)acryl" is used.

The (meth)acrylate may be a monofunctional (meth)acrylate or a polyfunctional (meth)acrylate.

Examples of monofunctional (meth)acrylates include hexyl(meth)acrylate, 2-ethylhexyl(meth)acrylate, tert-octyl(meth)acrylate, isoamyl(meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl(meth)acrylate, 2-ethylhexyl diglycol(meth)acrylate, butoxyethyl(meth)acrylate, 2-chloroethyl(meth)acrylate, 4-bromobutyl(meth)acrylate, cyanoethyl(meth)acrylate, benzyl(meth)acrylate, butoxymethyl(meth)acrylate, 3-methoxybutyl(meth)acrylate, alkoxymethyl(meth)acrylate, alkoxyethyl(meth)acrylate, 2-(2-methoxyethoxy)ethyl(meth)acrylate, 2-(2-butoxyethoxy)ethyl(meth)acrylate, 2,2,2-tetrafluoroethyl(meth)acrylate, 1H,1H,2H,2H-perfluorodecyl(meth)acrylate, 4-butylphenyl(meth)acrylate, phenyl(meth)acrylate, 2,4,5-tetramethylphenyl(meth)acrylate, 4-chrolophenyl(meth)acrylate, phenoxymethyl(meth)acrylate, phenoxyethyl(meth)acrylate, glycidyl(meth)acrylate, glycidyl oxybutyl(meth)acrylate, glycidyl oxyethyl(meth)acrylate, glycidyl oxypropyl(meth)

acrylate, tetrahydrofurfuryl(meth)acrylate, hydroxyalkyl (meth)acrylates, 2-hydroxyethyl(meth)acrylate, and 3-hydroxypropyl(meth)acrylate.

2-Hydroxypropyl(meth)acrylate, 2-hydroxybutyl(meth) acrylate, 4-hydroxybutyl(meth)acrylate, 3-hydroxypropyl (meth)acrylate, dimethylaminoethyl(meth)acrylate, diethylaminoethyl(meth)acrylate, dimethylaminopropyl(meth) acrylate, diethylaminopropyl(meth)acrylate, trimethoxysilylpropyl(meth)acrylate, trimethylsilylpropyl (meth)acrylate, polyethylene oxide monomethyl ether(meth) acrylate, oligoethylene oxide monomethyl ether(meth)acrylate, polyethylene oxide(meth)acrylate, oligoethylene oxide (meth)acrylate, oligoethylene oxide monoalkyl ether(meth) acrylates, polyethylene oxide monoalkyl ether(meth) acrylates, dipropylene glycol(meth)acrylate, polypropylene oxide monoalkyl ether(meth)acrylates, oligopropylene oxide monoalkyl ether(meth)acrylates, 2-methacryloyloxy ethyl succinate, 2-methacryloyloxy hexahydrophthalic acid, 2-methacryloyloxy ethyl-2-hydroxypropyl phthalate, butoxydiethylene glycol(meth)acrylate, trifluoroethyl(meth) acrylate, perfluorooctylethyl(meth)acrylate, 2-hydroxy-3-phenoxypropyl(meth)acrylate, EO-modified phenol(meth) acrylate, EO-modified cresol(meth)acrylate, EO-modified nonylphenol(meth)acrylate, PO-modified nonylphenol (meth)acrylate, and EO-modified-2-ethylhexyl(meth)acrylate.

The polyfunctional (meth)acrylates may be difunctional, trifunctional, tetrafunctional, pentafunctional, and hexafunctional.

Examples of difunctional (meth)acrylates include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethyl propanediol(meth) acrylate, ethoxylated cyclohexane methanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, hydroxypyvalic acid neopentyl glycol di(meth)acrylate, EO-modified bisphenol A di(meth)acrylate, bisphenol F polyethoxy di(meth) acrylate, polypropylene glycol di(meth)acrylate, oligopropylene glycol di(meth)acrylate, 1,4-butanediol di(meth) acrylate, 2-ethyl-2-butylpropane diol di(meth)acrylate, 1,9-nonane di(meth)acrylate, propoxydized ethoxylated bisphenol A di(meth)acrylate, and tricyclodecane di(meth) acrylate.

Examples of trifunctional (meth)acrylates include trimethylolpropane tri(meth)acrylate, trimethylolethane tri (meth)acrylate, trimethylolpropane alkylene oxide-modified tri(meth)acrylate, pentaerythritol tri(meth)acrylate, dipentaerythritol tri(meth)acrylate, trimethylolpropane tri((meth) acryloyloxypropyl)ether, isocyanuric acid alkylene oxide-modified tri(meth)acrylate, propionic acid dipentaerythritol tri(meth)acrylate, tri((meth)acryloyl oxyethyl)isocyanurate, hydroxypyvalaldehyde-modified dimethylol propane tri (meth)acrylate, sorbitol tri(meth)acrylate, propoxydized trimethylolpropane tri(meth)acrylate, and ethoxylated glycerin triacrylate.

Examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Examples of pentafunctional (meth)acrylates include sorbitol penta(meth)acrylate and dipentaerythritol penta(meth) acrylate.

Examples of hexafunctional (meth)acrylates include dipentaerythritol hexa(meth)acrylate, sorbitol hexa(meth) acrylate, alkylene oxide-modified hexa(meth)acrylate of phosphazene, and captolactone-modified dipentaerythritol hexa(meth)acrylate.

Examples of (meth)acrylamides include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth) acrylamide, N-isopropyl(meth)acrylamide, N-methylol (meth)acrylamide, N,N-dimethyl(meth)acrylamide, N,N-diethyl(meth)acrylamide, and (meth)acryloyl morpholine.

Examples of aromatic vinyls include styrene, methylstyrene, dimethylstyrene, trimethylstyrene, ethylstyrene, isorpropylstyrene, chloromethylstyrene, methoxystyrene, acetoxystyrene, chlorostyrene, dichlorostyrene, bromostyrene, vinylbenzoic acid methyl ester, 3-methylstyrene, 4-methylstyrene, 3-ethylstyrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-butoxycarbonylstyrene, 4-methoxystyrene, 4-t-butoxystyrene.

Further, vinyl esters (vinyl acetate, vinyl propionate, vinyl esters of versatic acids, and the like), allyl esters (allyl acetate and the like), halogen-containing monomers (vinylidene chloride, vinyl chloride, and the like), vinyl ethers (methyl vinyl ether, butyl vinyl ether, hexyl vinyl ether, methoxyvinyl ether, 2-ethylhexyl vinyl ether, methoxyethyl vinyl ether, cyclohexyl vinyl ether, chloroethyl vinyl ether, and the like), cyanovinyls ((meth)acrylonitrile and the like), olefins (ethylene, propylene, and the like) can be also used as the photo-radical polymerizable monomers.

Among them, from the standpoint of curing rate, (meth) acrylates and (meth)acrylamides are preferred, and (meth) acrylates with a functionality of four or more are more preferred. Further, from the standpoint of viscosity of the ink composition, it is preferred that a polyfunctional (meth)acrylate be used together with a monofunctional or difunctional (meth)acrylate and (meth)acrylamide.

The content ratio of the polymerizable compound in the ink composition is preferably 50 wt. % to 95 wt. %, more preferably 60 wt. % to 92 wt. %, especially preferably 70 wt. % to 90 wt. % based on the total solids of the ink composition.

<Pigment (B)>

The pigment (B) (sometimes also referred to hereinbelow simply as "component B" or "pigment") functional as a colorant of the ink composition. However, in accordance with the present invention, because the pigment with a fine particle size is uniformly and stably dispersed in the ink composition due to the functions of the C component, the ink composition in accordance with the present invention demonstrates excellent coloring ability and an image that excels in sharpness and weather resistance can be formed.

The pigment is not particularly limited and can be appropriately selected according to the object. For example, well-known organic pigments and inorganic pigments can be used. Further, resin particles dyed with a die, commercial pigment dispersions, and surface-treated pigments (for example, pigments dispersed in an insoluble resin as a dispersion medium, and pigments that are surface grafted with a resin) can be also used. Examples of suitable pigments are described in "Ganryo-no Jiten" ("Dictionary of Pigments") edited by Seishiro ITO (published in 2000); W. Herbst, K. Hunger "Industrial Organic Pigments", JP-A Nos. 2002-12607, 2002-188025, 2003-26978, and 2003-342503.

Examples of suitable organic pigments and inorganic pigments include yellow pigments, magenta pigments, blue, cyan pigments, green pigments, orange pigments, black pigments, and white pigments.

Yellow pigments are pigments that demonstrate yellow color; examples of such pigments include monoazo pigments such as C. I. Pigment Yellow 1 (Fast Yellow G and the like) and C. I. Pigment Yellow 74, disazo pigments such as C. I. Pigment Yellow 12 (Disazo Yellow AAA and the like) and C. I. Pigment Yellow 17, non-benzidine azo pigments such as C. I. Pigment Yellow 180, azo lake pigments such as C. I. Pigment Yellow 100 (Tartrazine Yellow Lake and the like), condensed azo pigments such as C. I. Pigment Yellow 95 (Condensed Azo Yellow GR and the like), acidic dye lake pigments such as C. I. Pigment Yellow 115 (Quinoline Yellow Lake and the like), basic dye lake pigments such as C. I. Pigment Yellow 18 (Thioflavine Lake and the like), anthraquinone pigments such as Flavanthrone Yellow (Y-24), isoindolinone pigments such as Isoindolinone Yellow 3RLT (Y-110), quinophthalone pigments such as quinophthalone Yellow (Y-138), isoindoline pigments such as Isoindoline Yellow (Y-139), nitroso pigments such as C. I. Pigment Yellow 153 (Nickel Nitroso Yellow and the like), and metal complex azomethine pigments such as C. I. Pigment Yellow 117 (Copper Azomethine Yellow and the like).

Magenta pigments are pigments that demonstrate red or magenta color; examples of such pigments include monoazo pigments such as C. I. Pigment Red 3 (Toluidine Red and the like), disazo pigments such as C. I. Pigment Red 38 (Pyrazolone Red B and the like), azo lake pigments such as C. I. Pigment Red 53:1 (Lake Red C and the like) and C. I. Pigment Red 57:1 (Brilliant Carmine 6B), condensed azo pigments such as C. I. Pigment Red 144 (Condensed Azo Lake BR and the like), acidic dye lake pigments such as C. I. Pigment Red 174 (Floxine B Lake and the like), basic dye lake pigments such as C. I. Pigment Red 81 (Rhodamine 6G' Lake and the like), anthraquinone pigments such as C. I. Pigment Red 177 (Dianthraquinonyl Red and the like), thioindigo pigments such as C. I. Pigment Red 88 (Thioindigo Bordeaux and the like), perinone pigments such as C. I. Pigment Red 194 (Perinone Red and the like), perylene pigments such as C. I. Pigment Red 149 (Perylene Scarlet and the like), quinacridone pigments such as C. I. Pigment Violet 19 (non-substituted quinacridone) and C. I. Pigment Red 122 (Quinacridone magenta and the like), isoindolinone pigments such as C. I. Pigment Red 180 (Isoindolinone Red 2BLT and the like), and alizarin lake pigments such as C. I. Pigment Red 83 (Mordant Lake and the like).

Cyan pigments are pigments that demonstrate blue or cyan color; examples of such pigments include disazo pigments such as C. I. Pigment Blue 25 (Dianisidine Blue and the like), phthalocyanine pigments such as C. I. Pigment Blue 15 (Phthalocyanine Blue and the like), acidic dye lake pigments such as C. I. Pigment Blue 24 (Peacock Blue Lake and the like), basic dye lake pigments such as C. I. Pigment Blue 1 (Bichlothia Pure Blue BO Lake and the like), anthraquinone pigments such as C. I. Pigment Blue 60 (Indanthrone Blue and the like), and alkali blue pigments such as C. I. Pigment Blue 18 (Alkali Blue V-5:1).

Green pigments are pigments that demonstrate green color; examples of such pigments include phthalocyanine pigments such as C. I. Pigment Green 7 (Phthalocyanine Green) and C. I. Pigment Green 36 (Phthalocyanine Green) and azo metal complex pigments such as C. I. Pigment Green 8 (Nitroso Green).

Orange pigments are pigments that demonstrate orange color; examples of such pigments include isoindoline pigments such as C. I. Pigment Orange 66 (Isoindoline Orange) and anthraquinone pigments such as C. I. Pigment Orange 51 (Dichloropyranthrone Orange).

Black pigments are pigments that demonstrate black color; examples of such pigments include carbon black, titanium black, and aniline black.

Examples of white pigments include basic lead carbonate ($2PbCO_3Pb(OH)_2$, the so-called silver white), zinc oxide (ZnO, the so-called zinc white), titanium oxide ($TiO_2$, the so-called titanium white), and strontium titanate ($SrTiO_3$, the so-called titanium strontium white). Titanium oxide has a specific gravity lower than that of other white pigments and also has a high refractive index and good chemical and physical stability. As a result, it demonstrates high hiding power and tinting power and also excels in endurance against acidic, alkali, and other environments. Therefore, it can be advantageously used as a pigment herein. Another white pigment (may be different from the above-described white pigments) may be used in combination with the titanium oxide.

A dispersing apparatus such as a ball mill, a sand mill, an attritor, a roll mill, a jet mill, a homogenizer, a paint shaker, a kneader, an agitator, a Henschel mixer, a colloid mill, and ultrasonic homogenizer, a pearl mill, and a wet jet mill can be advantageous used for dispersing the pigment.

In accordance with the present invention, it is especially preferred that the C component be added when the pigment is dispersed.

If necessary, a synergist corresponding to each pigment may be added as a dispersing aid when the pigment is dispersed. The content ratio of the dispersing aid in the ink composition is preferably 1 part by weight to 50 parts by weight per 100 parts by weight of the pigment.

No particular limitation is placed on a dispersion medium for use in dispersing the pigment in the ink composition, and the dispersion medium can be appropriately selected according to the object. For example, a polymerizable compound with a low molecular weight may be used as a dispersion medium, or a solvent may be used as the dispersion medium. However, because the ink composition in accordance with the present invention is a radiation-curable ink and the ink is cured after application to the recording medium, a solvent-free dispersion medium containing no solvent is preferred. This is because where a solvent remains in the cured ink image, resistance of the image to solvents is degraded and problems are associated with VOC (Volatile Organic Compound) of the remaining solvent. For this reason, from the standpoint of improving the suitability for dispersing and handleability of the ink composition, it is preferred that the above-described polymerizable compositions be used as the dispersion medium and that a polymerizable composition with the lowest viscosity be selected from among these polymerizable compositions.

The average particle size of the pigment is not particularly limited and can be appropriately selected according to the object. However, because the coloring ability improves with the decrease in particle size, it is preferred that the average particle size be 0.01 µm to 0.4 µm, more preferably 0.02 µm to 0.2 µm. Further, a particle size of 3 µm is preferred, and 1 µm is even more preferred as the maximum particle size of the pigment. The particle size of the pigment can be adjusted by appropriately selecting the pigment, dispersant, and dispersion medium and by setting appropriate dispersion conditions and filtration conditions. By controlling the particle size of the pigment, it is possible to prevent the head nozzle from clogging and maintain storage stability of the ink, ink transparency, and curing sensitivity. In accordance with the present invention, the C component that excels in dispersion ability and stability is contained. Therefore, a homogeneous and stable ink composition can be obtained even when the pigment composed of fine particles is used.

The particle size of the pigment in the ink composition can be measured by the well-known measurement method. More specifically, the measurements can be performed by a centrifugal precipitation optical transmission method, an X ray transmission method, a laser diffraction and scattering method, and a dynamic light scattering method.

The content ratio of the pigment in the ink composition is preferably 1 wt. % to 20 wt. %, more preferably 2 wt. % to 10 wt. % (calculated as solids).

<Other Components>

In addition to the above-described C component, polymerizable compound, and pigment, the ink composition in accordance with the present invention can contain other components that are appropriately selected according to the object.

Examples of such other components include polymerization initiators, sensitizing colorants, co-sensitizers, resins, surfactants, ultraviolet radiation absorbers, antioxidants, fading preventing agents, discharge stabilizers, adhesion improving agents, leveling additives, and matting agents. These components may be used individually or in combinations of two or more thereof.

—Polymerization Initiator—

It is preferred that the ink composition in accordance with the present invention contain a polymerization initiator.

A polymerization initiator of radical polymerization or cationic polymerization is preferred, and a photopolymerization initiator is especially preferred as the polymerization initiator.

The photopolymerization initiator is a compound that induces chemical changes via light action or interaction with electron excitation state of sensitizing colorant and generates at least one species from among radicals, acids, and bases.

Compounds that are sensitive to the active light rays used for irradiation, for example, ultraviolet light of 400 nm to 200 nm, far-infrared radiation, g rays, h rays, i rays, KrF excimer laser light, ArF excimer laser light, electron beams X rays, molecular beams, and ion beams can be appropriately selected and used as the photopolymerization initiator.

Specific examples of photopolymerization initiators include compounds described in Bruce M. Monroe et al. Chemical Revue, 93, 435 (1993); R. S. Davidson, Journal of Photochemistry and Biology A: Chemistry, 73.81 (1993); J. P Faussier "Photoinitiated Polymerization—Theory and Applications": Rapra Review vol. 9, Report, Rapra Technology (1998); M. Tsunooka et al., Prog. Polym. Sci., 21, 1 (1996); and chemically enhanced photoresists or compounds used for photocation polymerization such as described in "Imeging-yo Yuki Zairyo" ("Organic Materials for Imaging", edited by The Society for study of Organic Electronics Materials, published by Bunshin Shuppan (1993), page 187-192. Other examples include compounds that generate bond fragments by an oxidation or reduction mechanism via interaction with electron excitation state of sensitizing colorant, such compounds being described in F. D. Saeva, Topics in Current Chemistry, 156, 59 (1990), G. G. Maslak, Topics in Current Chemistry, 168, 1, (1993), H. B. Shuster et al., JACS, 112, 6329 (1990), I. D. F. Eaton et al, JACS, 102, 3298 (1980).

Among these photopolymerization initiators, the following compounds are preferred: (a) aromatic ketone compounds; (b) aromatic onium salts; (c) organic peroxides; (d) hexaaryl biimidazole compounds; (e) ketoxime ester compounds; (f) borate compounds; (g) azinium compounds; (h) metallocene compounds; (i) active ester compounds; and (j) compounds having a carbon-halogen bond.

Examples of the (a) aromatic ketone compounds include compounds having a benzophenone skeleton or thioxanthone skeleton that are described in "RADIATION CURING IN POLYMER SCIENCE AND TECHNOLOGY" J. P. FOUSSIER, J. F. RABEK (1993), p. 77-117, α-thiobenzophenone compounds described in Japanese Patent Application Publication (JP-B) No. 47-6416, benzoin ether compounds described in JP-B No. 47-3981, α-substituted benzoin compounds described in JP-B No. 47-22326, benzoin derivatives described in JP-B No. 47-23664, aroylphosphonic acid esters described in JP-A No. 57-30704, dialkoxybenzophenone described in JP-B No. 60-26483, benzoin ethers described in JP-B No. 60-26403 and JP-A No. 62-81345, α-aminobenzophenones described in JP-B No. 1-34242, U.S. Pat. No. 4,318,791, and European Patent No. 0284561 A1, p-di(dimethylaminobenzoyl)benzene described in JP-A No. 2-211452, thio-substituted aromatic ketones described in JP-A No. 61-194062, acylphosphine sulfide described in JP-B No. 2-9597, acylphosphine described in JP-B No. 2-9596, thioxanthones described in JP-B No. 63-61950, coumarines described in JP-B No. 59-42864, monoacylphosphineoxide described in JP-B Nos. 60-8047 and 63-40799, and bisacylphosphineoxide described in JP-A Nos. 3-101686, 5-345790 and 6-298818.

Examples of the (b) aromatic onium salt compounds include aromatic onium salts of the elements of Groups V, VI, and VII of the periodic table, more specifically N, P, As, Sb, Bi, O, S, Se, Te, or I. Specific examples of preferred compounds include iodonium salts described in European Patent No. 104143, U.S. Pat. No. 4,837,124, and JP-A Nos. 2-150848 and 2-96514, sulfonium salts, diazonium salts (benzene diazonium that may have a substituent, and the like), diazonium salt resins (formaldehyde resins of diazodiphenylamine) described in European Patent Nos. 370693, 233567, 297443, 297442, 279210, and 422570, and U.S. Pat. Nos. 3,902,144, 4,933,377, 4,760,013, 4,734,444, and 2,833, 827, N-alkoxypyridinium salts (for example, salts described in U.S. Pat. No. 4,743,528, JP-A Nos. 63-138345, 63-142345, and 63-142346, and JP-B 46-42363, more specifically 1-methoxy-4-phenylpyridinium tetrafluoroborate and the like), and the compounds described in JP-B Nos. 52-147277, 52-14278, and 52-14279. These compounds generate radicals or acids as active species.

Examples of the (c) organic peroxides include organic compounds having at least one oxygen-oxygen bond in a molecule. Specific examples of such compounds include ester peroxide compounds such as 3,3',4,4-tetra-(t-butylperoxycarbonyl)benzophenone, 3,3',4,4'-tetra-(t-amylperoxycarbonyl)benzophenone, 3,3',4,4'-tetra-(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

Examples of the (d) hexaarylbiimidazol compounds include rofin dimers described in JP-B Nos. 45-37377 and 44-86516. Specific examples include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

Examples of the (e) ketoxime ester compounds include 3-benzoyloxyiminobutane-2-one, 3-acetoxyiminobutane-2-one, 3-propionyloxyiminobutane-2-one, 2-acetoxyiminopentane-3-one, 2-acetoxyimino-1-phenylpropane-1-one, 2-benzoyloxyimino-1-phenylpropane-1-one, 3-p-toluenesulfonyloxyiminobutane-2-one, and 2-ethoxycarbonyloxyimino-1-phenylpropane-1-one.

Examples of the (f) borate compounds include the compounds described in U.S. Pat. Nos. 3,567,453 and 4,343,891 and European Patents Nos. 109,772 and 109,773.

Examples of the (g) azinium compounds include compounds having an N—O bond that are described in JP-A Nos. 63-138345, 63-142345, 63-142346, and 63-143537 and JP-B No. 46-42363.

Examples of the (h) metallocene compounds include titanocene compounds described in JP-A Nos. 59-152396, 61-151197, 63-41484, 2-249, and 2-4705, and iron-arene complexes described in JP-A Nos. 1-304453 and 1-152109.

Specific examples of titanocene compounds include di-cyclopentadienyl-Ti-di-chloride, di-cyclopentadienyl-Ti-bis-phenyl, di-cyclopentadienyl-Ti-bis-2,3,4,5,6-pentafluoropheny-1-yl, di-cyclopentadienyl-Ti-bis-2,3,5,6-tetrafluoropheny-1-yl, di-cyclopentadienyl-Ti-bis-2,4,6-trifluoropheny-1-yl, di-cyclopentadienyl-Ti-2,6-difluoropheny-1-yl, di-cyclopentadienyl-Ti-bis-2,4-difluoropheny-1-yl, di-methylcyclopentadienyl-Ti-bis-2,3,4,5,6-pentafluoropheny-1-yl, di-methylcyclopentadienyl-Ti-bis-2,3,5,6-tetrafluoropheny-1-yl, di-methylcyclopentadienyl-Ti-bis-2,4-difluoropheny-1-yl, bis(cyclopentadienyl)-bis(2,6-difluoro-3-(pyry-1-yl)phenyl) titanium, bis(cyclopentadienyl)-bis[2,6-difluoro-3-(mehtylsulfonamide)phenyl]titanium, and bis(cyclopentadienyl)-bis[2,6-difluoro-3-(N-butylbiaroyl-amino)phenyl]titanium.

Examples of the (i) active ester compounds include nitrobenzole ester compounds described in European Patents Nos. 0290750, 046083, 156153, 271851, 0388343, U.S. Pat. Nos. 3,901,710 and 4,181,531, and JP-A Nos. 60-198538 and 53-133022, iminosulfonate compounds described in European Patents Nos. 0199672, 84515, 199672, 044115, and 0101122, U.S. Pat. Nos. 4,618,564, 4,371,605, and 4,431,774, and JP-A Nos. 64-18143, 2-245756, and 4-365048, and also compounds described in JP-B Nos. 62-6223 and 63-14340 and JP-A No. 59-174831.

Examples of the (j) compounds having a carbon-halogen bond include compounds described by Wakabayashi et al. Bull. Chem. Soc. Japan, 42, 2924 (1969), compounds described in GB Patent No. 1388492, compounds described in JP-A No. 53-133428, compounds described in DE Patent No. 3337024, compounds described in F. C. Schaefer et al. J. Org. Chem. 29, 1527 (1964), compounds described in JP-A No. 62-58241, compounds described in JP-A No. 5-281728, compounds described in DE Patent No. 2641100, compounds described in DE Patent No. 3333450, compounds described in DE Patent No. 3021590, and compounds described in DE Patent No. 3021599.

The preferred examples of the (a) to (j) compounds are presented below.

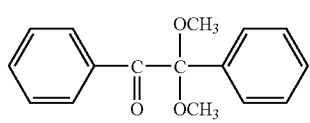

-continued

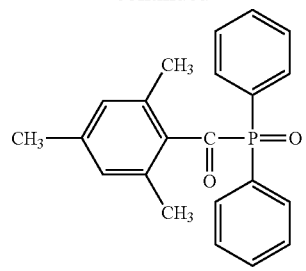

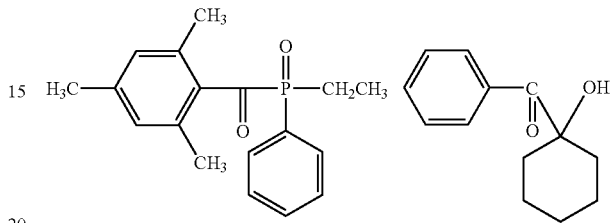

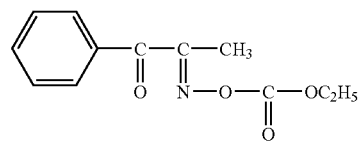

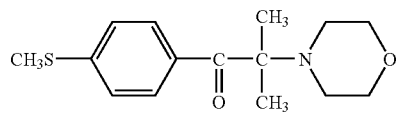

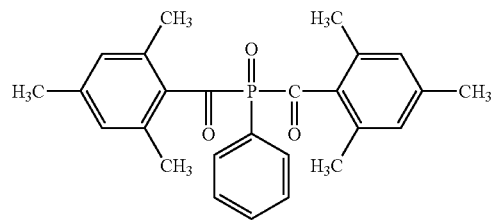

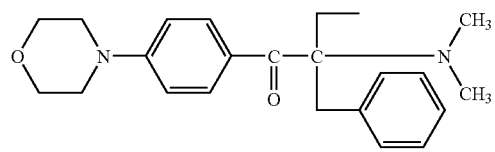

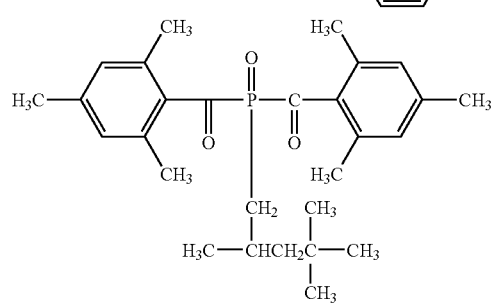

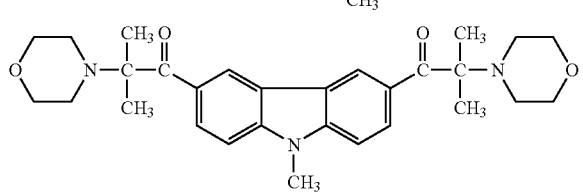

-continued
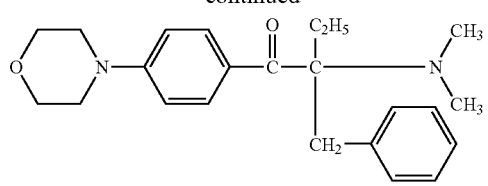
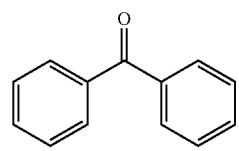
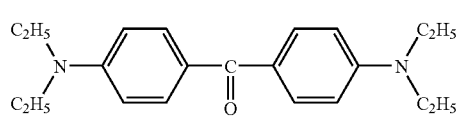
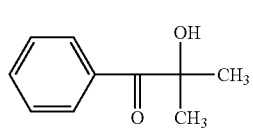
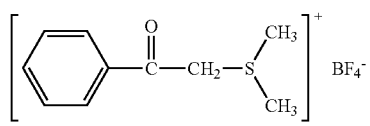
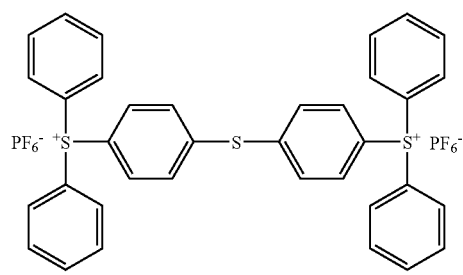
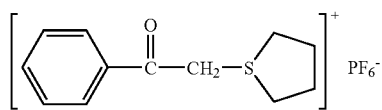
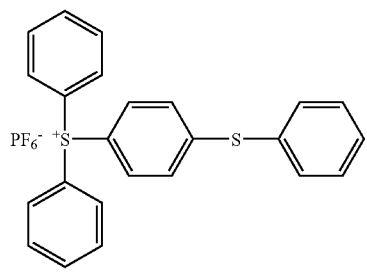
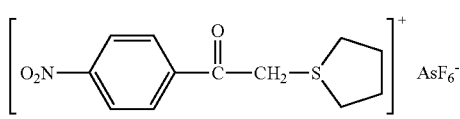
-continued
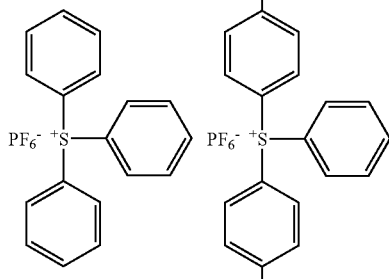
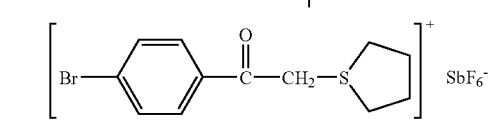
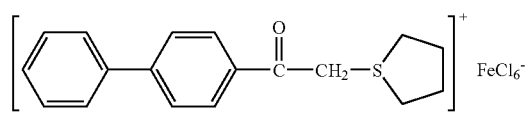
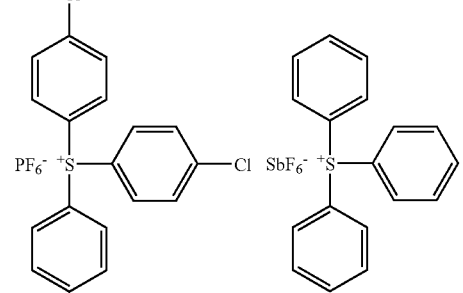
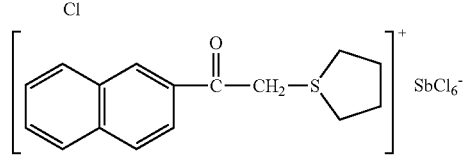
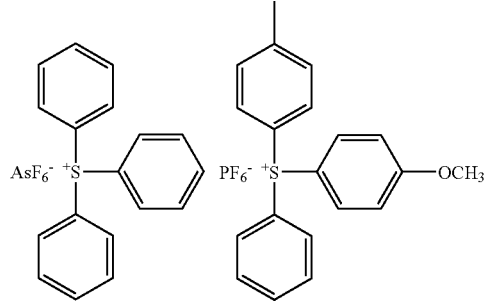
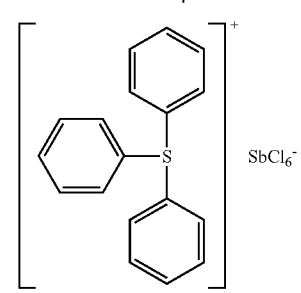

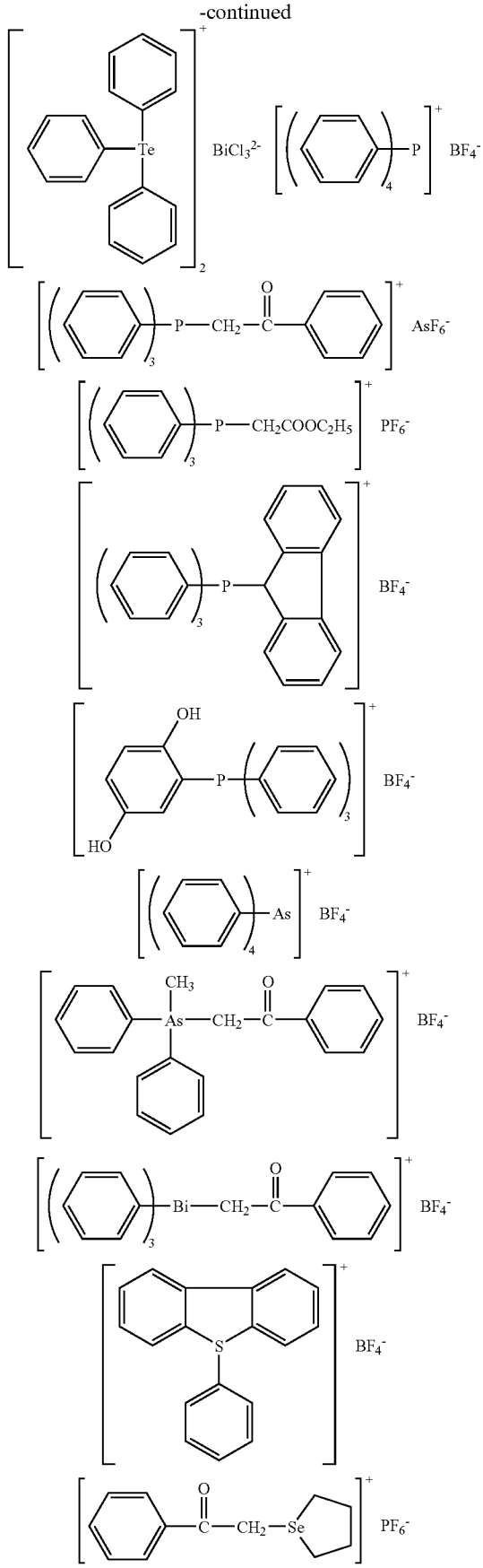
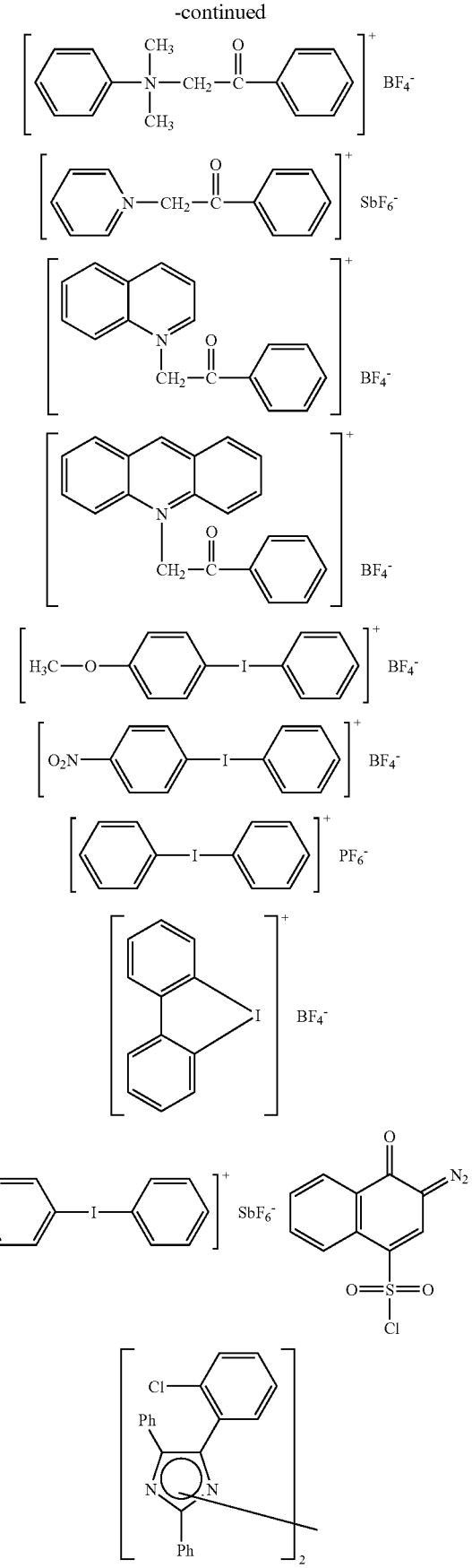

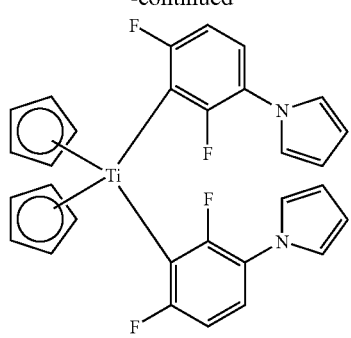
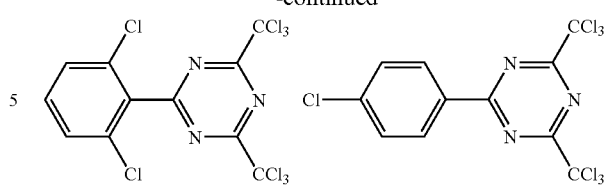
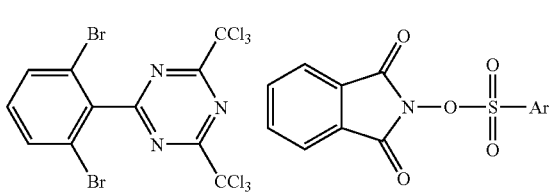
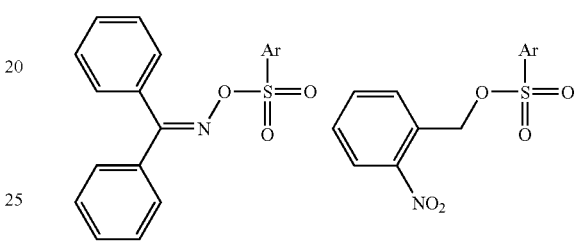
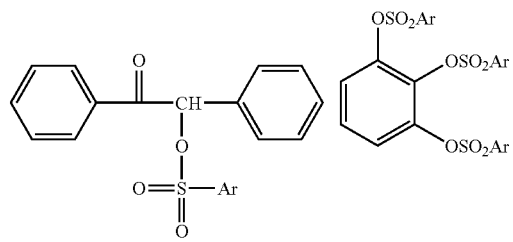
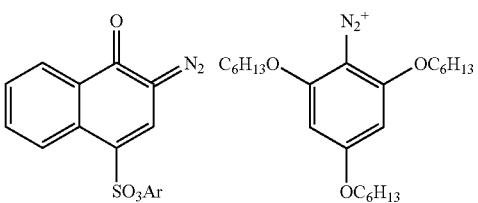
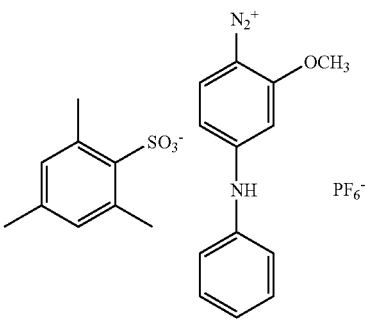
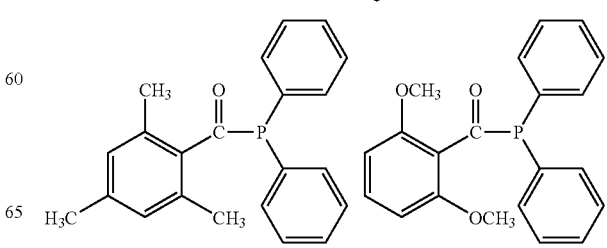

-continued

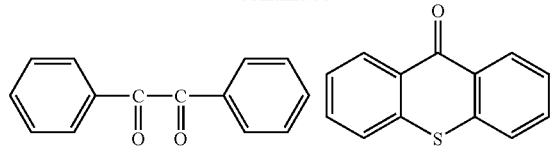

The above-described polymerization initiators may be used individually or in combinations of two or more thereof. The content ratio of the polymerization initiator in the ink composition is preferably 0.1 wt. % to 20 wt. %, more preferably 0.5 wt. % to 10 wt. %, and especially preferably 1 wt. % to 7 wt. % based on the total content of solids in the ink composition.

—Sensitizing Colorant—

When the ink composition in accordance with the present invention contains the photopolymerization initiator, it is preferred that a sensitizing colorant be contained in order to increase sensitivity of the photopolymerization initiator.

The preferred sensitizing colorant demonstrates absorption of light with a wavelength of 350 nm to 450 nm.

Examples of suitable sensitizing colorants include polynuclear aromatic compounds (for example, pyrene, perylene, triphenylene and anthracene), xanthenes (for example, fluorescein, eosin, erythrosine, rhodamine B, and rose bengal), cyanines (for example, thiacarbocyanine and oxacarbocyanine), merocyanines (for example, merocyanine and carbomerocyanine), thiazines (for example, thionine, methylene blue, and toluidine blue), acridines (for example, acridine orange, chloroflavine, and acriflavine), anthraquinones (for example, anthraquinone), squaliums (for example, squalium), and coumarines (for example, 7-diethylamino-4-methylcoumarin).

The preferred specific examples of the sensitizing colorants include compounds represented by the following General formulas (IX) to (XIII).

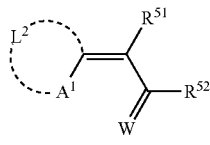 (IX)

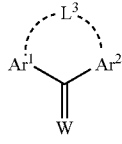 (X)

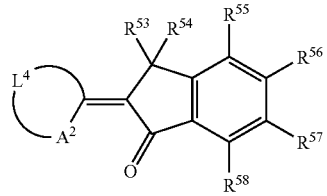 (XI)

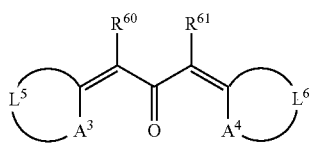 (XII)

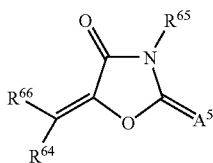 (XIII)

In the General formula (IX), $A^1$ represents a sulfur atom or $NR^{50}$. $R^{50}$ represents an alkyl group or an aryl group. $L^2$ represents a non-metal atomic group which, together with the adjacent $A^2$ and the adjacent carbon atom, form the basic nucleus of the colorant. $R^{51}$ and $R^{52}$ independently represent a hydrogen atom or a monovalent non-metal atomic group, and they may be bonded to each other to form the acidic nucleus of the dye. W represents an oxygen atom or a sulfur atom.

In the General Formula (X), $Ar^1$ and $Ar^2$ independently represent an aryl group, and are connected to each other via —$L^3$—. $L^3$ represents —O— or —S—. W has the same meaning as in the General Formula (IX).

In the General Formula (XI), $A^2$ represents a sulfur atom or $NR^{59}$, and $L^4$ represents a non-metal atomic group which, together with the adjacent $A^2$ and the adjacent carbon atom, form the basic nucleus of the colorant. $R^{53}$, $R^{54}$, $R^{55}$, $R^{56}$, $R^{57}$ and $R^{58}$ independently represent a monovalent non-metal atomic group. $R^{59}$ represents an alkyl group or an aryl group.

In the General Formula (XII), $A^3$ and $A^4$ independently represent —S—, $NR^{62}$—, or $NR^{63}$—. $R^{62}$ and $R^{63}$ independently represent a substituted or unsubstituted alkyl group or a substituted or unsubstituted aryl group. $L^5$ and $L^6$ independently represent a non-metal atomic group which, together with the adjacent $A^3$, $A^4$ and the adjacent carbon atom, forms the basic nucleus of the dye. $R^{60}$ and $R^{61}$ independently represent a hydrogen atom or a monovalent non-metal atomic group, and they may be bonded to each other to form an aliphatic or aromatic ring.

In the General Formula (XIII), $R^{66}$ represents an optionally substituted aromatic ring or hetero ring. $A^5$ represents an oxygen atom, a sulfur atom or $NR^{67}$—. $R^{64}$, $R^{65}$ and $R^{67}$ independently represent a hydrogen atom or a monovalent non-metal atomic group. $R^{67}$ and $R^{64}$, and/or $R^{65}$ and $R^{67}$ may be bonded to each other to form an aliphatic or aromatic ring.

Specific examples of the compounds represented by the General Formulas (IX) to (XIII) include the following representative compounds A-1 to A-24.

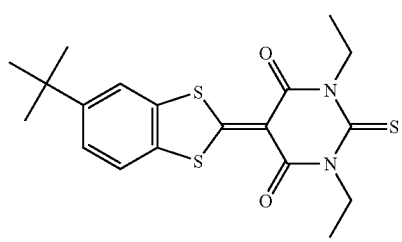 (A-1)

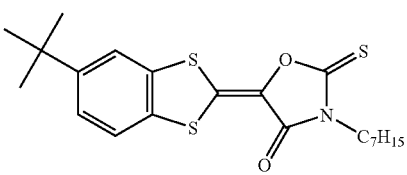 (A-2)

-continued
(A-3)
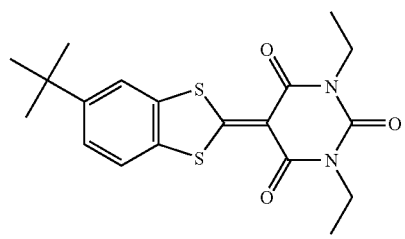
(A-4)
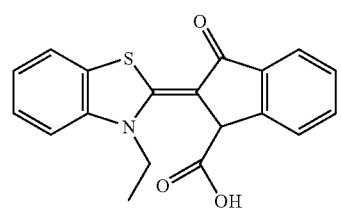
(A-5)
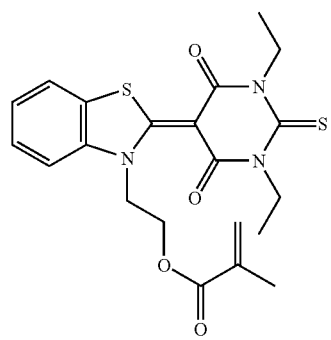
(A-6)
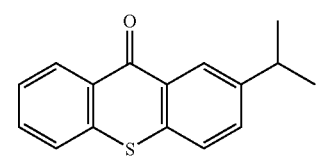
(A-7)
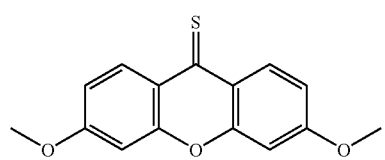
(A-8)
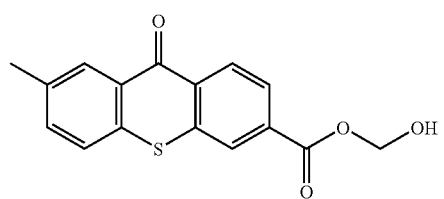
(A-9)
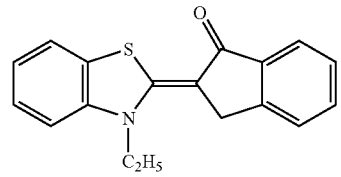
-continued
(A-10)
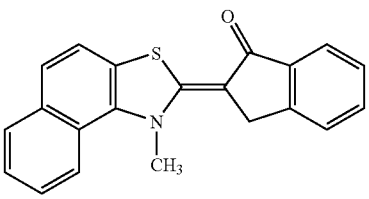
(A-11)
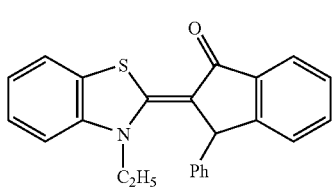
(A-12)
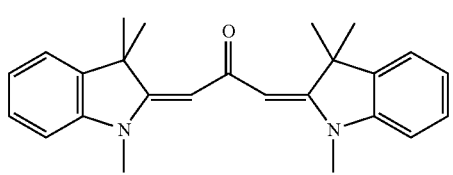
(A-13)
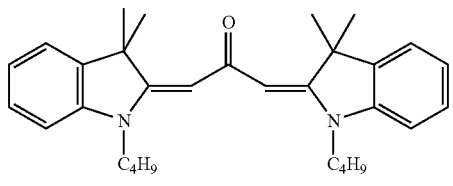
(A-14)
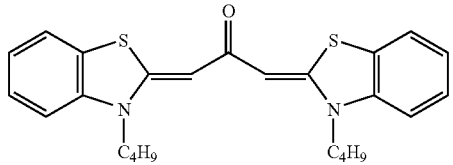
(A-15)
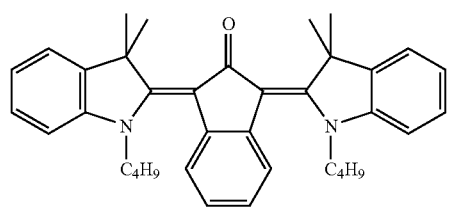
(A-16)
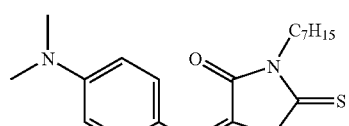
(A-17)
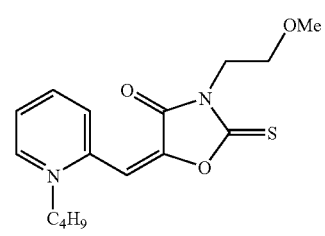

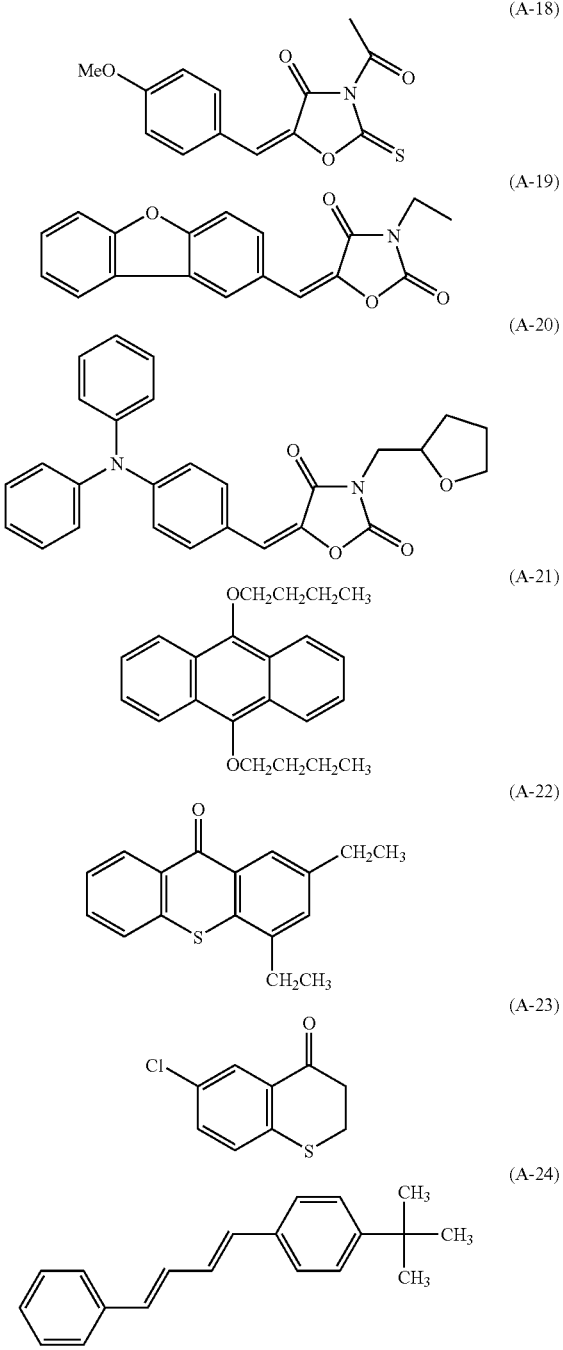

—Co-Sensitizer—

The ink composition in accordance with the present invention may contain a co-sensitizer to improve further the sensitivity and prevent oxygen from inhibiting the polymerization.

The examples of suitable co-sensitizers include amines (for example, compounds described in M. R. Sander et al., "Journal of Polymer Society", vol. 10, page 3173 (1972), JP-B No. 44-20189, JP-A Nos. 51-82102, 52-134692, 59-138205, 60-84305, 62-18537, and 64-33104, or Research Disclosure 33825). Specific examples of the amines include triethanolamine, ethyl ester of p-dimethylaminobenzoic acid, p-formyldimethylaniline, and p-methylthiodimethylaniline.

Other examples of the co-sensitizer include thiols or sulfides (for example, thiol compounds described in JP-A No. 53-702, JP-B No. 55-500806, and JP-A No. 5-142772, and disulfide compounds described in JP-A No. 56-75643). Specific examples of the thiols and sulfides include 2-mercaptobenzothiazole, 2-mercaptobenzoxazole, 2-mercaptobenzimidazole, 2-mercapto-4(3H)-quinazoline, and β-mercaptonaphthalene.

Still other examples of the co-sensitizers include amino acid compounds (for example, N-phenylglycine), organometallic compounds (for example, tributyltin acetate) described in JP-B No. 48-42965, a hydrogen donor described in JP-B No. 55-34414, a sulfur compound (for example, trithiane) described in JP-A No. 6-308727, a phosphorus compound (for example, diethylphosphite) described in JP-A No. 6-250387, and an Si—H or Ge—H compound described in Japanese Patent Application No. 6-191605.

—Resin—

The ink composition in accordance with the present invention may also contain a resin with the object of regulating film properties of the recorded image.

Examples of suitable resins include acrylic polymers, poly(vinyl butyral) resin, polyurethane resins, polyamide resins, polyester resins, epoxy resins, phenolic resins, polycarbonate resins, poly(vinyl butyral)resins, poly(vinyl formal)resins, shellac, vinyl resins, acrylic resins, rubber resins, waxes, and other natural resins. These resins may be used individually or in combinations of two or more thereof. Further, in accordance with the present invention, a well-known wax may be used instead of the resin.

—Surfactant—

The ink composition in accordance with the present invention may also contain a surfactant with the object of regulating the liquid properties of the ink composition.

Examples of suitable surfactants include nonionic surfactants, cationic surfactant, anionic surfactant, and betaine surfactants. Organic fluoro compounds can be also used.

—Ultraviolet Absorber—

From the standpoint of improving weather resistance and fading resistance of the recorded image, it is preferred that the ink composition in accordance with the present invention contain an ultraviolet absorber. Further, from the standpoint of improving the stability of the ink composition, it is preferred that the ink composition contain an antioxidant. From the standpoint of preventing the recorded image from fading, it is preferred that a fading preventing agent (for example, organic and metallic complex compounds) be contained. From the standpoint of discharge stability in ink-jet recording applications, it is preferred that a discharge stabilizer (for example, electrically conductive salts such as potassium thiocyanate, lithium nitrate, ammonium thiocyanate, and dimethylamine hydrochloride) be contained. Further, from the standpoint of improving adhesion to the recording medium, it is preferred that an adhesion improving agent (for example, a very small amount of an organic solvent or a tackifier that does not hinder polymerization) be contained. Further, if necessary, a leveling additive and a matting agent may be contained.

<Physical Properties>

—Viscosity—

The viscosity of the ink composition in accordance with the present invention is not particularly limited and can be appropriately selected according to the object. With consideration for discharge ability, the viscosity is preferably 30 mPa·s or less, more preferably 20 mPa·s or less.

Where the viscosity is more than 30 mPa·s, the discharge stability can be degraded.

Further, the viscosity of the ink composition in accordance with the present invention at room temperature (25° C.) is preferably 200 mPa·s or less, more preferably 100 mPa·s or less.

By setting a high viscosity at room temperature (25° C.), it is possible to prevent ink permeation into the recording medium, reduce the mount of unreacted monomers, reduce the malodor, and prevent dot bleeding during collision of the ink droplets with the medium, thereby making it possible to obtain high image quality even when a porous recording medium is used. On the other hand, where the viscosity at room temperature (25° C.) is more than 200 mPa·s, problems are sometimes associated with the delivery of the ink composition.

The viscosity can be measured using a conical flat-type rotary viscometer (E-type viscometer).

—Surface Tension—

The surface tension of the ink composition in accordance with the present invention is not particularly limited and can be appropriately selected according to the object. For example, a surface tension is preferably 20 mN/m to 30 mN/m, more preferably 23 mN/m to 28 mN/m. When the ink composition is recorded on a variety of recording media such as polyolefins, PET, coated paper, and non-coated paper, from the standpoint of bleeding and permeation, it is preferred that the surface tension be 20 mN/m or more, and from the standpoint of wetting ability, the preferred surface tension is 30 mN/m or less.

The surface tension can be measured with a surface tension meter based on the Wilhelmy method or a Du Nouy surface tension meter.

—Manufacture—

A method for manufacturing the ink composition in accordance with the present invention is not particularly limited and can be appropriately selected according to the object. For example, the ink composition can be manufactured by mixing the above-described components. The mixing can be carried out by a well-known method using a well-known mixing apparatus or the like.

—Use—

The ink composition in accordance with the present invention can be advantageously used as ink for image recording of various types and is particularly suitable as an ink composition for ink-jet recording. In this case, image recording is performed by printing the ink composition on a recording medium with an ink-jet printer and then irradiating the ink composition used in the print image (recorded image) with the active radiation to cure the ink composition.

Because the recorded image matter obtained using the ink composition in accordance with the present invention is cured by irradiating the image zone with the active radiation such as ultraviolet radiation, the image zone has a high strength. Therefore, the ink composition can be advantageously used not only for image recording (image formation), but also for a variety of other applications, for example, to form an ink receiving layer (image portions) of a planographic printing plate.

—Ink-Jet Recording—

Ink-jet recording using the ink composition in accordance with the present invention will be explained below.

A method and conditions of the ink-jet recording are not particularly limited and can be appropriately selected according to the object. For example, from the standpoint of discharge stability, it is preferred that the ink composition in accordance with the present invention be heated to a temperature of 40° C. to 80° C., adjusted to a viscosity of 30 mPa·s or less, and then discharged from an ink nozzle head. Generally, radiation-curable ink compositions such as the ink composition in accordance with the present invention have a viscosity higher than that of typically aqueous inks. As a result, the variation span of viscosity caused by temperature fluctuations during image recording (printing) is large. Further, because the variations in viscosity of the ink composition produce a large and direct effect on droplet size and droplet ejection rate, it becomes a factor causing quality degradation. For this reason, the temperature of ink composition during image recording (printing) has to be maintained as close to a constant value as possible. The temperature control width of the ink composition is preferably a set temperature ±5° C., more preferably a set temperature ±2° C., and even more preferably a set temperature ±1° C.

An ink-jet recording apparatus to be used for the ink-jet recording is not particularly limited and can be appropriately selected from the well-known apparatuses. Thus, commercial products can be advantageously used, but, for example, apparatuses equipped with a means for stabilizing the ink composition temperature are preferred. In this case, all the pipe sections and members from the ink tank (the intermediate tank, if such is present) to the nozzle ejection surface are preferably selected as the zones where the ink composition temperature is to be maintained at a constant level.

A method for controlling the temperature of the ink composition is not particularly limited, but it is preferred that a plurality of temperature sensors be installed in various pipe zones and that heating control be performed correspondingly to the flow rate of the ink composition and ambient temperature. Further, it is preferred that the ink nozzle head that ejects the ink composition be heated. In this case, it is preferred that the ink-jet recording device be thermally shielded or insulated to prevent it from being affected by the air temperature. In order to shorten the start time of the ink-jet recording apparatus (printer) that requires heating or in order to reduce the loss of thermal energy, it is preferred that the heating zone be thermally insulated from other zones and that thermal capacity of the entire heating unit be decreased.

—Discharge Conditions of Ink Composition—

In the image recording method in accordance with the present invention, it is preferred that the ink composition in accordance with the present invention be heated to a constant temperature and that the time from the ejection of the ink composition to the irradiation with the active radiation be short.

For example, the time from the ejection of the ink composition to the irradiation with the active radiation (can be referred to hereinbelow as "time-to-irradiation") is preferably 0.01 sec to 5 sec, more preferably 0.01 sec to 0.3 sec, and even more preferably 0.01 sec to 0.15 sec.

By controlling the time-to-irradiation to within the above-described ranges, it is possible to prevent effectively the ejected ink composition from bleeding prior to curing. Other advantages include the possibility of performing irradiation with active radiation, before the ink composition permeates into the recording medium, to deep zones that cannot be reached with a light source, even when a porous recording medium is used, and also a possibility of reducing the residual amount of unreacted monomers, thereby reducing the malodor.

By using the ink composition in accordance with the present invention and discharging the ink composition under the above-described discharging conditions, it is possible to maintain a constant dot diameter of the ink composition that has been ejected in the form of droplets and to obtain high quality on a variety of recording media with different surface wetting ability. Further, in order to obtain a color image, it is preferred that the inks (ink compositions in accordance with the present invention) be sequentially superimposed starting from the ink with a color of lower lightness. Where the ink (ink compositions in accordance with the present invention) with a color of lower lightness is superimposed on other inks, the active radiation can hardly reach the underlying ink, curing sensitivity is easily impeded, the amount of residual monomer is increased, malodor is easily generated, and adhesivity can be easily degraded. Further, the irradiation with active radiation may be performed in a single cycle after the inks (ink compositions in accordance with the present invention) of all colors have been discharged, but from the standpoint of enhancing the curing process, it is preferred that the irradiation be performed for each color.

Although the ink composition in accordance with the present invention is subjected to cyclic increase and decrease in temperature, because of the action and functions of the C component, the decrease in pigment dispersivity can be effectively suppressed and excellent coloring ability can be demonstrated over a long period even when the ink composition is maintained under such temperature conditions. Further, the decrease in discharge stability called by aggregation of pigment can be also effectively suppressed.

—Curing—

After the image has been recorded, the ink composition in accordance with the present invention is cured by irradiation with active radiation. The conditions of irradiating with active radiation in this case are not particularly limited and can be appropriately selected according to the object.

A method for irradiating with active radiation is described, for example, in JP-A No. 60-132767. More specifically, light sources are provided on both sides of a head unit and the head and light sources are scanned with a shuttle system. The irradiation with active radiation is performed within a constant interval after the ink adhered to the surface. Curing is then completed with another light source that is not driven. As methods for irradiating with active radiation, International Publication WO99/54415 describes a method using an optical fiber and a method in which a collimated light source falls on a mirror surface provided on the side surface of the head unit to irradiate the recorded zone with UV radiation. These irradiation methods can be employed in the present invention.

—Recording Medium—

The recording medium on which an image is recorded by discharging the ink composition in accordance with the present invention is not particularly limited and can be appropriately selected according to the object. The usual paper such as non-coated paper and coated paper, non-absorbing resin materials of various kinds that are used for the so-called light packaging, and resin films obtained mo bolding such materials into films can be used. Examples of such resin films include PET films, OPS films, OPP films, ONy films, PVC films, PE films, TAC films, polycarbonate films, acryl films, ABS films, polyacetal films, PVA films, and rubber films. Metals and glass can be also used as the recording medium.

—Image Recorded Matter—

The image recorded matter in accordance with the present invention is obtained by curing the ink composition of the present invention, and the image recorded matter is preferably obtained by ejecting the ink composition of the present invention onto the recording medium and curing the ink composition. In this case, it is preferable that the ejection is performed by an ink-jet recording process using a ink-jet printer.

Because the ink composition used for image recording is the ink composition in accordance with the present invention and contains fine pigment particles that are dispersed with excellent uniformity and stability, the image recorded matter (printout) in accordance with the present invention excels in coloring ability and sharpness, demonstrates high image quality, excels in weather resistance, and can be advantageously used in a wide variety of fields.

EXAMPLES

The present invention will be described below with reference to Examples and Comparative Examples. However, the present invention is not limited to the disclosed Examples. The term "parts" hereinbelow stands for "parts by weight".

—Synthesis of Mercaptan Compounds Represented by the General Formula (3)—

Chain transfer agents B-1 to B-13 (mercaptan compounds represented by the above-described General formula (3)) were synthesized in the following manner.

Synthesis Example B-1

A total of 7.83 parts of dipentaerythritol hexakis(3-mercaptopropionate) (DPMP, manufactured by Sakai Chemical Industry Co., Ltd.) and 15.57 parts of compound (A-1) having the below-described pigment adsorption structure and also having a carbon-carbon double bond were dissolved in 93.60 parts of dimethylformamide and heated to 70° C. under a nitrogen flow. Then, 0.06 parts of 2,2'-azobis(2,4-dimethylvaleronitrile) (V-65, manufactured by Wako Pure Chemical Industries, Ltd.) were added thereto and heating was conducted for 3 hours. Then, 0.06 parts of V-65 were further added and the reaction was conducted for 3 hours at 70° C. under a nitrogen flow. By cooling to room temperature, a 20% solution of the below-described mercaptan compound (chain transfer agent B-1) was obtained.

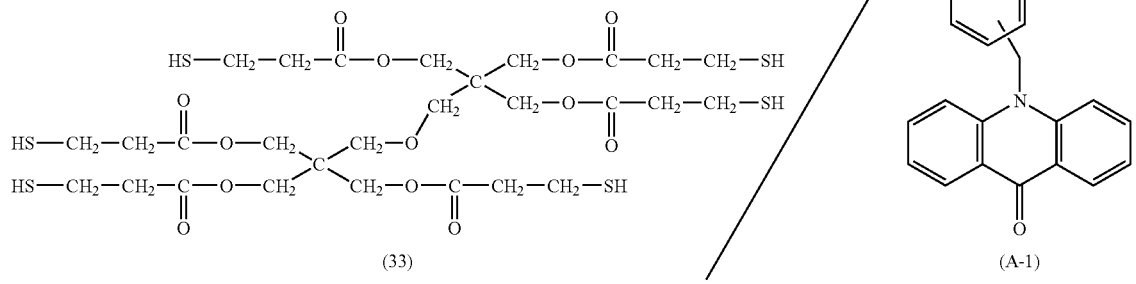

B-1 (1/5 adduct)

Synthesis Example B-2

A 20% solution of the below-described mercaptan compound (chain transfer agent B-2) was obtained in the same manner as in the Synthesis Example B-1, except that 15.57 parts of compound (A-1) having the pigment adsorption structure and also having a carbon-carbon double bond and 93.60 parts of dimethylformamide in the Synthesis Example B-1 were replaced with 14.61 parts of compound (A-2) having the below-described pigment adsorption structure and also having a carbon-carbon double bond and 89.78 parts of dimethylformamide.

Synthesis Example B-4

A total of 4.89 parts of pentaerythritol tetrakis(3-mercaptopropionate) (PEMP, manufactured by Sakai Chemical Industry Co., Ltd.) and 14.41 parts of compound (A-4) having the below-described pigment adsorption structure and also having a carbon-carbon double bond were dissolved in 77.20 parts of dimethylformamide and heated to 70° C. under a nitrogen flow. Then, 0.04 parts of 2,2'-azobis(2,4-dimethylvaleronitrile) (V-65, manufactured by Wako Pure Chemical Industries, Ltd.) were added thereto and heating was conducted for 3 hours. Then, 0.04 parts of V-65 was further added and the reaction was conducted for 3 hours at 70° C. under a nitrogen flow. By cooling to room temperature, a 20% solution of the below-described mercaptan compound (chain transfer agent B-4) was obtained.

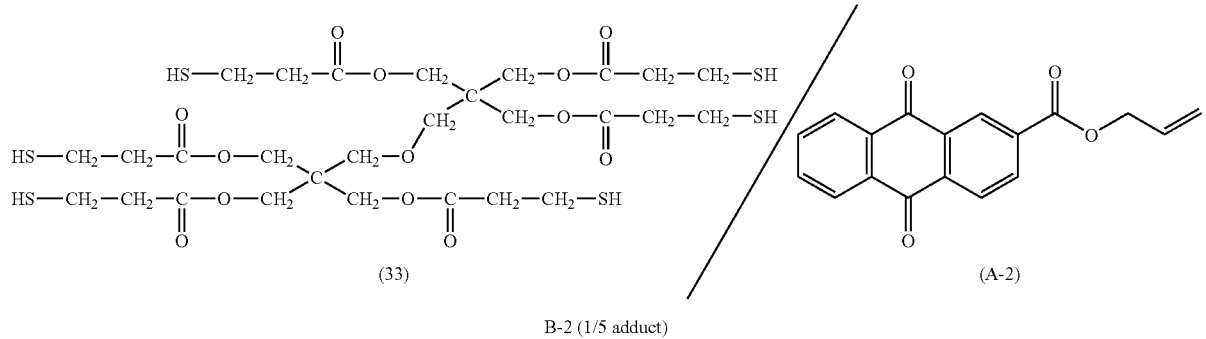

B-2 (1/5 adduct)

Synthesis Example B-3

A 20% solution of the below-described mercaptan compound (chain transfer agent B-3) was obtained in the same manner as in the Synthesis Example B-1, except that 15.57 parts of compound (A-1) having the pigment adsorption structure and also having a carbon-carbon double bond and 93.60 parts of dimethylformamide in the Synthesis Example B-1 were replaced with 17.52 parts of compound (A-3) having the below-described pigment adsorption structure and also having a carbon-carbon double bond and 101.4 parts of dimethylformamide.

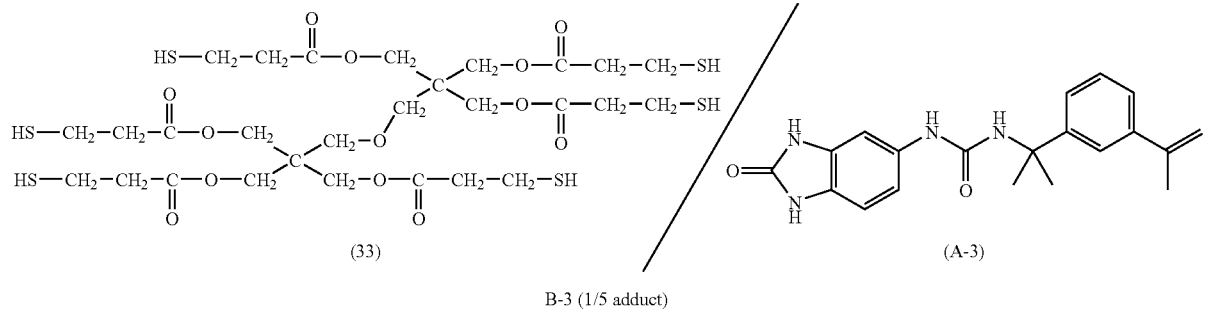

B-3 (1/5 adduct)

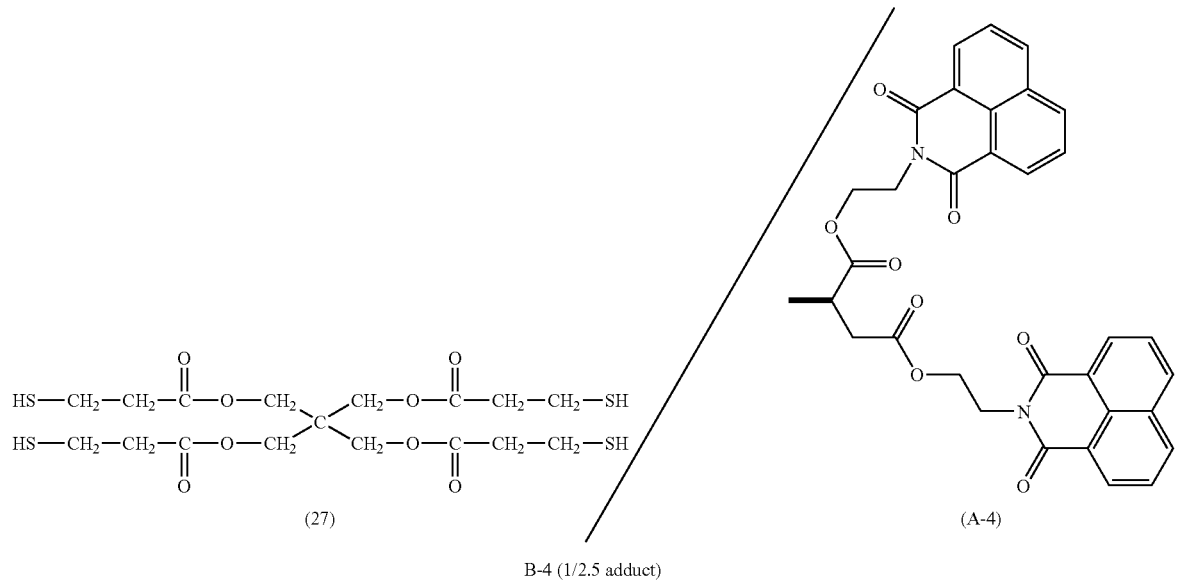

B-4 (1/2.5 adduct)

Synthesis Example B-5

A 30% solution of the below-described mercaptan compound (chain transfer agent B-5) was obtained in the same manner as in the Synthesis Example B-1, except that 15.57 parts of compound (A-1) having the pigment adsorption structure and also having a carbon-carbon double bond and 93.60 parts of dimethylformamide in the Synthesis Example B-1 were replaced with 5.26 parts of compound (A-5) having the below-described pigment adsorption structure and also having a carbon-carbon double bond and 30.54 parts of 1-methoxy-2-propanol.

Synthesis Example B-6

A 30% solution of the below-described mercaptan compound (chain transfer agent B-6) was obtained in the same manner as in the Synthesis Example B-1, except that 15.57 parts of compound (A-1) having the pigment adsorption structure and also having a carbon-carbon double bond and 93.60 parts of dimethylformamide in the Synthesis Example B-1 were replaced with 4.71 parts of compound (A-6) having the below-described pigment adsorption structure and also having a carbon-carbon double bond and 29.25 parts of 1-methoxy-2-propanol.

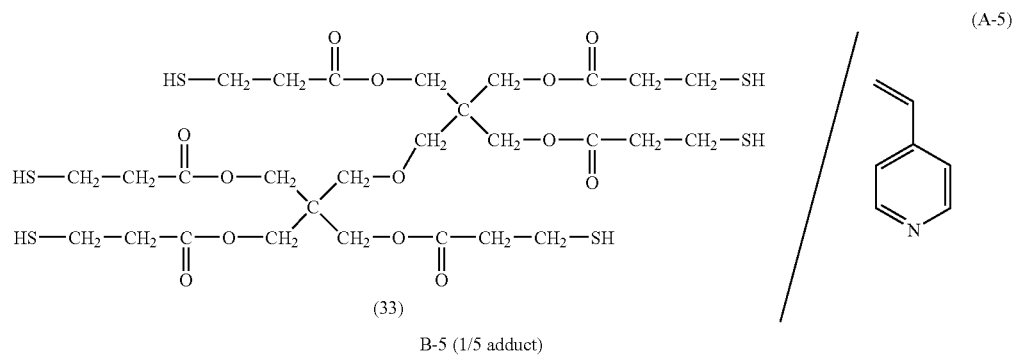

B-5 (1/5 adduct)

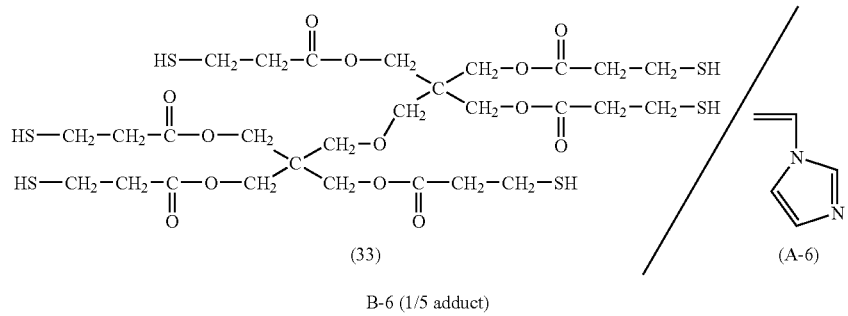

B-6 (1/5 adduct)

Synthesis Example B-7

A total of 7.83 parts of dipentaerythritol hexakis(3-mercaptopropionate) (DPMP, manufactured by Sakai Chemical Industry Co., Ltd.) and 6.51 parts of compound (A-7) having the below-described pigment adsorption structure and also having a carbon-carbon double bond were dissolved in 33.45 parts of 1-methoxy-2-propanol and heated to 70° C. under a nitrogen flow. Then, 0.06 part of 2,2'-azobis(2,4-dimethylvaleronitrile) (V-65, manufactured by Wako Pure Chemical Industries, Ltd.) was added thereto and heating was conducted for 3 hours. Then, 0.06 part of V-65 were further added and the reaction was conducted for 3 hours at 70° C. under a nitrogen flow. By cooling to room temperature, a 30% solution of the below-described mercaptan compound (chain transfer agent B-7) was obtained.

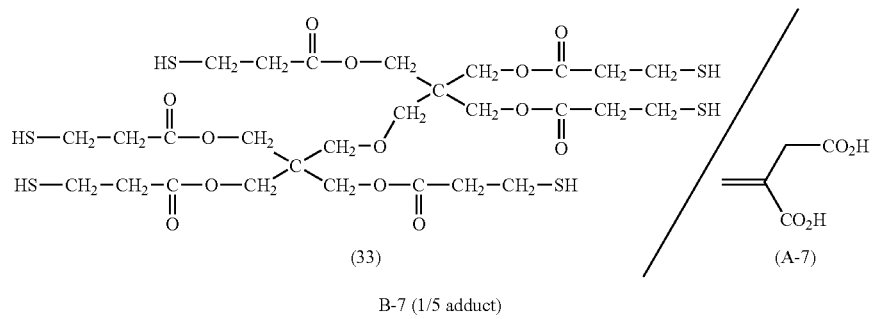

B-7 (1/5 adduct)

Synthesis Example B-8

A 30% solution of the below-described mercaptan compound (chain transfer agent B-8) was obtained in the same manner as in the Synthesis Example B-7, except that 6.51 parts of compound (A-7) having the pigment adsorption structure and also having a carbon-carbon double bond and 33.45 parts of 1-methoxy-2-propanol in the Synthesis Example B-7 were replaced with 5.80 parts of compound (A-8) having the below-described pigment adsorption structure and also having a carbon-carbon double bond and 31.81 parts of 1-methoxy-2-propanol.

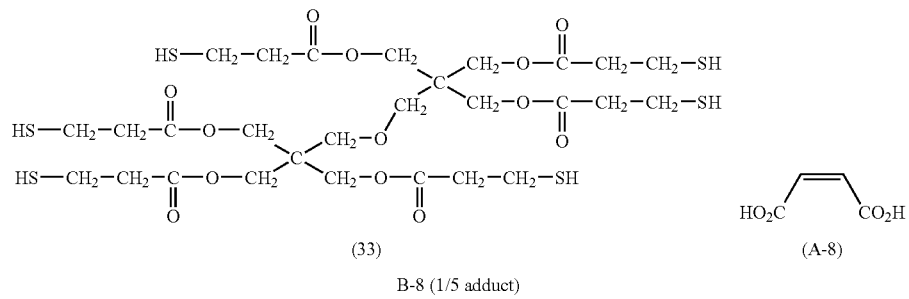

B-8 (1/5 adduct)

Synthesis Example B-9

A 30% solution of the below-described mercaptan compound (chain transfer agent B-9) was obtained in the same manner as in the Synthesis Example B-7, except that 6.51 parts of compound (A-7) having the pigment adsorption structure and also having a carbon-carbon double bond and 33.45 parts of 1-methoxy-2-propanol in the Synthesis Example B-7 were replaced with 12.46 parts of compound (A-9) having the below-described pigment adsorption structure and also having a carbon-carbon double bond and 47.35 parts of dimethylformamide.

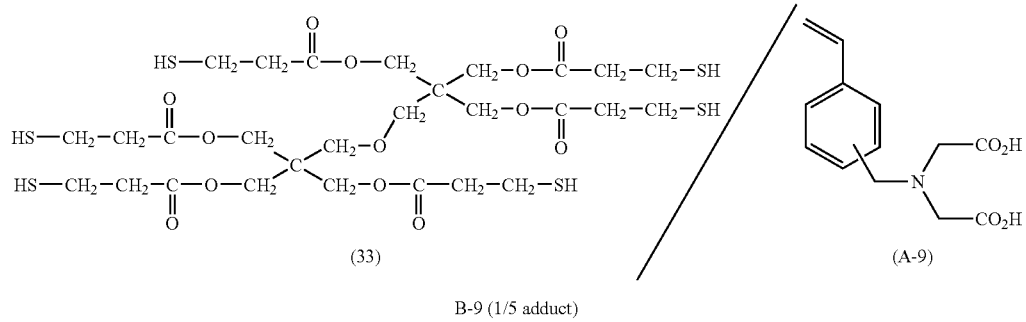

B-9 (1/5 adduct)

Synthesis Example B-10

A 30% solution of the below-described mercaptan compound (chain transfer agent B-10) was obtained in the same manner as in the Synthesis Example B-7, except that 6.51 parts of compound (A-7) having the pigment adsorption structure and also having a carbon-carbon double bond and 33.45 parts of 1-methoxy-2-propanol in the Synthesis Example B-7 were replaced with 10.46 parts of compound (A-10) having the below-described pigment adsorption structure and also having a carbon-carbon double bond and 42.67 parts of dimethylformamide.

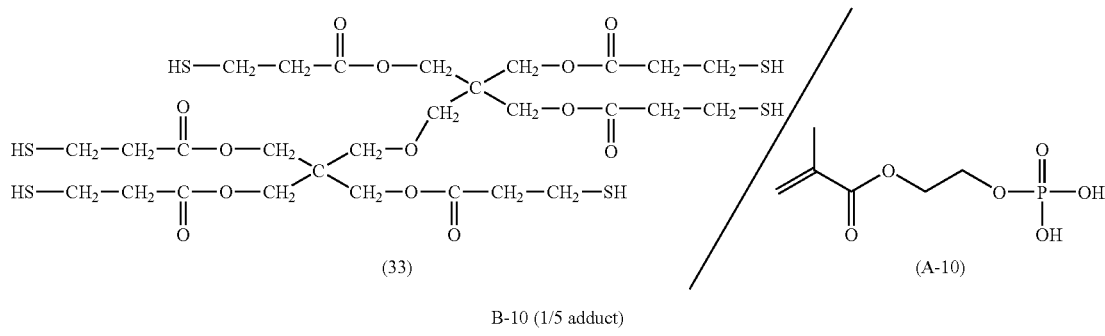

B-10 (1/5 adduct)

Synthesis Example B-11

A 30% solution of the below-described mercaptan compound (chain transfer agent B-11) was obtained in the same manner as in the Synthesis Example B-7, except that 6.51 parts of compound (A-7) having the pigment adsorption structure and also having a carbon-carbon double bond and 33.45 parts of 1-methoxy-2-propanol in the Synthesis Example B-7 were replaced with 7.86 parts of compound (A-11) having the below-described pigment adsorption structure and also having a carbon-carbon double bond and 36.61 parts of 1-methoxy-2-propanol.

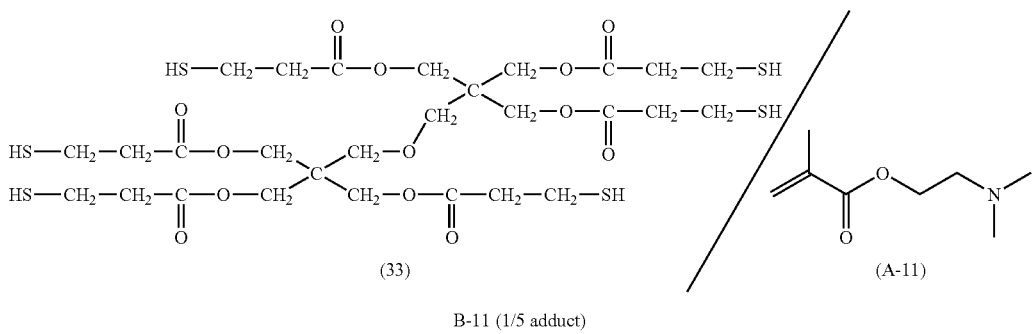

B-11 (1/5 adduct)

Synthesis Example B-12

A total of 4.89 parts of pentaerythritol tetrakis(3-mercaptopropionate) (PEMP, manufactured by Sakai Chemical Industry Co., Ltd.) and 3.90 parts of compound (A-12) having the below-described pigment adsorption structure and also having a carbon-carbon double bond were dissolved in 20.51 parts of 1-methoxy-2-propanol and heated to 70° C. under a nitrogen flow. Then, 0.04 parts of 2,2'-azobis(2,4-dimethylvaleronitrile) (V-65, manufactured by Wako Pure Chemical Industries, Ltd.) were added thereto and heating was conducted for 3 hours. Then, 0.04 parts of V-65 were further added and the reaction was conducted for 3 hours at 70° C. under a nitrogen flow. By cooling to room temperature, a 30% solution of the below-described mercaptan compound (chain transfer agent B-12) was obtained.

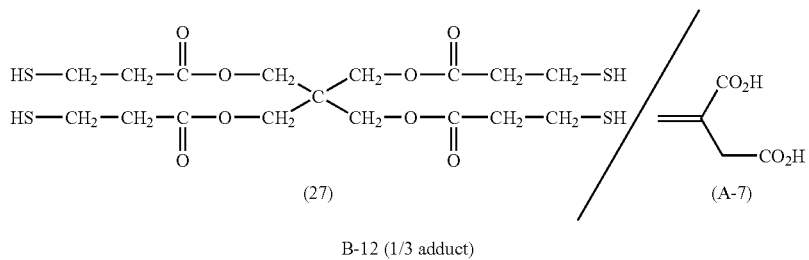

B-12 (1/3 adduct)

Synthesis Example B-13

A total of 7.83 parts of dipentaerythritol hexakis(3-mercaptopropionate) (DPMP, manufactured by Sakai Chemical Industry Co., Ltd.) and 4.55 parts of compound (A-12) having the below-described pigment adsorption structure and also having a carbon-carbon double bond were dissolved in 28.90 parts of 1-methoxy-2-propanol and heated to 70° C. under a nitrogen flow. Then, 0.04 parts of 2,2'-azobis(2,4-dimethylvaleronitrile) (V-65, manufactured by Wako Pure Chemical Industries, Ltd.) were added thereto and heating was conducted for 3 hours. Then, 0.04 parts of V-65 were further added and the reaction was conducted for 3 hours at 70° C. under a nitrogen flow. By cooling to room temperature, a 30% solution of the below-described mercaptan compound (chain transfer agent B-13) was obtained.

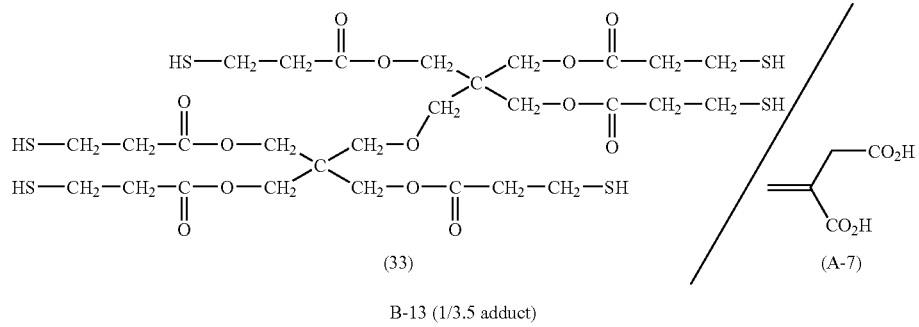

B-13 (1/3.5 adduct)

<Synthesis of C Component>

The C component (C-1 to C-57) in accordance with the present invention were synthesized in the following manner.

Synthesis Example C-1

A mixed solution containing 46.80 parts of 20% solution of the chain transfer agent B-1 obtained in the Synthesis Example B-1 and 20 parts of methyl methacrylate (MMA; monomer) was heated to 80° C. under a nitrogen flow. A total of 0.013 part of 2,2'-azobis(isobutyronitrile) (AIBN, manufactured by Wako Pure Chemical Industries, Ltd.) was added thereto, and then again after 3 hours of heating, 0.013 parts of AIBN were added again and the reaction was conducted for 3 hours at a temperature of 80° C. under a nitrogen flow. The product was cooled to room temperature and diluted with acetone. Re-precipitation was then performed by using a large amount of methanol and subsequent vacuum drying yielded 19 parts (solid) of the following polymer (C-1: weight-average molecular weight 14,000 calculated as polystyrene).

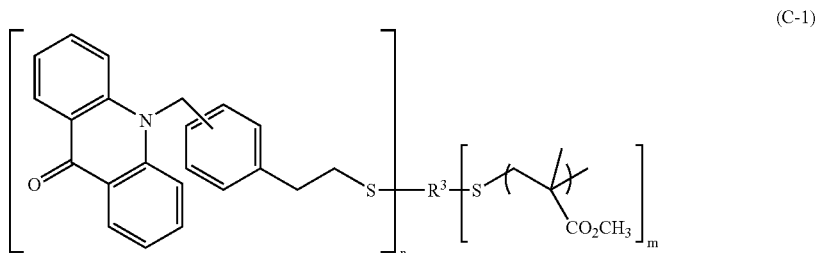

(n = 5, m = 1)

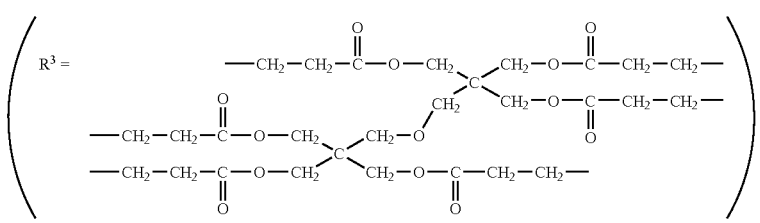

Synthesis Example C-2

A total of 23 parts (solid) of the following polymer (C-2: weight-average molecular weight 30,000 calculated as polystyrene) was obtained in the same manner as in the Synthesis Example C-1, except that 46.80 parts of the 20% solution of the chain transfer agent B-1 in the Synthesis Example C-1 was changed to 23.40 parts, and 0.013 parts of AIBN were changed to 0.007 parts.

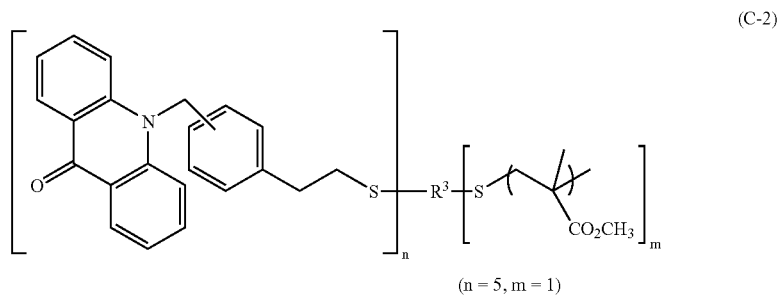

(C-2)

(n = 5, m = 1)

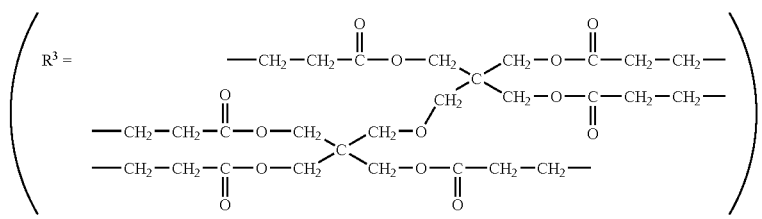

Synthesis Example C-3

A total of 20 parts (solid) of the following polymer (C-3: weight-average molecular weight 15,000 calculated as polystyrene) was obtained in the same manner as in the Synthesis Example C-1, except that 20 parts of methyl methacrylate in the Synthesis Example C-1 was changed to 19.5 parts of butyl methacrylate and 8.5 parts of 2-hydroxyethyl methacrylate.

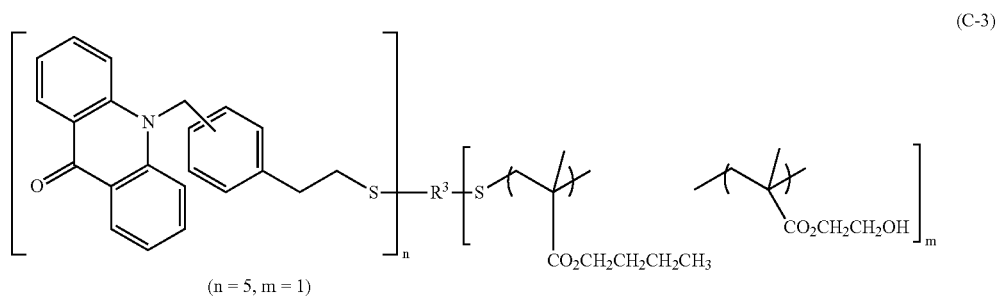

(C-3)

(n = 5, m = 1)

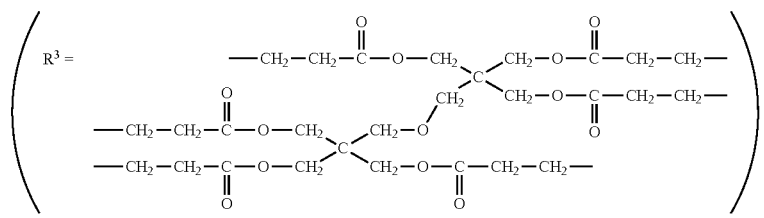

Synthesis Examples C-4 to C-12

The following polymers (C-4 to C-12) were obtained in the same manner as in the Synthesis Example C-1, except that the amounts and types of the chain transfer agent and monomer, the amount of AIBN, and the re-precipitation method in the Synthesis Example C-1 were changed as shown in Table 1 below.

TABLE 1

| Synthesis example | Chain transfer agent | Monomer | AIBN | Re-precipitation method | Weight-average molecular weight | Yield of polymer compound |
|---|---|---|---|---|---|---|
| C-4 | 44.89 parts of B-2 solution | MMA 20 parts | 0.013 parts | Re-precipitation in methanol | 15,000 | 24 parts |
| C-5 | 22.45 parts of B-2 solution | MMA 20 parts | 0.007 parts | Re-precipitation in methanol | 30,000 | 22 parts |
| C-6 | 50.7 parts of B-3 solution | BMA 19.5 parts HEMA 8.5 parts | 0.013 parts | Re-precipitation in methanol | 14,000 | 25 parts |
| C-7 | 25.35 parts of B-3 solution | BMA 19.5 parts HEMA 8.5 parts | 0.007 parts | Re-precipitation in methanol | 28,000 | 22 parts |
| C-8 | 12.87 parts of B-4 solution | BMA 19.5 parts HEMA 8.5 parts | 0.007 parts | Re-precipitation in methanol | 29,000 | 20 parts |
| C-9 | 17.45 parts of B-5 solution | BMA 19.5 parts HEMA 8.5 parts | 0.013 parts | Re-precipitation in methanol | 14,000 | 17 parts |
| C-10 | 8.73 parts of B-5 solution | MMA 20 parts | 0.007 parts | Re-precipitation in methanol | 24,000 | 15 parts |
| C-11 | 16.71 parts of B-6 solution | MMA 20 parts | 0.013 parts | Re-precipitation in methanol | 15,000 | 17 parts |
| C-12 | 8.36 parts of B-6 solution | MMA 20 parts | 0.007 parts | Re-precipitation in methanol | 31,000 | 18 parts |

MAA: methacrylic acid
BMA: n-butyl methacrylate
HEMA: 2-hydroxyethyl methacrylate The structures of the synthesized polymers are shown below. The indication such as (C-4) represents the number of the synthesis example in Tables 1 below.

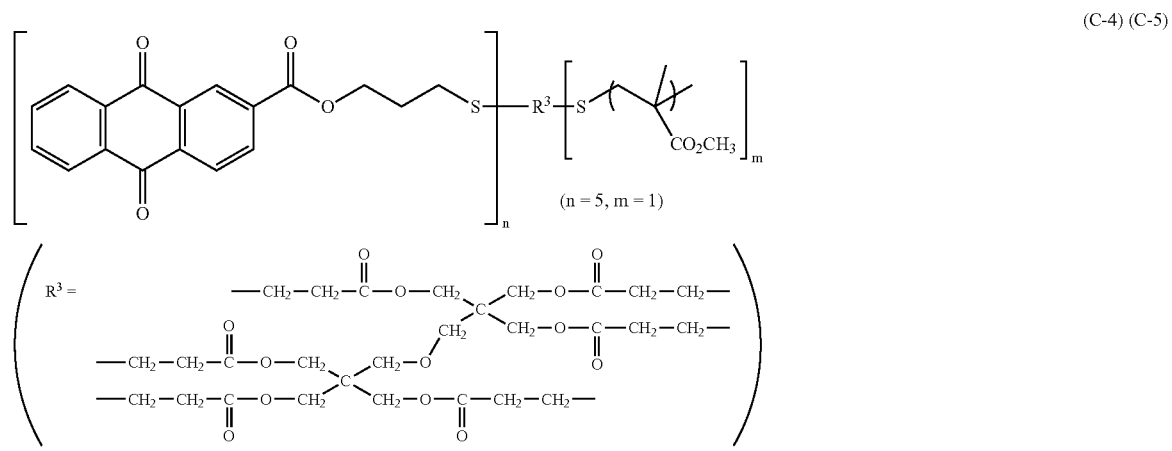

(C-4) (C-5)

(C-6) (C-7)
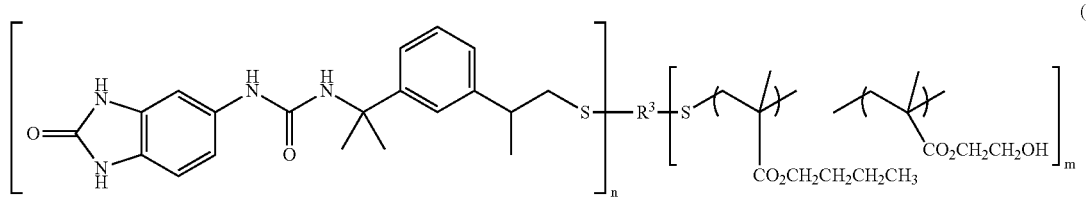
(n = 5, m = 1)
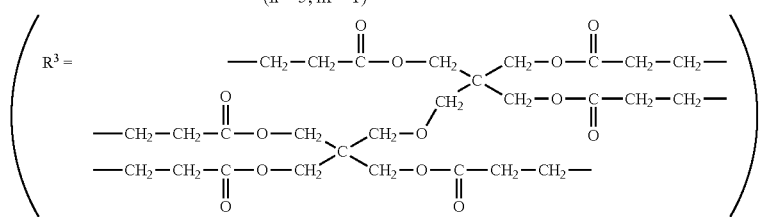
(C-8)
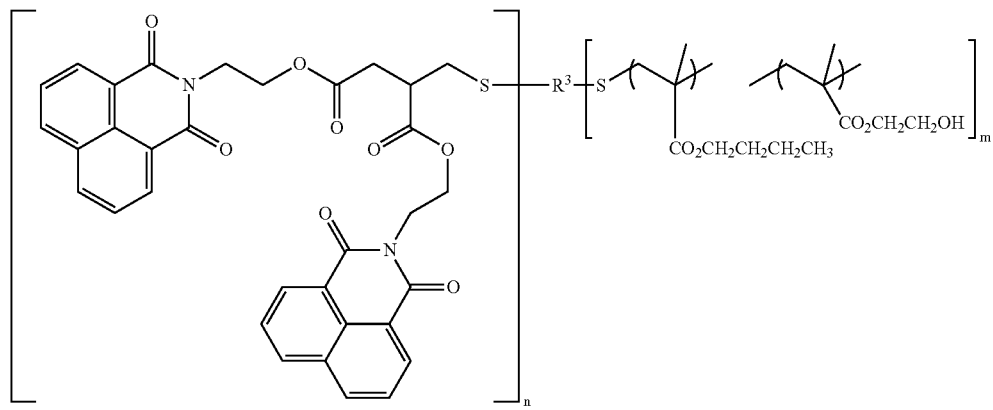
(n = 2.5, m = 1.5)
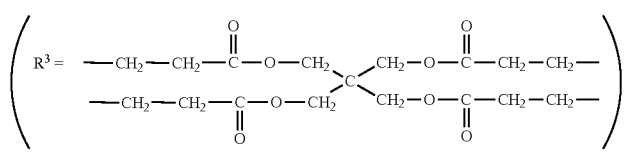
(C-9)
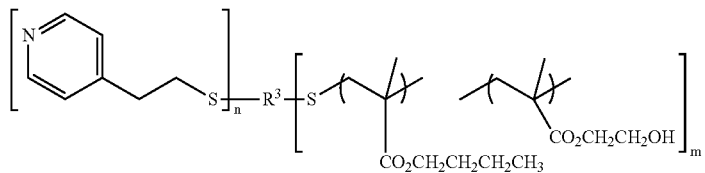
(n = 5, m = 1)
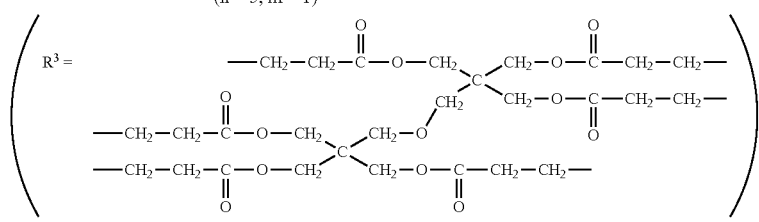
(C-10)
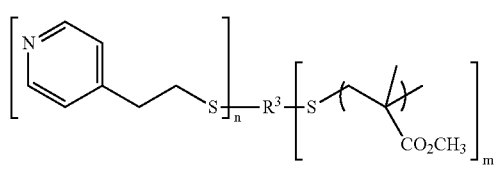
(n = 5, m = 1)

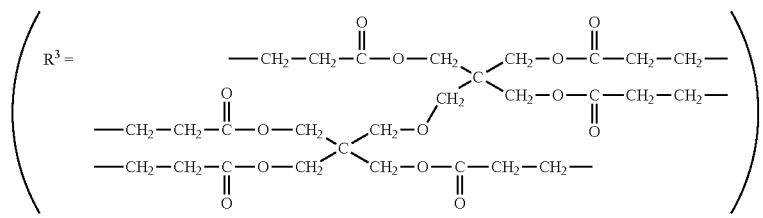

(C-11) (C-12)

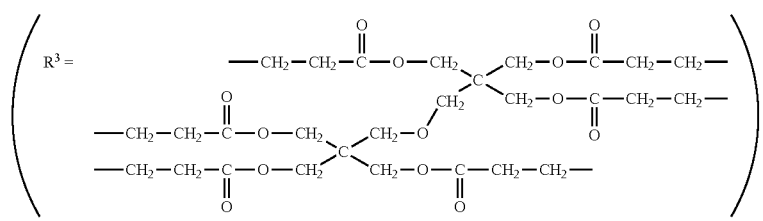

Synthesis Example C-13

A mixed solution containing 19.11 parts of 30% solution of the chain transfer agent B-7 obtained in the Synthesis Example B-7 and 20 parts of methyl methacrylate was heated to 80° C. under a nitrogen flow. A total of 0.013 parts of 2,2'-azobis(isobutyronitrile) (AIBN, manufactured by Wako Pure Chemical Industries, Ltd.) was added thereto, and then again after 3 hours of heating, 0.013 parts of AIBN were added again and the reaction was conducted for 3 hours at a temperature of 80° C. under a nitrogen flow. The product was cooled to room temperature and diluted with acetone. Re-precipitation was then performed by using a large amount of methanol and subsequent vacuum drying yielded 13 parts (solid) of the following polymer (C-13: weight-average molecular weight 12,000 calculated as polystyrene).

(C-13)

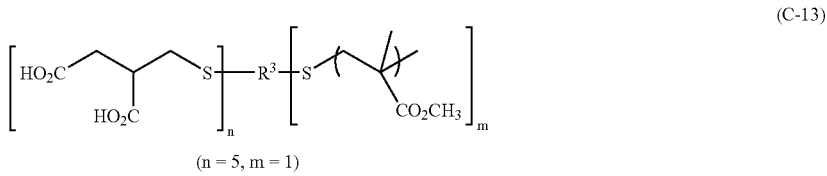

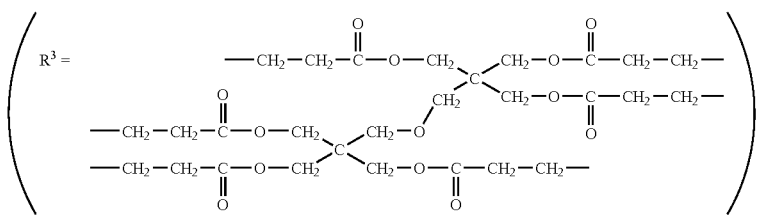

Synthesis Example C-14

A total of 14 parts (solid) of the following polymer (C-14: weight-average molecular weight 20,000 calculated as polystyrene) was obtained in the same manner as in the Synthesis Example C-13, except that 19.11 parts of 30% solution of chain transfer agent B-7 in the Synthesis Example C-13 was changed to 9.56 parts and 0.013 parts of AIBN were changed to 0.007 parts.

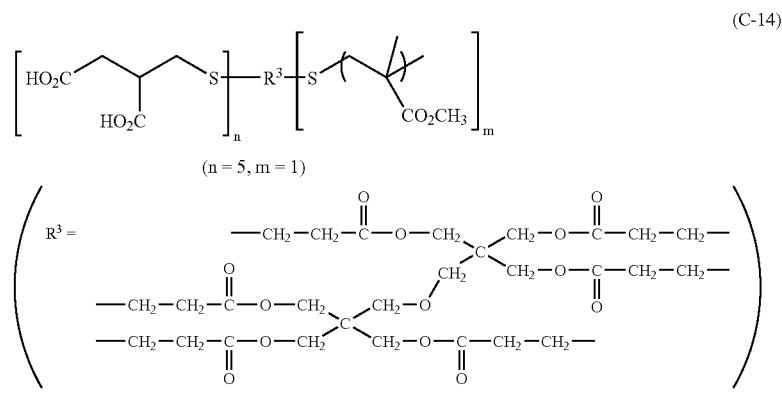

(C-14)

Synthesis Example C-15

A total of 13 parts (solid) of the following polymer (C-15: weight-average molecular weight 13,000 calculated as polystyrene) was obtained in the same manner as in the Synthesis Example C-13, except that 20 parts of methyl methacrylate in the Synthesis Example C-13 was changed to 19.5 parts of butyl methacrylate and 8.5 parts of 2-hydroxyethyl methacrylate.

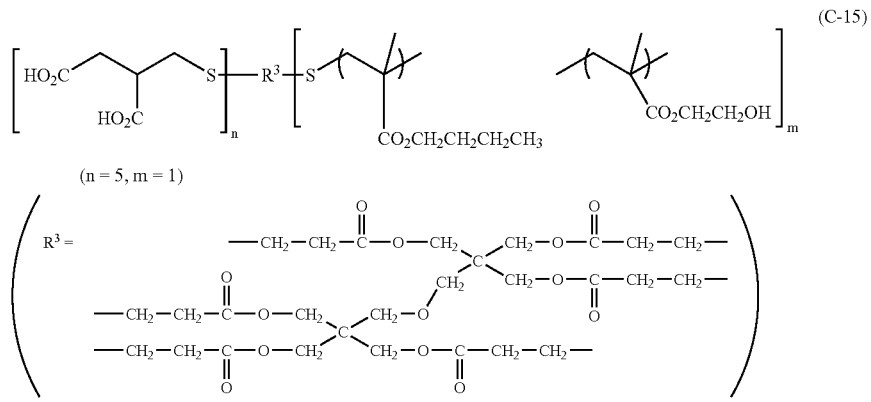

(C-15)

Synthesis Examples C-16 to C-27

The following polymers (C-16 to C-27) were obtained in the same manner as in the Synthesis Example C-13, except that the amounts and types of the chain transfer agent and monomer, the amount of AIBN, and the re-precipitation method in the Synthesis Example C-13 were changed as shown in Table 2 below.

TABLE 2

| Synthesis example | Chain transfer agent | Monomer | AIBN | Re-precipitation method | Weight-average molecular weight | Yield of polymer compound |
|---|---|---|---|---|---|---|
| C-16 | 9.56 parts of B-15 solution | MMA 19 parts MAA 1 part | 0.007 part | Re-precipitation in methanol/water (1/1) | 23,000 | 15 parts |

TABLE 2-continued

| Synthesis example | Chain transfer agent | Monomer | AIBN | Re-precipitation method | Weight-average molecular weight | Yield of polymer compound |
|---|---|---|---|---|---|---|
| C-17 | 9.03 parts of B-15 solution | MMA 18 parts NK Ester SA 2 parts | 0.007 part | Re-precipitation in methanol/water (1/1) | 23,000 | 16 parts |
| C-18 | 18.18 parts of B-16 solution | MMA 20 parts | 0.013 part | Re-precipitation in methanol | 13,000 | 11 parts |
| C-19 | 9.09 parts of B-16 solution | MMA 20 parts | 0.007 part | Re-precipitation in methanol | 23,000 | 12 parts |
| C-20 | 18.18 parts of B-16 solution | BMA 19.5 parts HEMA 8.5 parts | 0.013 part | Re-precipitation in methanol | 16,000 | 11 parts |
| C-21 | 13.53 parts of B-17 solution | MMA 20 parts | 0.007 part | Re-precipitation in methanol | 27,000 | 13 parts |
| C-22 | 12.19 parts of B-18 solution | MMA 20 parts | 0.007 part | Re-precipitation in methanol | 26,000 | 11 parts |
| C-23 | 12.13 parts of B-19 solution | MMA 20 parts | 0.007 part | Re-precipitation in methanol | 28,000 | 10 parts |
| C-24 | 20.92 parts of B-20 solution | MMA 20 parts | 0.013 part | Re-precipitation in methanol | 15,000 | 18 parts |
| C-25 | 10.46 parts of B-20 solution | MMA 20 parts | 0.007 part | Re-precipitation in methanol | 32,000 | 19 parts |
| C-26 | 20.92 parts of B-20 solution | BMA 19.5 parts HEMA 8.5 parts | 0.013 part | Re-precipitation in methanol | 17,000 | 22 parts |
| C-27 | 11.72 parts of B-23 solution | MMA 20 parts | 0.013 part | Re-precipitation in methanol | 11,000 | 11 parts |

MMA: methyl methacrylate
MAA: methacrylic acid
BMA: n-butyl methacrylate
HEMA: 2-hydroxyethyl methacrylate
MK Ester-SA (manufactured by Shin-Nakamura Chemical Co., Ltd.)

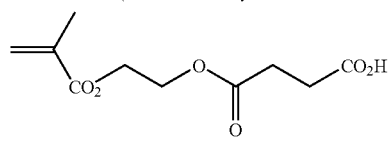

The structure of the synthesized polymers is shown below. The indication such as (C-16) represents the number of the synthesis example in Table 2.
(C-16)
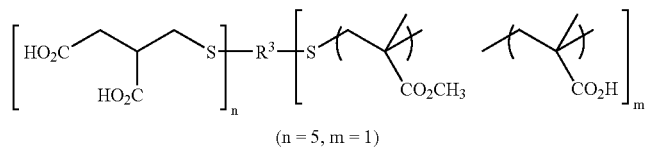
(n = 5, m = 1)
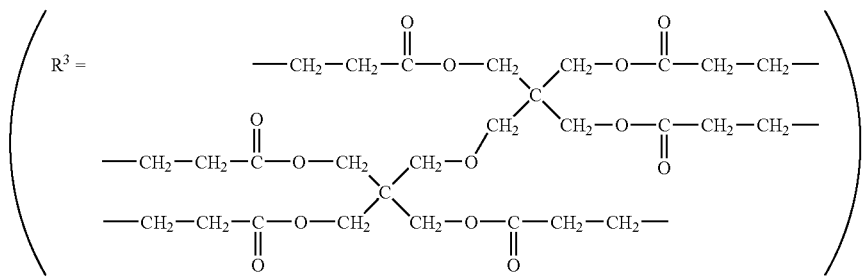
(C-17)
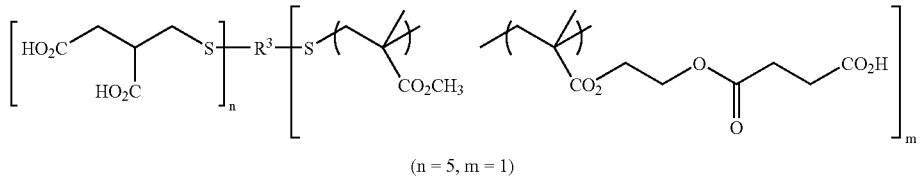
(n = 5, m = 1)
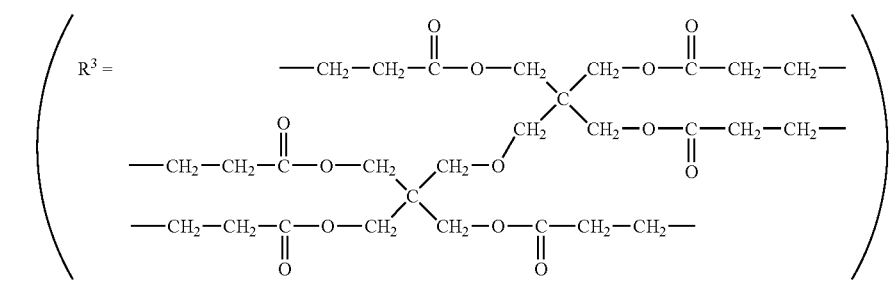
(C-18)(C-19)
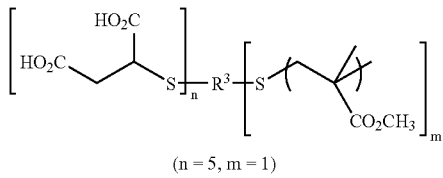
(n = 5, m = 1)
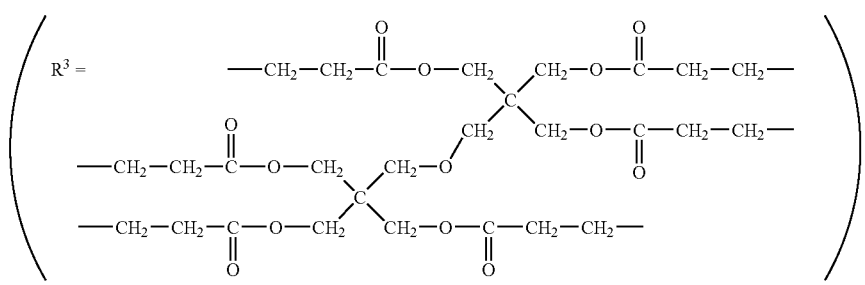

(C-20)
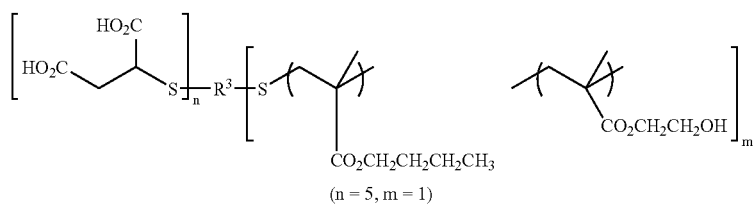
(n = 5, m = 1)
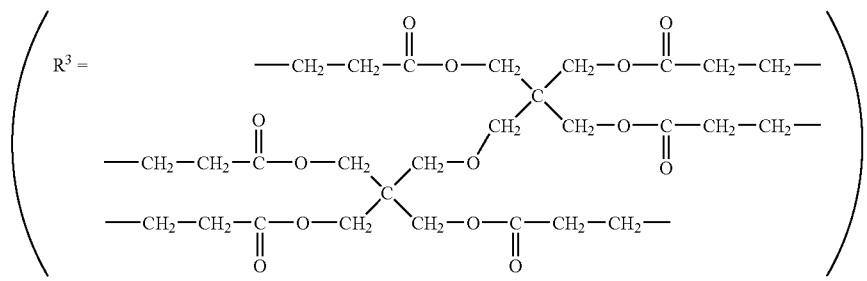
(C-21)
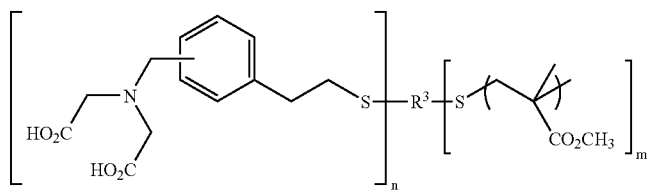
(n = 5, m = 1)
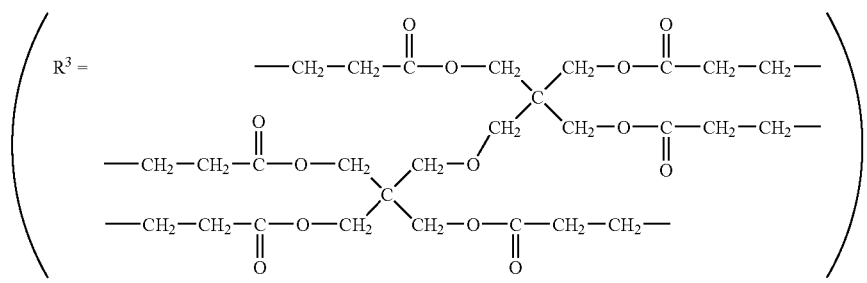
(C-22)
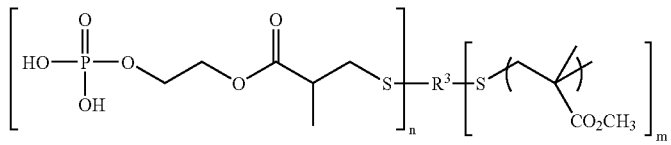
(n = 5, m = 1)
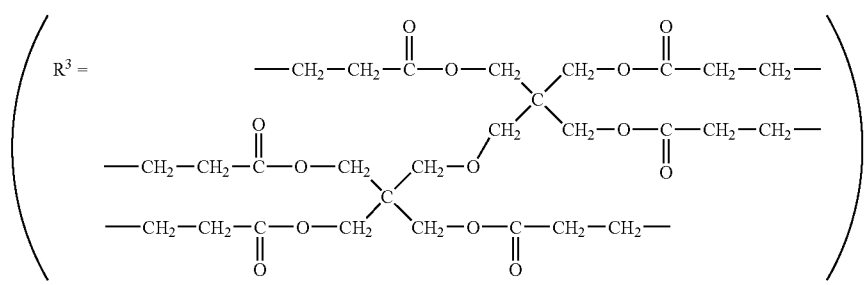

-continued
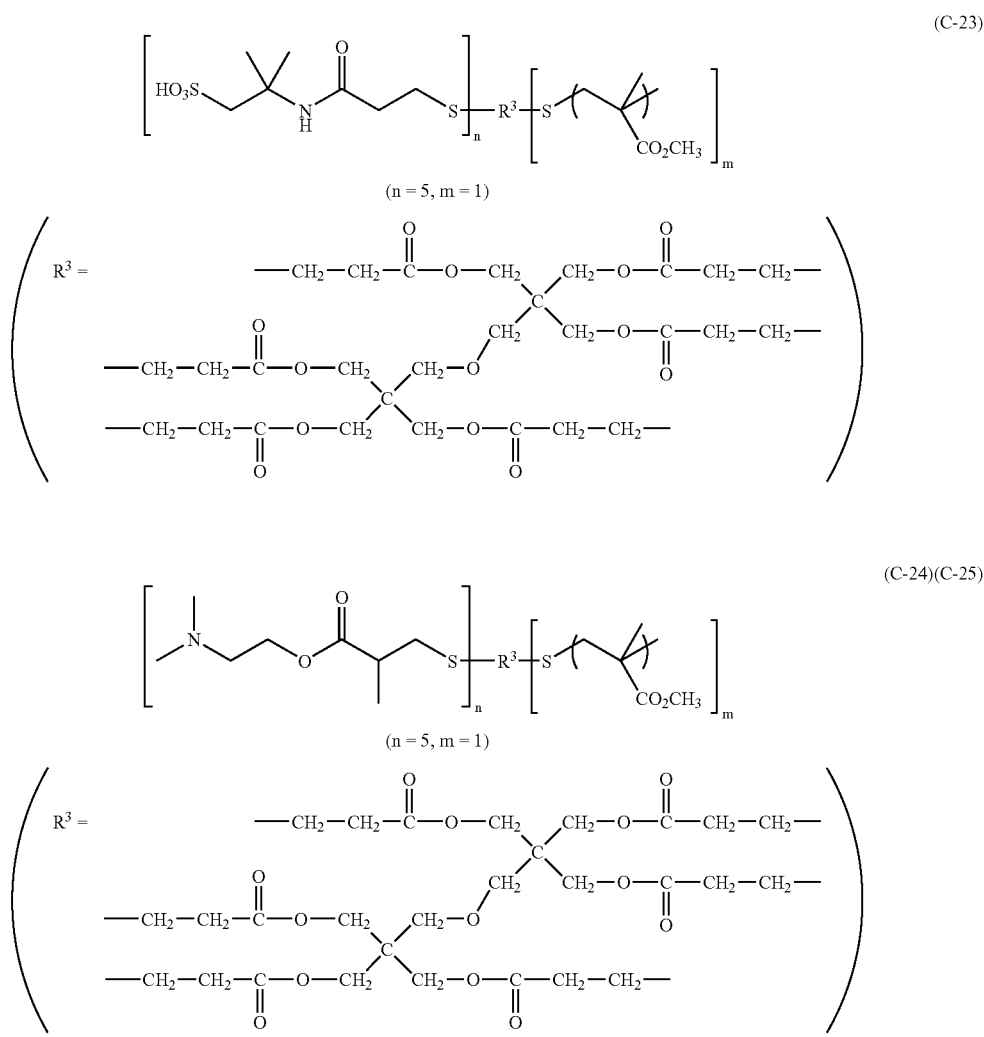
(C-23)
(C-24)(C-25)
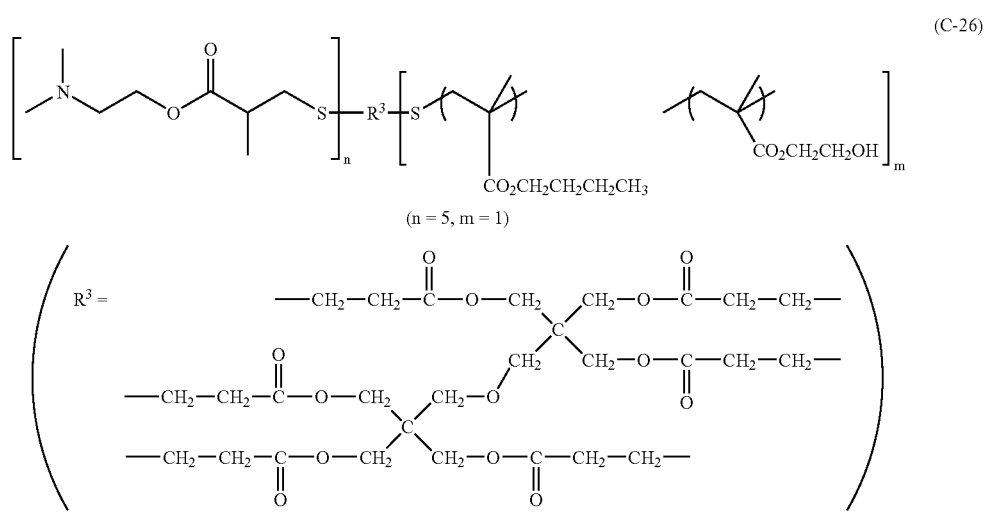
(C-26)

(C-27)

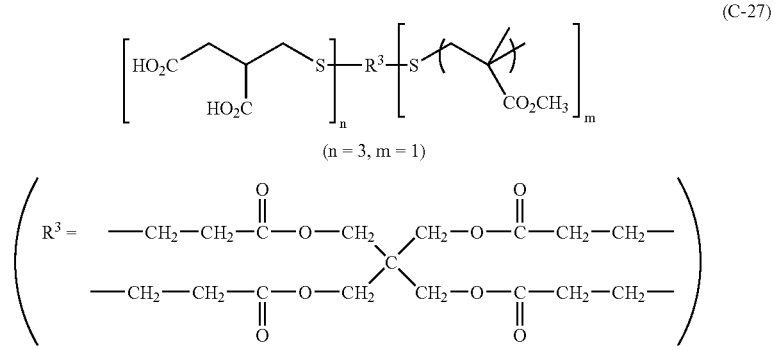

Synthesis Example C-28

A mixed solution containing 4.99 parts of a 30% solution of the chain transfer agent B-24 described in the Synthesis Example B-24, 20.0 parts of methyl methacrylate, and 4.66 parts of 1-methoxy-2-propanol was heated to 90° C. under a nitrogen flow. A mixed solution of 0.139 parts of dimethyl 2,2-azobisisobutyrate (V-601, manufactured by Wako Pure Chemical Industries, Ltd.), 5.36 parts of 1-methoxy-2-propanol and 9.40 parts of 1-methoxy-2-propyl acetate was dropwise added within 2.5 hours to the above-described mixed solution under stirring. Upon completion of the dropwise addition, the reaction was conducted for 2.5 hours at 90° C. Then, a mixed solution of 0.046 parts of dimethyl 2,2-azobisisobutyrate and 4.00 parts of 1-methoxy-2-propyl acetate was poured in and the reaction was further conducted for 2 hours. A total of 1.52 parts of 1-methoxy-2-propanol and 21.7 parts of 1-methoxy-2-propyl acetate were then added to the reaction liquid, followed by cooling to room temperature. Re-precipitation was then performed by using a large amount of methanol and subsequent vacuum drying yielded the following solid polymer (C-28: weight-average molecular weight 25,000 calculated as polystyrene).

(C-28)

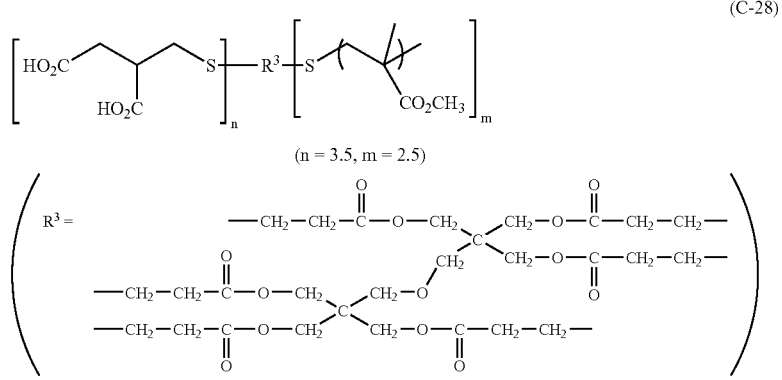

Example 1

The synthesized polymer C-1 was dissolved in the following polymerizable compound (i) and (ii) <the (A) component> and, together with the below-described pigment <the (B) component>, introduced into a motor mill M50 (manufactured by Eiger Corp.). The components were dispersed for 6 hours at a circumferential rate of 9 m/s by using zirconia beads with a diameter of 0.65 mm and a starting liquid of an ink composition curable with active energy beam was obtained. The below-described polymerization initiator was then added to the starting liquid of the ink composition and the components were gently mixed. The mixture was pressure filtered in a membrane filter, thereby producing an ink-jet ink curable with active energy beam of Example 1 (ink composition in accordance with the present invention). The content of each component in the ink composition of Example 1 is presented below.

Polymer C-1 . . . 1.5 g.
Polymerizable Compound:
 (i) Neopentyl glycol propylene oxydiacrylate (NPG-PODA: manufactured by Sartomer Co., Inc.) . . . 60.0 g.
 (ii) Caprolactone-modified dipentaerythritol hexaacrylate (DPCA-60: manufactured by Nippon Kayaku Co., Ltd.) . . . 27.5 g.
Quinacridone pigment (PV-19) . . . 5.0 g.
Polymerization initiator (acylphosphineoxide compound (LUCIRIN TPO-L: manufactured by BASF Co.)) . . . 5.0 g.

Examples 2 to 28

Ink-jet inks curable with active energy beam (ink compositions in accordance with the present invention) of Examples 2 to 28 were manufactured in the same manner as in Example 1, except that the polymer C-1 of Example 1 was replaced with the synthesized polymers C-2 to C-28.

Comparative Example 1

An ink-jet ink curable with active energy beam of Comparative Example 1 was manufactured in the same manner as in Example 1, except that the polymer C-1 of Example 1 was replaced with a commercial pigment dispersant (SOL-SPERSE 24000GR, manufactured by Japan Lubrizol Co., Ltd.).

Comparative Example 2

An ink-jet ink curable with active energy beam of Comparative Example 2 was manufactured in the same manner as in Example 1, except that the polymer C-1 of Example 1 was replaced with a commercial pigment dispersant (SOLSPERSE 32000, manufactured by Japan Lubrizol Co., Ltd.).

Examples 29 to 34 and Comparative Examples 3 to 4

Ink-jet ink compositions of Examples 29 to 34 and Comparative Examples 3 to 4 were manufactured in the same manner as in Examples 3, 4, 5 and Comparative Examples 1, 2, except that the quinacridone pigment (PV-19) in Examples 1, 11, 13, 14, 15, 28 and Comparative Examples 1, 2 was replaced with PY-128.

Examples 35 to 40 and Comparative Examples 5 to 6

Ink-jet ink compositions of Examples 35 to 40 and Comparative Examples 5 to 6 were manufactured in the same manner as in Examples 1, 11, 13, 14, 15, 28 and Comparative Examples 1, 2, except that the polymerizable compound and polymerization initiator in Examples 1, 11, 13, 14, 15, 28 and Comparative Examples 1, 2 were changed as described below.

Polymerizable Compound
(i) Oxetane compound (OXT-221: manufactured by Toagosei Co., Ltd.) . . . 70.0 g.
(ii) Epoxy compound (Celoxide 3000: manufactured by Daicel Chemical Industries, Ltd.) . . . 17.5 g.
Polymerization initiator (triphenylsulfonium salt (UVI-6992, Dow Chemical Co., Ltd.) . . . 5.0 g.

Examples 41 to 46 and Comparative Examples 7 to 8

Ink-jet inks of Examples 41 to 46 and Comparative Examples 7 to 8 were manufactured in the same manner as in Examples 35 to 40 and Comparative Examples 5 to 6, except that the quinacridone pigment PV-19 in Examples 35 to 40 and Comparative Examples 5 to 6 was replaced with a phthalocyanine pigment PB15:3.

—Evaluation of Ink Composition—

The obtained ink compositions were evaluated by the following methods. The results are shown in Table 1.

<Viscosity>

The viscosity of each ink composition at 40° C. was measured using an E-type viscometer. The viscosity was evaluated according to the following criteria.
A: less than 30 mPa·s
B: 30 mPa·s or more and less than 100 mPa·s <Stability>

Each of the obtained ink compositions was stored for 1 month at 25° C. and then for 24 hours at 70° C. The dispersion state was then evaluated visually and based on changes in viscosity. The evaluation was performed according to the following criteria.
A: no precipitates appeared, viscosity did not increase.
B: no precipitates appeared, viscosity somewhat increased, but to a level at which no problems associated with discharge ability.
C: no precipitates appeared, but discharge ability decreased to a level causing problems in practical use due to increase in viscosity.
D: precipitates appeared.

<Average Particle Size>

A volume standard average particle size D50 was measured by using a particle size distribution measurement device based on light scattering and diffraction system (LA910, manufactured by Horiba Instruments, Inc.) and evaluated according to the following criteria for each ink.
A: D50 was less than 100 nm
B: D50 was 100 nm or more to less than 200 nm
C: D50 was 200 nm or more <Curing Ability>

The obtained ink compositions were irradiated with ultraviolet radiation as active radiation and a recorded image matter was obtained by using an ink-jet printer (printing density 300 dpi, droplet ejection frequency 4 kHz, number of nozzles: 64), performing image recording (printing) on art paper and then irradiating the recorded image at an energy level of 100 mJ/cm$^2$ by using a Deep UV lamp (SP-7, manufactured by Ushio Kabushiki Kaisha).

The obtained image recorded matter was touched with a finger and evaluated according to the following criteria with respect to tackiness.
A: no tackiness
B: slight tackiness
C: significant tackiness

TABLE 3

| | Pigment dispersant | Viscosity | Stability (room temperature) | Stability (60° C.) | Particle size | Curing ability |
|---|---|---|---|---|---|---|
| Ex. 1 | Polymer Compound C-1 | A | A | A | A | A |
| Ex. 2 | Polymer Compound C-2 | A | A | A | A | A |
| Ex. 3 | Polymer Compound C-3 | A | A | B | A | A |
| Ex. 4 | Polymer Compound C-4 | A | A | A | A | A |
| Ex. 5 | Polymer Compound C-5 | A | A | A | A | A |
| Ex. 6 | Polymer Compound C-6 | A | A | A | A | A |
| Ex. 7 | Polymer Compound C-7 | A | A | A | A | A |
| Ex. 8 | Polymer Compound C-8 | A | A | B | A | A |
| Ex. 9 | Polymer Compound C-9 | A | A | B | A | A |
| Ex. 10 | Polymer Compound C-10 | A | A | A | A | A |
| Ex. 11 | Polymer Compound C-11 | A | A | A | A | A |
| Ex. 12 | Polymer Compound C-12 | A | A | A | A | A |
| Ex. 13 | Polymer Compound C-13 | A | A | A | A | A |
| Ex. 14 | Polymer Compound C-14 | A | A | A | A | A |
| Ex. 15 | Polymer Compound C-15 | A | A | A | A | A |
| Ex. 16 | Polymer Compound C-16 | A | A | B | A | A |
| Ex. 17 | Polymer Compound C-17 | A | A | B | A | A |
| Ex. 18 | Polymer Compound C-18 | A | A | A | A | A |
| Ex. 19 | Polymer Compound C-19 | A | A | A | A | A |
| Ex. 20 | Polymer Compound C-20 | A | A | A | A | A |

TABLE 3-continued

| | | Evaluation of ink composition | | | | |
|---|---|---|---|---|---|---|
| | Pigment dispersant | Viscosity | Stability (room temperature) | Stability (60° C.) | Particle size | Curing ability |
| Ex. 21 | Polymer Compound C-21 | A | A | A | A | A |
| Ex. 22 | Polymer Compound C-22 | A | A | B | A | A |
| Ex. 23 | Polymer Compound C-23 | A | A | B | A | A |
| Ex. 24 | Polymer Compound C-24 | A | A | A | A | A |
| Ex. 25 | Polymer Compound C-25 | A | A | A | A | A |
| Ex. 26 | Polymer Compound C-26 | A | A | A | A | A |
| Ex. 27 | Polymer Compound C-27 | A | A | A | A | A |
| Ex. 28 | Polymer Compound C-28 | A | A | A | A | A |
| Compara. Ex. 1 | Commercial dispersant 24000GR | A | C | C | A | A |
| Compara. Ex. 2 | Commercial dispersant 32000 | A | A | C | A | A |

TABLE 4

| | | Evaluation of ink composition | | | | |
|---|---|---|---|---|---|---|
| | Pigment dispersant | Viscosity | Stability (room temperature) | Stability (60° C.) | Particle size | Curing ability |
| Ex. 29 | Polymer Compound C-1 | A | A | A | A | A |
| Ex. 30 | Polymer Compound C-11 | A | A | A | A | A |
| Ex. 31 | Polymer Compound C-13 | A | A | A | A | A |
| Ex. 32 | Polymer Compound C-14 | A | A | A | A | A |
| Ex. 33 | Polymer Compound C-15 | A | A | A | A | A |
| Ex. 34 | Polymer Compound C-28 | A | A | A | A | A |
| Compara. Ex. 3 | Commercial dispersant 24000GR | C | C | D | C | A |
| Compara. Ex. 4 | Commercial dispersant 32000 | B | C | C | B | A |
| Ex. 35 | Polymer Compound C-1 | A | A | A | A | A |
| Ex. 36 | Polymer Compound C-11 | A | A | A | A | A |
| Ex. 37 | Polymer Compound C-13 | A | A | A | A | A |
| Ex. 38 | Polymer Compound C-14 | A | A | A | A | A |
| Ex. 39 | Polymer Compound C-15 | A | A | A | A | A |
| Ex. 40 | Polymer Compound C-28 | A | A | A | A | A |
| Compara. Ex. 5 | Commercial dispersant 24000GR | A | C | C | B | A |
| Compara. Ex. 6 | Commercial dispersant 32000 | A | B | C | B | A |
| Ex. 41 | Polymer Compound C-1 | A | A | A | A | A |
| Ex. 42 | Polymer Compound C-11 | A | A | A | A | A |
| Ex. 43 | Polymer Compound C-13 | A | A | A | A | A |
| Ex. 44 | Polymer Compound C-14 | A | A | A | A | A |
| Ex. 45 | Polymer Compound C-15 | A | A | A | A | A |
| Ex. 46 | Polymer Compound C-28 | A | A | A | A | A |
| Compara. Ex. 7 | Commercial dispersant 24000GR | C | C | D | C | A |
| Compara. Ex. 8 | Commercial dispersant 32000 | B | B | D | B | A |

Tables 3 and 4 show that the ink composition in accordance with the present invention is advantageously suitable for recording images by an ink-jet recording process (suitable for the image recording method in accordance with the present invention), has high sensitivity with respect to irradiation with active radiation (ultraviolet radiation) and can be cured thereby, enables the recording of non-tacky high-quality images (image recorded matter in accordance with the present invention), demonstrates no increase in viscosity due to decrease in pigment dispersivity even under long-term storage conditions and has both excellent pigment dispersivity and excellent dispersion stability.

In contrast, in the case of inks of comparative examples that used the commercial polymer dispersants, storage ability under high-temperature conditions (stability (60° C.)) degraded to a level hardly suitable for practical used.

Further, in the examples, the synthesized graft copolymers are composed of pigment interaction sites and graft chains (macromonomers), and apparently graft chains (macromonomers) demonstrate affinity for the dispersant rather than for the pigment and act or function as steric repulsion groups that serve for steric prevention of the particles contained in the dispersion from being aggregated. In accordance with the present invention, it can be supposed that the aforementioned graft copolymer has a configuration identical to the graft copolymer used in the examples and, therefore, demonstrates action and functions identical to those of the graft copolymers used in each examples.

The ink composition in accordance with the present invention makes it possible to record sharp images with excellent coloring ability and to obtain high-quality image recorded matter (printout) by using the usual printing. Moreover, the ink composition can be advantageously used also for manufacturing resists, color filters, and optical disks and is also suitable as an optical molding material. In addition, because high-quality images can directly formed based on digital data even on non-absorbing recording media by applying the ink-jet recording method, the ink composition in accordance with the present invention can be also advantageously used for fabricating image recorded matter (printout) of a large surface area.

Because the image recording method in accordance with the present invention uses the ink composition in accordance with the present invention, this method can be advantageously used for printing applications that require the recording of high-quality images with excellent durability.

Because the image recorded matter in accordance with the present invention is obtained using the ink composition in accordance with the present invention, it has high quality and excels in durability. Therefore, such recorded matter can be advantageously used for a wide variety of applications.

What is claimed is:

1. An ink composition comprising:
a polymerizable composition,
a pigment, and a polymer represented by the following General Formula (2),

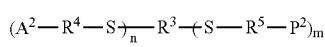

General Formula (2)

wherein in the General Formula (2), $R^3$ represents an (m+n)-valent organic linking group, $R^4$ and $R^5$ each independently represents a single bond or a divalent organic linking group; $A^2$ represents a monovalent organic group having a pigment adsorption structure comprising at least one selected from an organic pigment structure, a heterocyclic structure, an acidic group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group; the n groups of $A^2$ and bonds or groups of $R^4$ may independently be the same or different; "m" is an integer of 1 to 8, "n" is an integer of 2 to 9, and m+n is 3 to 10; $P^2$ represents a polymer skeleton; the m skeletons of $P^2$ and the m bonds or groups of $R^5$ may independently be the same or different, wherein $R^3$ is selected from the following (1) to (17), (1)

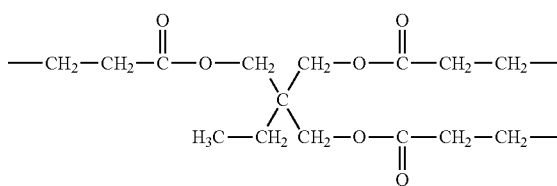

(2)

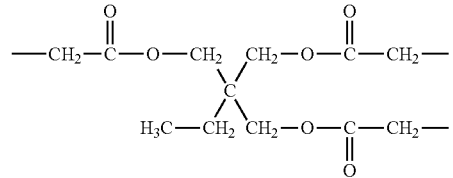

(3)

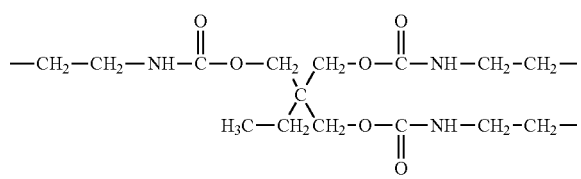

(4)

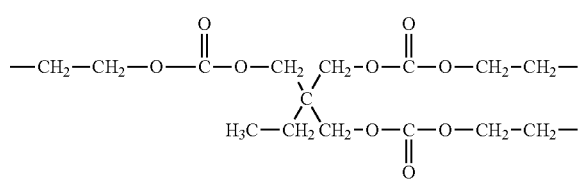

(5)

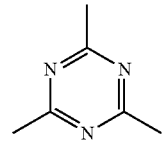

(6)

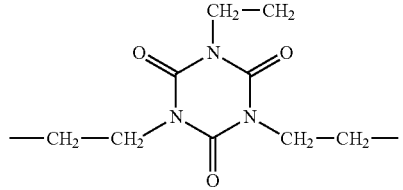

(7)

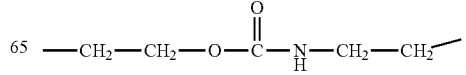

-continued

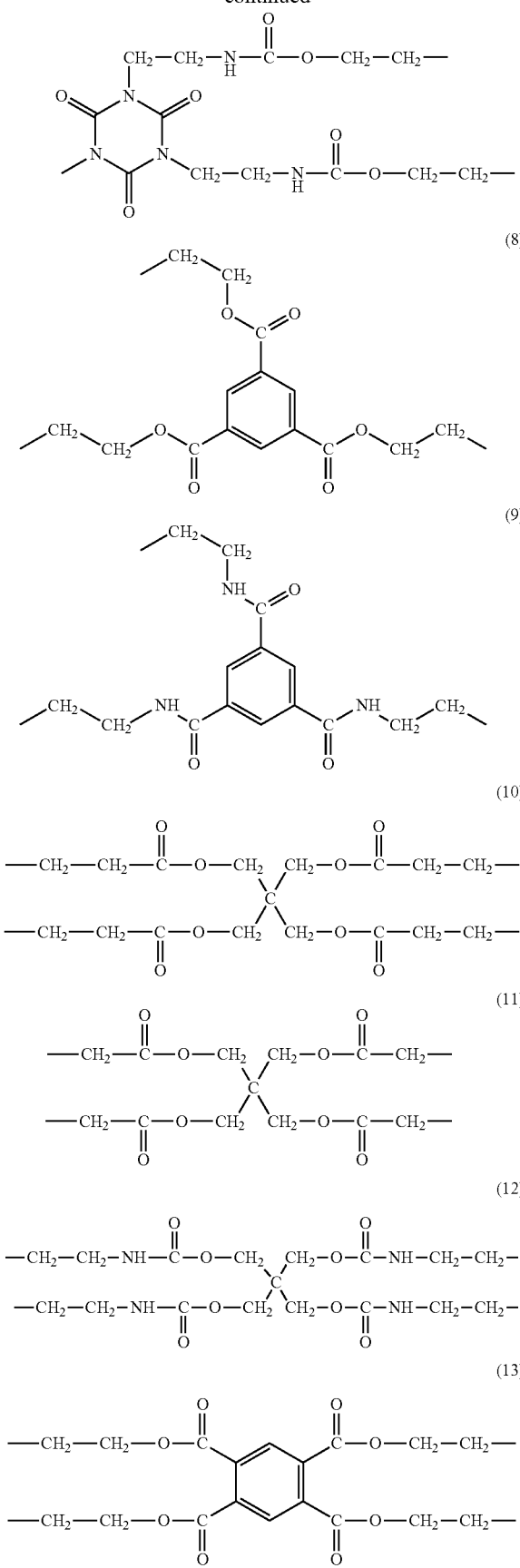

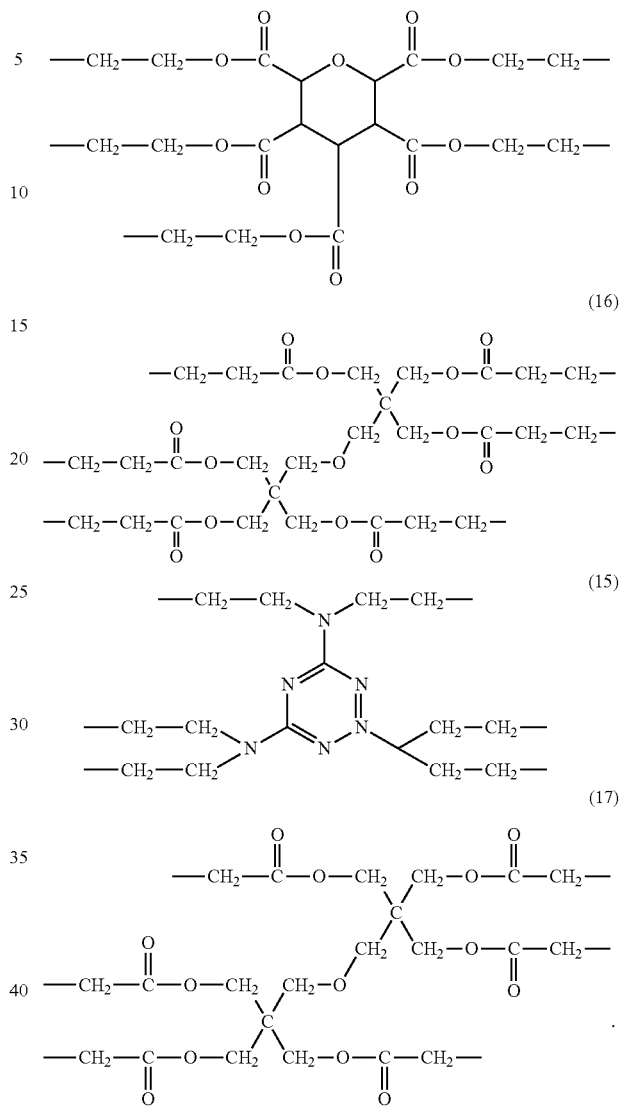

2. The ink composition according to claim 1, wherein $A^2$ is a monovalent organic group that contains at least one selected from an organic pigment structure, a heterocyclic structure, an acidic group, a group having a basic nitrogen atom, an urea group, and a hydrocarbon group having 4 or more carbon atoms.

3. The ink composition according to claim 1, wherein the polymer skeleton represented by $P^2$ is derived from at least one selected from polyvinyls, polyesters, polyethers, polyurethanes, polyamides, polyoxides, polysiloxanes, and copolymers thereof.

4. The ink composition according to claim 1, further comprising a polymerization initiator.

5. The ink composition according to claim 4, wherein the polymerizable compound is a radical polymerizable compound, and the polymerization initiator is a photoradical generating agent.

6. The ink composition according to claim 4, wherein the polymerizable compound is a cationic polymerizable compound, and the polymerization initiator is a photoacid generating agent.

7. The ink composition according to claim 1, being an ink-jet ink composition.

8. The ink composition according to claim 1, capable of being cured by irradiation with an active energy beam.

9. An image recording method comprising:
printing an image with an ink composition; and
curing the ink composition by irradiating the ink composition used in the print image with active radiation;
wherein the ink composition comprises at least a polymerizable composition,
a pigment, and a polymer represented by the following General Formula (2),

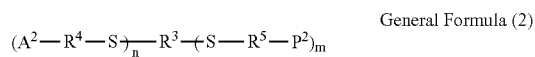
General Formula (2)

wherein in the General Formula (2), $R^3$ represents an (m+n)-valent organic linking group, $R^4$ and $R^5$ each independently represents a single bond or a divalent organic linking group; $A^2$ represents a monovalent organic group having a pigment adsorption structure comprising at least one selected from an organic pigment structure, a heterocyclic structure, an acidic group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group; the n groups of $A^2$ and bonds or groups of $R^4$ may independently be the same or different; "m" is an integer of 1 to 8, "n" is an integer of 2 to 9, and m+n is 3 to 10; $P^2$ represents a polymer skeleton; the m skeletons of $P^2$ and the m bonds or groups of $R^5$ may independently be the same or different,
wherein $R^3$ is selected from the following (1) to (17), (1)
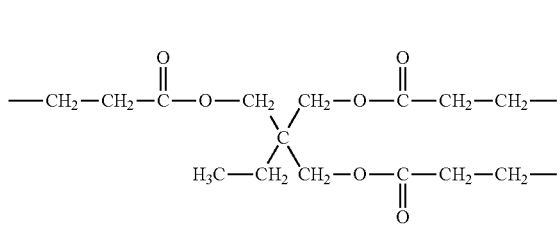

(2)
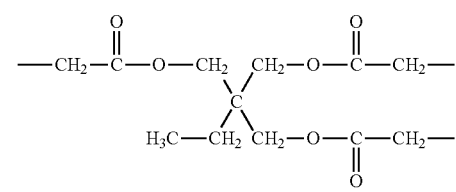

(3)
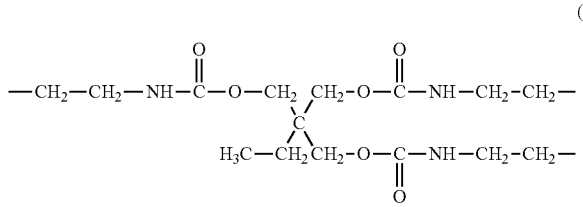

(4)
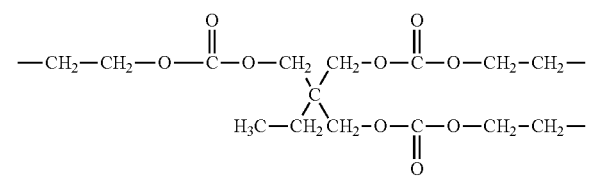

(5)
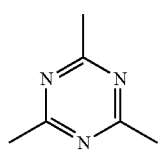

(6)
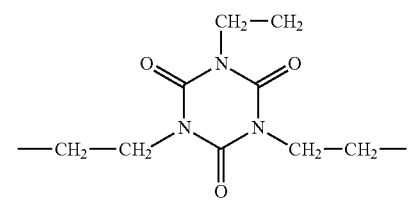

(7)
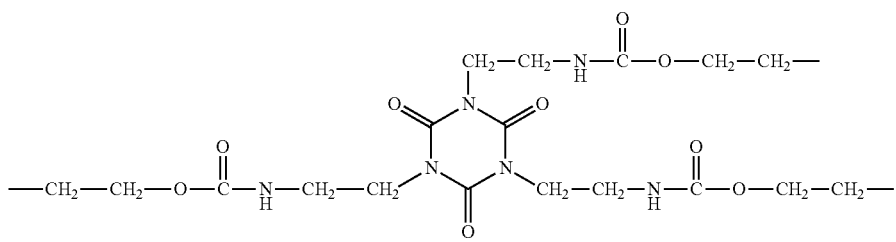

(8)
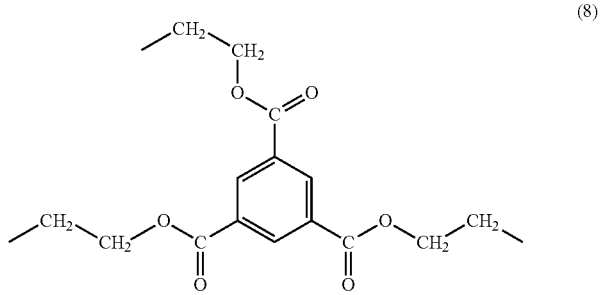

(9)
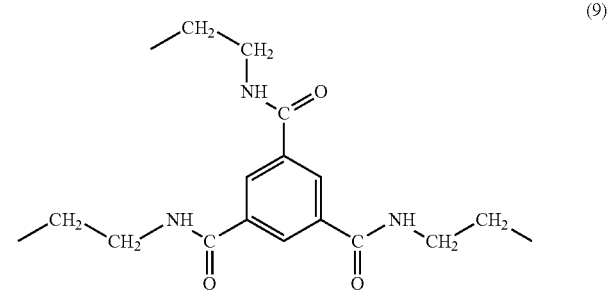

-continued

(10) 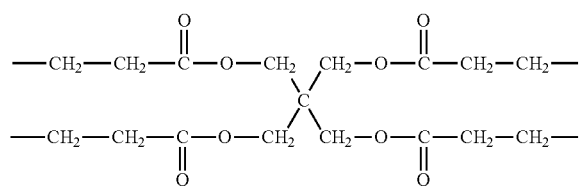

(11) 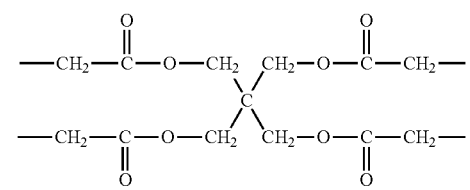

(12) 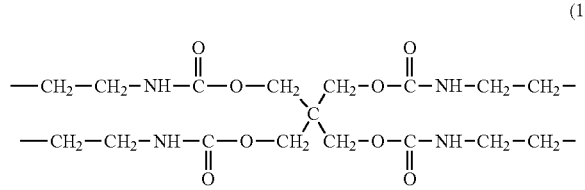

(13) 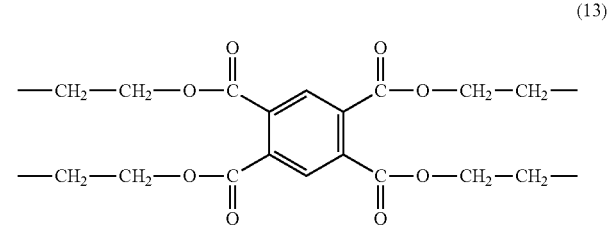

(14) 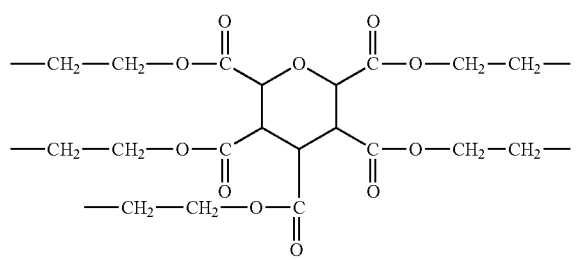

(16) 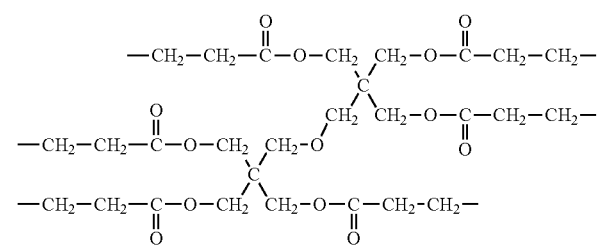

(15) 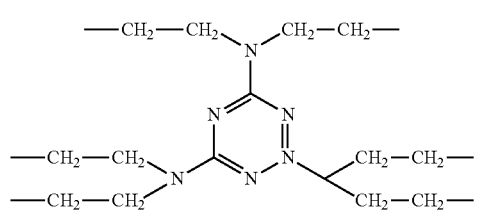

(17) 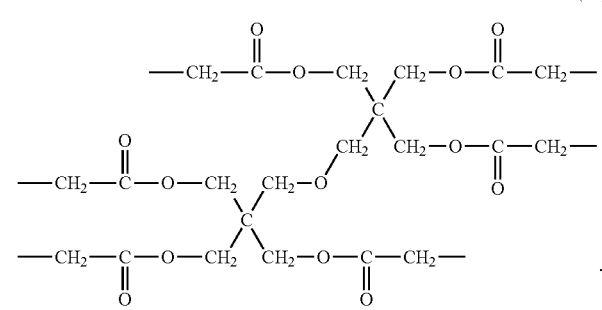

10. An image recorded matter obtained by curing an ink composition,
wherein the ink composition comprises at least a polymerizable composition, a pigment, and a polymer represented by the following General Formula (2), General Formula (2)

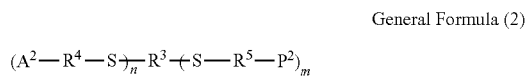

wherein in the General Formula (2), $R^3$ represents an (m+n)-valent organic linking group, $R^4$ and $R^5$ each independently represents a single bond or a divalent organic linking group; $A^2$ represents a monovalent organic group having a pigment adsorption structure comprising at least one selected from an organic pigment structure, a heterocyclic structure, an acidic group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group; the n groups of $A^2$ and bonds or groups of $R^4$ may independently be the same or different; "m" is an integer of 1 to 8, "n" is an integer of 2 to 9, and m+n is 3 to 10; $P^2$ represents a polymer skeleton; the m skeletons of $P^2$ and the m bonds or groups of $R^5$ may independently be the same or different wherein R³ is selected from the following (1) to (17),
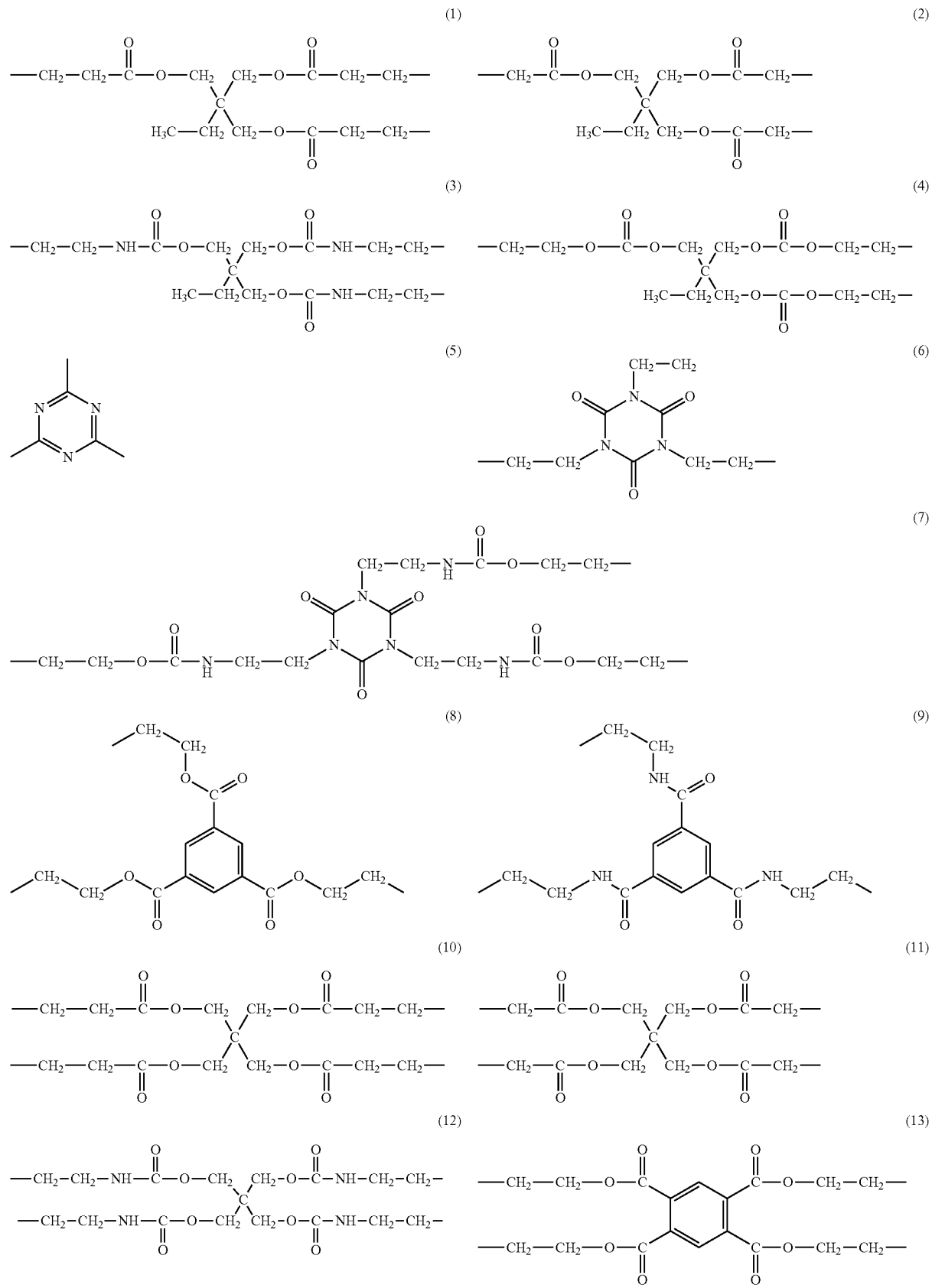

(14)

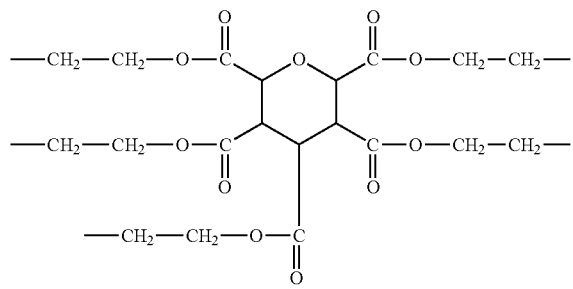

(16)

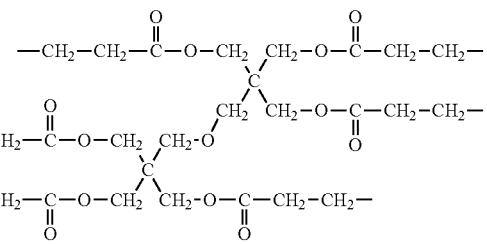

(15)

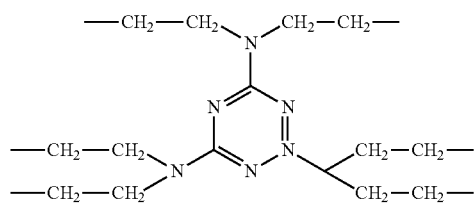

(17)

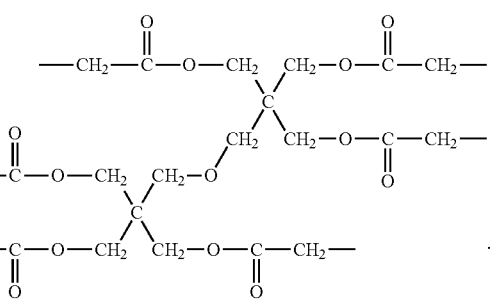

11. The image recorded matter according to claim 10, obtained by printing the ink composition on a recording medium with an ink jet printer and then curing the ink composition by irradiation with active radiation.

12. An ink composition comprising:
a polymerizable composition,
a pigment, and a polymer represented by the following General Formula (1),

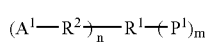

General Formula (1)

in the General Formula (1), $R^1$ represents an (m+n)-valent organic linking group, $R^2$ represents a single bond or a divalent organic linking group; $A^1$ represents a monovalent organic group having a pigment adsorption structure comprising at least one selected from an organic pigment structure, a heterocyclic structure, an acidic group, a group having a basic nitrogen atom, a urea group, a urethane group, a group having a coordinating oxygen atom, a hydrocarbon group having 4 or more carbon atoms, an alkoxysilyl group, an epoxy group, an isocyanate group, and a hydroxyl group; the n groups of $A^1$ and bonds or groups of $R^2$ may independently be the same or different; "m" is an integer of 1 to 8, "n" is an integer of 2 to 9, and m+n is 3 to 10; $P^1$ represents a polymer skeleton; and the m skeletons of $P^1$ may be the same or different, wherein $R^1$ is selected from the following (1) to (17), (1)

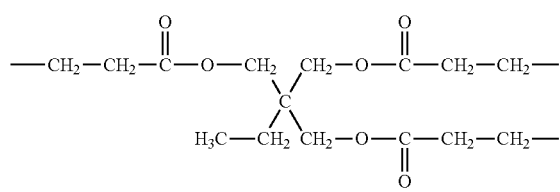

(2)

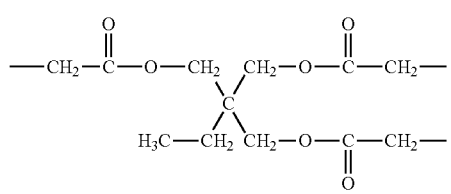

(3)

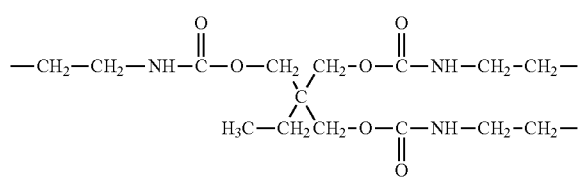

(4)

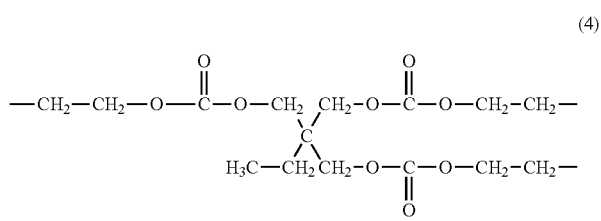

-continued
(5)
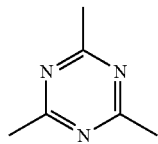
(6)
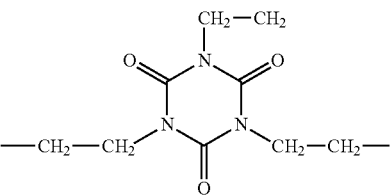
(7)
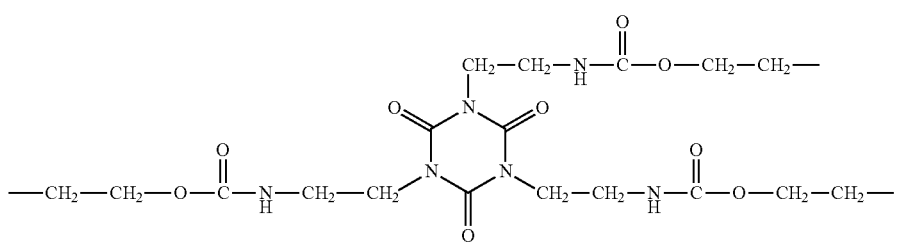
(8)
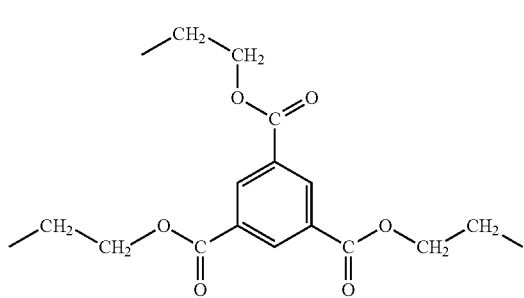
(9)
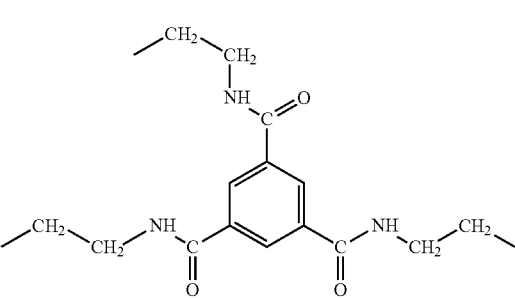
(10)
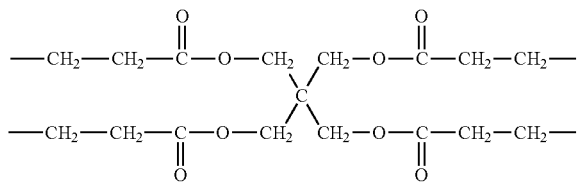
(11)
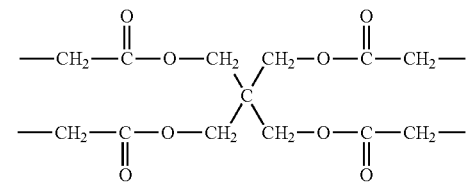
(12)
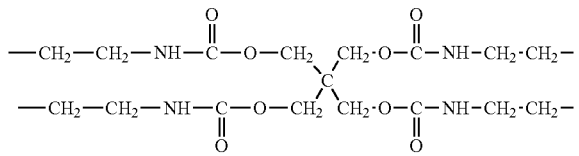
(13)
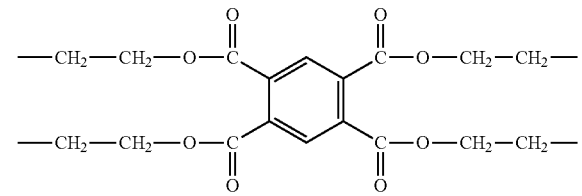
(14)
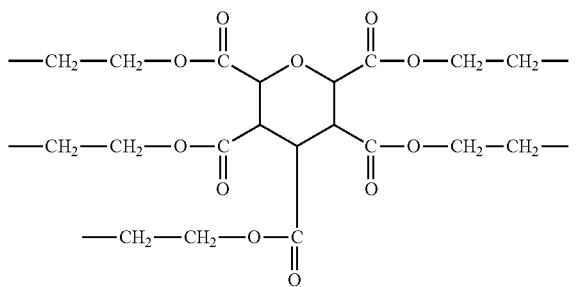
(16)
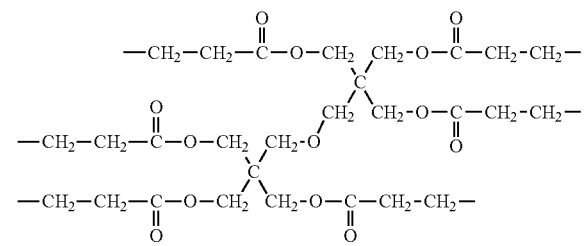

-continued
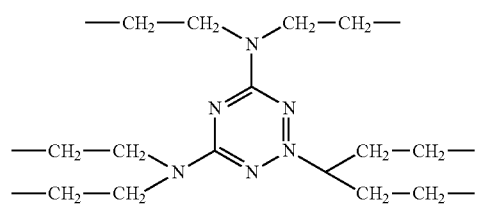
(15)
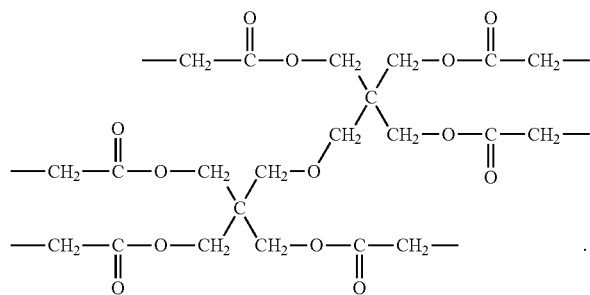
(17)
* * * * *